(12) United States Patent
Hiraguchi

(10) Patent No.: US 7,419,115 B2
(45) Date of Patent: Sep. 2, 2008

(54) MAGNETIC TAPE CASSETTES AND PROCESSES FOR PRODUCING THEM

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/372,195

(22) Filed: Mar. 10, 2006

(65) Prior Publication Data

US 2006/0163406 A1 Jul. 27, 2006

Related U.S. Application Data

(62) Division of application No. 10/183,372, filed on Jun. 28, 2002, now Pat. No. 7,035,048.

(30) Foreign Application Priority Data

Jul. 2, 2001 (JP) ............................. 2001-200695

(51) Int. Cl.
G11B 23/04 (2006.01)
(52) U.S. Cl. ....................... 242/347; 360/132
(58) Field of Classification Search ............... 242/347, 242/348; 360/132
See application file for complete search history.

(56) References Cited

U.S. PATENT DOCUMENTS 4,545,483 A * 10/1985 Shiba et al. ............. 206/387.1
5,054,616 A * 10/1991 Gelardi et al. ............. 206/393
5,581,430 A 12/1996 Schoettle et al.
6,556,379 B2 4/2003 Ashikawa

FOREIGN PATENT DOCUMENTS

| EP | 1 102 265 A2 | 5/2001 |
|---|---|---|
| JP | 57-179972 A | 11/1982 |
| JP | 61-156074 U | 9/1986 |
| JP | 01072377 A | 3/1989 |
| JP | 05-182399 A | 7/1993 |
| JP | 05-298852 A | 11/1993 |
| JP | 06-005041 A | 1/1994 |
| JP | 06-349226 A | 12/1994 |
| JP | 07037358 A | 2/1995 |
| JP | 07-334964 A | 12/1995 |
| JP | 2000173227 A | 6/2000 |
| JP | 2000215636 A | 8/2000 |
| WO | WO 94/16012 A1 | 7/1994 |

* cited by examiner

*Primary Examiner*—John Q. Nguyen
(74) *Attorney, Agent, or Firm*—Sughrue Mion, PLLC

(57) ABSTRACT

The magnetic tape cassette has a base with an opening for forming a transparent window and a transparent resin-made window member to be installed in said opening. The window member is provided with an engaging unit which is to be fitted into the base at an angle and the base is provided with an engaging portion that is formed at an angle in correspondence to the engaging unit and the window member is installed in the opening by being fitted in at an angle.

5 Claims, 25 Drawing Sheets

FIG.13A
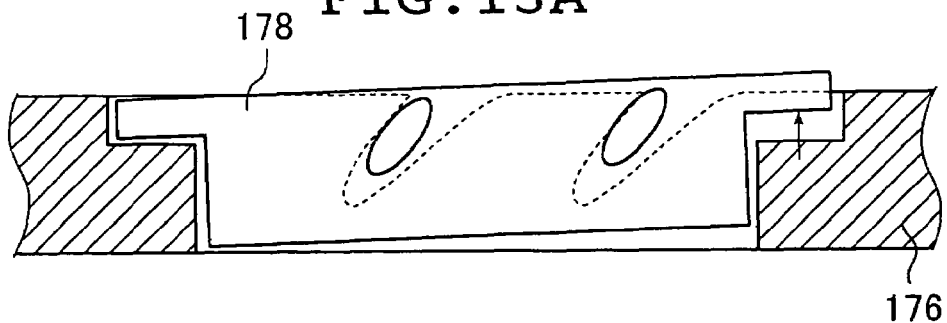
FIG.13B
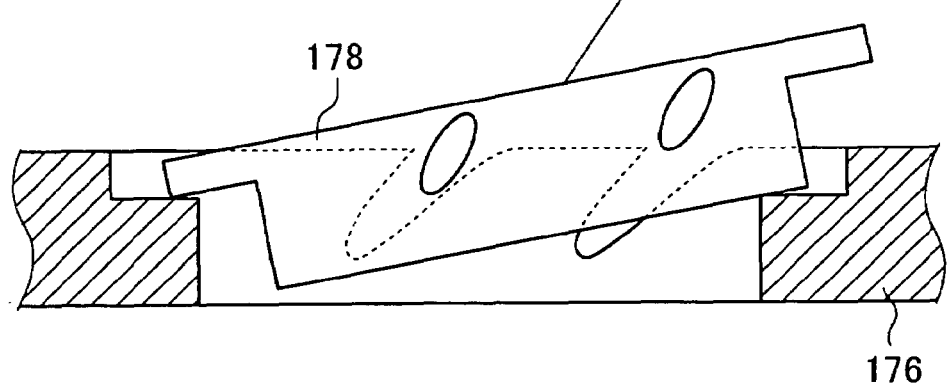
FIG.13C
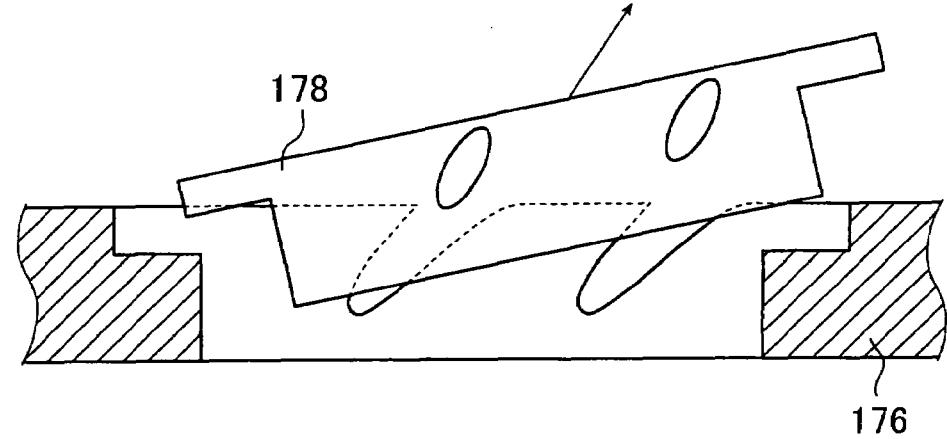
FIG.14A  FIG.14B  FIG.14C  FIG.14D
   

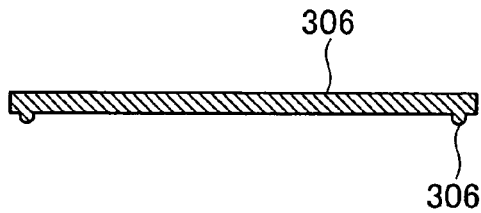
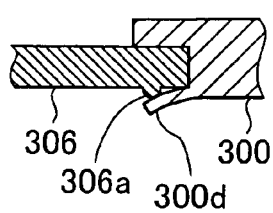
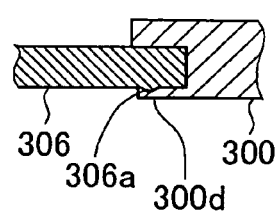
FIG. 39  FIG. 40  FIG. 41
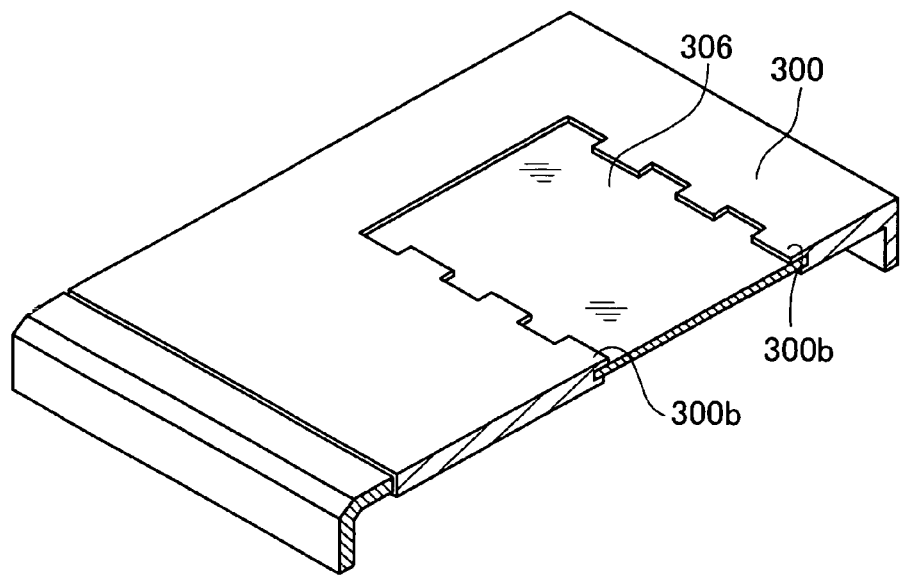
FIG. 42
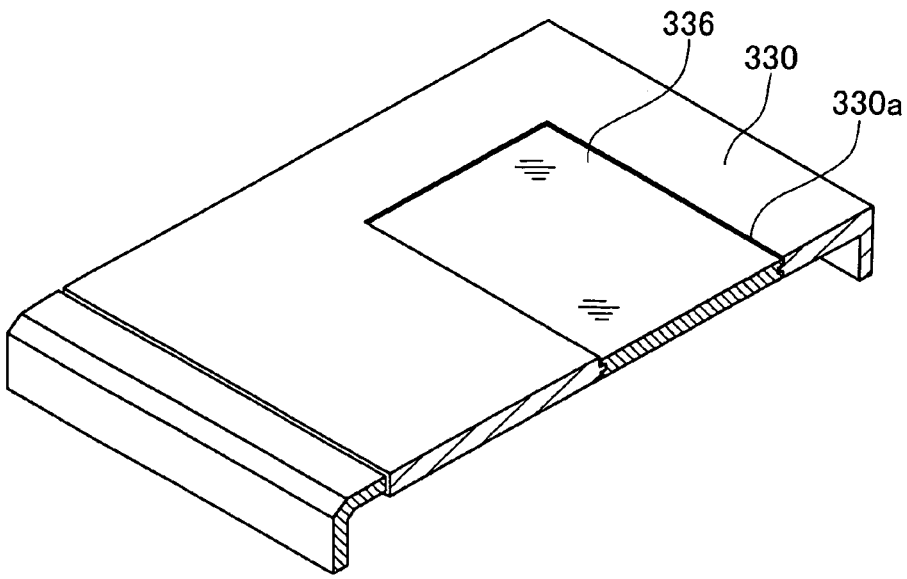
FIG. 43

MAGNETIC TAPE CASSETTES AND PROCESSES FOR PRODUCING THEM

This is a divisional of application Ser. No. 10/183,372 filed Jun. 28, 2002 now U.S. Pat. No. 7,035,048. The entire disclosure of the prior application Ser. No. 10/183,372 is considered part of the disclosure of the accompanying divisional application and is hereby incorporated by reference.

BACKGROUND OF THE INVENTION

This invention relates to magnetic tape cassettes having an easy-to-separate transparent window and processes for producing them. The invention particularly relates to magnetic tape cassettes that have a transparent window formed of a transparent resin (plastic) window member in the upper half of the cassette in such a way that when the cassette is discarded after use, the window member can be easily separated from the opening in the base (the body of the upper half) so that the base and the window member can individually be recovered as recyclable feeds as well as a process for producing the magnetic tape cassettes.

The invention also relates to shaped resin articles that are so designed that members of different materials can be easily separated from each other, as exemplified by magnetic tape cassettes which are so designed that the transparent window in the housing (cassette case) through which the user can check the residual amount of tape (visually) is easily separable from the housing (or its base).

The invention also relates to a method for multi-color molding of resin products, particularly of magnetic tape cassettes which are so designed that the transparent residual tape check window in the housing (cassette case) is easily separable from the housing.

The invention further relates to a method for destructing and separating parts made of dissimilar materials which is particularly applicable to the magnetic tape cassette and by which the transparent residual tape check window in the housing (cassette case) of the magnetic tape can be easily separated from the housing which is made of a dissimilar material than the transparent window.

As an introduction to the specific description of the invention, magnetic tape cassettes are well known which are of such a type that a web of magnetic tape is wound around a pair of take-up hubs which are rotatably housed in the housing (cassette case). This magnetic tape cassette has a transparent window formed in the upper half so that the user can see through it to check the residual amount of the magnetic tape wound around the right and left take-up hubs. Obviously, in order to eliminate the waste of resources and save them or protect the environment, it is most desirable that the upper half of the magnetic tape cassette, when discarded after use, should be disassembled into its body (base) and the transparent window member so that they can be recycled as new feeds.

Considering these points, the present invention provides easy-to-disassemble magnetic tape cassettes (or their upper half) and processes for producing them, shaped resin particles such as magnetic tape cassettes, a method for multi-color molding of resin products such as magnetic tape cassettes (or their upper half) and a method for destructing and separating parts of dissimilar materials such as the transparent window and the housing (cassette case) of magnetic tape cassettes.

With the recent concern over environmental problems, people are worrying about the adverse effects that may be caused to the environment by increased dumping of resins (plastics), composites and other materials. Under the circumstances, reducing the impact on the environment by either minimizing wastes or dumping them in forms that are not deleterious to the purpose of preserving the environment is becoming increasingly important. To this end, efforts are being made to integrate industrial products into the circulating system of the society at large by, for example, ensuring that they can be easily disassembled into various parts by materials type so that the latter can be recycled as much as possible.

Two types of magnetic tape cassette are known as image recording and reproducing tape cassettes that are used in consumer or professional video tape recorders or video cameras, and also as large-capacity recording media that are used to back up data in external storages in computers and the like; the first type comprises magnetic tape wound around a pair of take-up hubs placed rotatably in a cassette case consisting of an upper half and a lower half (which is hereunder referred to simply as a housing) and the second type comprises magnetic tape wound around a single tape reel also encased rotatably in a housing. Known examples are magnetic tape cassettes the structural and dimensional specifications of which are described in JIS X6127, X6129, X6130, X6171 and X6172, as well as in ECMA-288, etc. Those various types of magnetic tape cassette are designed as complex structures formed of various metallic members in combination with various synthetic resin members depending upon the performance and shapes required of the parts of which they are made.

The various types of magnetic tape cassette mentioned above have a window formed in one or more openings in the top plate of the upper half and in order to ensure that the user can externally check the amount, state and other parameters of the magnetic tape that has been taken up by the hubs or the tape reel in the cassette case, the window is formed by fitting a transparent or translucent window member in the opening or openings. The windows are made of various resin materials depending upon the impact strength, wear resistance, durability and other characteristics required of the respective magnetic tape cassettes. For example, window members formed of an AS resin may be fitted in cassette cases formed of an ABS resin; alternatively, all parts including the cassette case and the window member may be formed of a PS resin. Thus, magnetic tape cassettes are made of various resins depending upon the required performance and shapes and are not formed of unified materials.

A common magnetic tape cassette may diagrammatically be shown in perspective in FIG. 65. As shown, the magnetic tape cassette generally indicated by 90 consists of an upper half 91 and a lower half 92 that combine to form the cassette case as the housing. A slider 93 is fitted to the underside of the lower half 92 and a lid 94 is provided at the front face of the cassette (which is closer to the viewer). The slider 93 can slide back and forth on the underside of the lower half 92 so that when the cassette is not in service, the slider prevents dust from getting into the cassette by closing the opening in the lower part of the cassette case. The lid 94 on the upper half 91 is pivotally mounted on a shaft 94a so that it can open or close the front face of the cassette.

The housing of the magnetic tape cassette 90 contains magnetic tape 95 as it is wound around a pair of take-up hubs. The upper half 91 has a transparent window 96 through which the residual amount of tape in the magnetic tape cassette 90 can be checked as when it has been taken out of the deck (not shown).

As already mentioned, the respective parts of the magnetic tape cassette are formed of synthetic resins. Specifically, members that require sliding properties (wear resistance) are molded of POM (polyacetal) resin; if cost performance is important, Si (silicon) is added to PS (polystyrene) to prepare a resin molding material; if strength is an important factor, ABS (acrylonitrile-butadiene-styrene) resin is employed.

Speaking of video cassettes which are generally molded of ABS, the transparent residual tape check window is often molded of ABS-compatible resins such as AS (acrylonitrile-styrene) and PMMA [poly(methyl methacrylate)]. This is because the window and the cassette case are formed by two-color molding (two-layer molding) and subsequently bonded by welding.

The molding of the magnetic tape cassette under consideration, especially the molding of the upper half 91 and the window 96 is conventionally performed as follows.

As shown in FIG. 66A, a die assembly 100 for molding the upper half 91 and the window member 96 is basically composed of an upper die 102, a lower die 104 and a moving (sliding) core 106. The upper die 102, the lower die 104 and the moving core 106 define a space 108, into which a molten resin [e.g. ABS (acrylonitrile-butadiene-styrene) resin] is injected to mold the upper half 91.

Then, as shown in FIG. 66B, the moving core 106 is allowed to descend by a distance equal to the thickness of the window member 96; into the resulting space 110, a transparent resin [e.g. AS (acrylonitrile-styrene) resin] is injected to mold the window member 96.

Conventionally, as shown in FIGS. 66A and 66B, the edges of the moving core 106 are cut out at an angle (beveled) so that the area of contact between the window 96 and the upper half 91 is sufficiently increased to achieve more effective bonding of the two components after molding.

FIG. 67 shows in perspective the upper half of the cassette case of the prior art magnetic tape cassette with part taken away after it has been cut through the transparent window, and FIG. 68 is a section of FIG. 67 which has been taken through the transparent window. In order to fabricate the upper half 80 of the conventional cassette case, the body 82 serving as the base is first provided; then an opening 82a is made in the body 82 to provide an area in which a transparent window member 84 can later be fitted and a window frame 82b is formed around the opening 82a to support the window member 84; subsequently, the window member 84 is fitted into the opening 82a in the body 82 and welded to the supporting window frame 82b by ultrasonic welding or some other method.

The method of transparent window fabrication which is illustrated by FIGS. 67 and 68 is convenient and suitable for mass production of cassette cases. However, if the upper half 80 of the cassette case discarded after use is to be disassembled into its body 82 and the window member 84 so that they can be recycled as new feeds, a serious problem arises, i.e., since the transparent window 84 is welded to the body 82, it is very difficult to disassemble the upper half 80 without breaking either the body 82 or the window member 84.

Even if the upper half 80 is disassembled by breaking either its body 82 or the window member 84, it is practically impossible to ensure that both are positively separated from the welded area and part of the window member 84 will remain firmly adherent to the upper half's body 82 or vice versa. Under these circumstances, if an attempt is made to recycle the upper half's body 82 and the window member 84 as respectively new feeds, the two components inevitably occur as a mixture—part of the window member 84 firmly adheres to the upper half's body 82 and part of the body 82 firmly adheres to the window member 84 and it has been unavoidable that the recycled feeds have only low purity.

The transparent window as a component of the cassette case is included as part of the upper half 80 and must impart air-tightness for dust prevention and other purposes. In addition, the cassette case involves manual handling at various stages of its use including carrying, storage and loading onto the recording and reproducing apparatus and it must have sufficient strength that it will not break or become dislodged during handling.

As already mentioned, the conventional magnetic tape cassette molded by the method illustrated in FIGS. 66A and 66B features a very strong bond between the transparent window and the housing in order to maintain the strength of the cassette case and considerable force is usually required to separate the window from the housing by hand. Because of this strong bond, it has been difficult to achieve selective recovery of dissimilar materials, particularly ABS from AS or PMMA. The high peel strength of the conventional magnetic tape cassette is desirable from the viewpoint of ensuring that it performs the intended functions; however, its shape does not allow easy disassembling into the window and the housing.

Furthermore, if the user attempts to separate the window from the housing by force, he has to break the window but if it does not break easily and neat, he may be hurt by the shattered pieces of window. Simply cutting slits or otherwise rendering the window easily breakable is not capable of producing a sufficiently dust-proof cassette case. The window once bonded firmly to the upper half does not break easily and if it is destroyed by force, it will partly remain adhering to the housing; this is better than what has been attained in the prior art but the separation is by no means complete. If the window is not collected as a separate entity from the housing or if the separation is not complete, the mixing of dissimilar materials makes it difficult to recycle the respective parts and regenerate materials of good quality (this type of recycling is called "materials recycling") that sell at competitive price. A need therefore arises to increase the precision in the separation technology.

Thus, it has been desired to design a magnetic tape cassette that permits easy separation of the window from the housing without compromising the dust-proofness of the cassette case. Common resin products have a similar need and they should desirably be so designed that various parts can be easily collected as separate entities, thereby making more parts recyclable.

As already mentioned, there is an increasing demand for designing industrial products that can be manufactured by making effective use of limited resources of the Earth and which can be disposed of in an environment friendly manner. This is one of the reasons why the components or constituent materials of magnetic tape cassettes that find massive use in a wide range of applications are desirably recycled to realize saving of resources and disposed of without increasing the impact on the environment.

Resins of which the magnetic tape cassettes are made can generally be recycled either as members, parts or resin feeds (materials recycling) or as fuels (thermal recycling).

Materials recycling presents no big problems in saving resources and reducing the environmental impact. On the other hand, thermal recycling involves the use of thermal energy and is not effective for preventing global warming since an increasing amount of heat is dissipated to the environment in the recycling process. Therefore, the magnetic tape cassettes are desirably made of members, parts or materials none or only a few of which need be subjected to thermal recycling.

From these viewpoints, the window member to be fitted in the upper half of the magnetic tape cassette should desirably satisfy the requirements of the saving resources, conserving the Earth's environment and not contributing to global warming.

The present invention has been accomplished under these circumstances and its primary objective is to solve the aforementioned problems of the prior art by providing a magnetic tape cassette which, in the case of disassembling a discarded magnetic cassette into the base (the body of the upper half) and the window member and recycling the respective parts as feeds for the manufacture of additional products, can be disassembled in an easy and safest way, preferably easily without breaking, and in an efficient way and which is also characterized in that no part of the window member will remain adhering to the base or vice versa, that the separated base or window member can be recycled as a feed for additional products without suffering a drop in purity, and that it has a transparent window which is sufficiently air-tight and strong to provide it with adequate air-tightness and strength. The invention also aims at providing a process for producing the magnetic tape cassette.

Another object of the invention is to provide a magnetic tape cassette of such a structure that, in the case of disassembling a discarded magnetic tape cassette into the upper half's body and the window member, utmost safety is assured in the disassembling operation, as well as a process for producing the magnetic tape cassette.

The second objective of the present invention is to provide a method for multi-color molding of resin products such as magnetic tape cassettes which can solve the aforementioned problems of the prior art by permitting easy separation and recovery of various parts of magnetic tape cassettes and other resin products so that they can be put to second use.

The third objective of the present invention is to provide shaped resin articles which can solve the aforementioned problems of the prior art by permitting easy separation and recovery of various parts of magnetic tape cassettes and other resin products so that they can be put to second use.

The fourth objective of the present invention is to provide a magnetic tape cassette which is effective for conserving the Earth's environment and preventing global warming by permitting less heat to be given off during recycling, thereby solving the aforementioned problems of the prior art.

Another object of the invention is to provide a magnetic tape cassette which, even in a less likely case where part of a discarded magnetic tape cassette is subjected to thermal recycling, can be processed emitting a smaller amount of heat during the recycling process.

The fifth objective of the present invention is to provide a method for breaking and separating dissimilar materials which solves the aforementioned problems of the prior art by permitting easy separation and recovery of various parts of shaped articles made of dissimilar materials, as in the case of magnetic tape cassettes and other resin products, so that they can be put to second use.

These objects and objectives of the present invention will become apparent as the following description evolves.

In order to attain the primary objective described above, according to a first aspect of the invention, there is provided a magnetic tape cassette having:

a base with an opening for forming a transparent window; and a transparent resin-made window member to be installed in the opening, wherein the window member is provided with engaging means which is to be fitted into the base at an angle and the base is provided with an engaging portion that is formed at an angle in correspondence to the engaging means, and wherein the window member is installed in the opening by being fitted in at an angle.

The window member has preferably a step on perimeter or in end portions in order to prevent dust.

Further, depth of the engaging portion of the base is preferably greater than height of the engaging means provided on the window member.

In order to attain the primary objective described above, according to a second aspect of the invention, there is provided a magnetic tape cassette having:

a base with an opening for forming a transparent window; and a window member to be installed in the opening, wherein the base has in at least a part of an inner circumferential area of the opening an adequately rigid upper window frame, an elastically deformable lower window frame and a temporary fitting portion that allows the window member to be inserted between the upper and lower window frames, the window member being made of a transparent resin that has no compatibility or has only low compatibility with a material of which the base is made, and the upper window frame or the lower window frame around the opening or the window member is provided with a projection in a position where they contact each other, and wherein the window member being inserted into the temporary fitting portion so that the lower window frame deforms elastically to achieve temporary joint between the window member and the base, and ultrasonic waves or heat is allowed to act on the temporary joint.

According to the second aspect of the invention, there is also provided a process for producing a magnetic tape cassette having a base with an opening for forming a transparent window and a window member to be installed in the opening, comprising the steps of:

molding the window member of a material having no compatibility or having an extremely low degree of compatibility with the material of which the base is made;

molding the base in such a way that the base has in at least a part of an inner circumferential area of the opening an adequately rigid upper window frame, an elastically deformable lower window frame and a temporary fitting portion that allows the window member to be inserted between the upper and lower window frames, the base and the window member being molded to such that the upper window frame or the lower window frame around the opening in the base or the window member has a projection in a position where the upper window frame or the lower window frame contacts the window member;

inserting the window member into the temporary fitting portion around the opening in the base so that the lower window frame deforms elastically to achieve temporary joint between the window member and the base; and allowing ultrasonic waves or heat to act on the temporary joint.

In order to attain the primary objective described above, according to a third aspect of the invention, there is provided a magnetic tape cassette having:

a base with an opening for forming a transparent window; and a transparent resin-made window member to close the opening in the base, wherein the base and the window member are composed of materials having no compatibility or having an extremely low degree of compatibility to each other, and wherein the window member comprises a portion that is formed with a first sliding member of a die assembly for molding the base and a portion that is formed with a second sliding member of the die assembly, the window member having such a shape that the base is retained between the two portions.

According to the third aspect of the invention, there is also provided a magnetic tape cassette having:

a base with an opening for forming a transparent window; and a transparent resin-made window member to close the opening in the base, wherein the base and the window member are composed of materials having no compatibility or having an extremely low degree of compatibility to each other, the opening in the base ridges that engage the window member, the window member has recesses in at least one of two sets of opposed sides which fit the ridge on the base, and wherein the ridge on the base is fitted into the recess in the window member.

According to the third aspect of the invention, there is further provided a process for producing a magnetic tape cassette having a base with an opening for forming a transparent window and a transparent resin-made window member to close the opening in the base, comprising the steps of:

preparing a die assembly for molding the base which has a first sliding member which can be moved from one side of the base in order to form the opening and a second sliding member which can be moved from the other side of the base and which has at both ends recesses for providing the opening with ridges that engage the window member;

bringing the first sliding member into intimate contact with the second sliding member;

injecting a base forming material to mold the base having the opening;

causing the first sliding member and the second sliding member to be spaced apart; and injecting into a resulting space a window member forming material that has no compatibility or has an extremely low degree of compatibility with the base forming material, whereby the window member is molded as an integral part of the base.

More specifically, the magnetic tape cassette according to the third aspect is of such a cross-sectional shape that it has recesses in the inner surfaces on both sides of the opening in the base, the recesses being interconnected by an edge portion. To manufacture the magnetic tape cassette having the base with this opening and the window member made of a transparent resin that closes the opening in the base, the following process is preferably employed: the base is molded with a die assembly having a first sliding member (cavity or core) that forms the recess in the front surface of the base and a second sliding member (cavity or core) that forms the recess in the back surface of the base and the opening, the first and second sliding members being both movable, and the first and second sliding members are advanced until they intimately contact each other and the recesses in the inner surfaces on both sides of the opening in the base and the edge portion interconnecting the recesses are molded, whereas the transparent window is molded with the same die assembly as above by injecting a transparent resin having no compatibility or having an extremely low degree of compatibility with the base molding resin into the space defined by retracting the first and second sliding members, whereupon the transparent window is molded as an integral part of the base.

In order to attain the second objective described above, according to a fourth aspect of the invention, there is provided a magnetic tape cassette having:

a resin-made base with an opening for forming a transparent window; and a transparent resin-made window member to close the opening in the base, wherein respective resin-made parts of the magnetic tape cassette including at least the base and the window member are molded in multiple colors with a single die assembly using at least two incompatible resin materials that are not adherent to each other and, thereafter, the respective resin-made parts are demolded and recombined from predetermined directions, whereby the respective resin-made parts are assembled together in one step.

In the second, third and fourth aspects, it is preferable that the base is made of an ABS resin and that the window member is made of a transparent AS resin.

In order to attain the second objective described above, according to the fourth aspect of the invention, there is also provided a method for molding a resin product in multiple colors using at least two resins, comprising the steps of:

molding respective parts of the resin product in multiple colors with a single die assembly using at least two incompatible resin materials that are not adherent to each other; and thereafter demolding the respective parts and recombining the respective parts from predetermined directions, thereby assembling the respective parts together in one step to produce the resin product.

In order to attain the primary objective described above, according to a fifth aspect of the invention, there is provided a magnetic tape cassette having:

a base with an opening for forming a transparent window;

a transparent material-made window member to be installed in the opening; and joining means provided on either the base or the window member or both in order to install the window member within the opening in the base.

In a first embodiment of the fifth aspect, it is preferable that the joining means comprises a first wedge-shaped projection on an inner perimeter of the base around the opening which forms the window and a second wedge-shaped projection on the outer perimeter of the window member, and that the first projection on the base is brought into engagement with the second projection on the window member, whereby the window is installed within the opening in the base.

In the first embodiment of the fifth aspect of the invention, it is preferable that the joining means comprises a window frame for supporting the window member on an inner perimeter of the base around the opening and an engaging pawl that is so shaped as to fit to the base and which holds the window frame of the base by engaging its lower edge, and that the engaging pawl of the window member is brought into engagement with the window frame of the base so that the window member is installed within the opening in the base.

Further, in the first embodiment of the fifth aspect of the invention, the joining means preferably comprises two sets of engaging members, one set consisting of the first wedge-shaped projection provided on the inner periphery of the opening in the base and the second wedge-shaped projection provided on the outer periphery of the window member and the other set consisting of the window frame provided on the inner periphery of the opening in the base and the engaging pawl provided on the outer periphery of the window member, and the first projection on the base is brought into engagement with the second projection on the window member whereas the engaging pawl on the window member is brought into engagement with the window frame on the base so that the window member is fitted into the opening in the base.

According to a second embodiment of the fifth aspect of the invention, a joint portion established by the joining means between the window member and the opening in the base has preferably a generally V-shaped cross section with an inclined portion.

Stated specifically, the cassette case according to the second embodiment of the fifth aspect of the invention is characterized in that the transparent window in the cassette case is one that is provided in the upper half of the cassette case in order to enable visual checking of the residual amount of magnetic tape as it is wound around take-up hubs, that the cassette case has the body of the upper half which serves as the base having the opening in which the transparent window is to be fitted and the window member that is made of a transparent resin and which closes the opening in the body of the upper half, and that the joint between the opening in the body of the upper half and the window member has a generally V-shaped cross section with an inclined portion.

With this design, the window member may be pushed at an angle from the inside, whereupon it becomes separable from the opening in the base. The generally V-shaped cross section with an inclined portion is preferably of such a shape that the opening in the base has an inwardly extending projection.

In the second embodiment of the fifth aspect of the invention, the term "generally V-shaped" (hereunder referred to simply as "V-shaped") refers to a state where two planes are opposed at an angle, at least one of which is parallel to the upper and lower surfaces of the upper half's body whereas the other plane forms a specified angle with the one plane. The specified angle refers to a range of angles over which smooth fitting can be accomplished upon pressing and the preferred value is typically at least 30 degrees.

In the second embodiment of the fifth aspect of the invention, it is also preferable that an inner perimeter of the opening in the base is shaped in a circular form, an outer perimeter of the window member is shaped in a circular form so that it can be installed with the circular opening in the base, and that the engaging means comprises an engaging projection provided on either the inner circular perimeter of the opening or the outer circular perimeter of the window member and an engaging portion provided on either the outer circular perimeter of the window member or the inner circular perimeter of the opening to come into engagement with the engaging projection, the window member being fitted into the opening in the base and rotated until it is secured in such a way as to close the opening.

Stated specifically, the magnetic tape cassette according to the second embodiment of the fifth aspect of the invention is one having a base with an opening and a window member made of a transparent resin that closes the opening in the base, characterized in that an engaging projection is provided on either the inner peripheral surface of the opening or the outer peripheral surface of the window member whereas an engaging portion that comes into engagement with the engaging projection is provided on either the outer peripheral surface of the window member or the inner peripheral surface of the opening and that the window member is fitted into the opening in the base and rotated to become fixed in position.

Preferably, the base is the body of the upper half of the magnetic tape cassette and the transparent window is provided in two positions that correspond to the take-up hubs in the magnetic tape cassette.

In a more preferred case, the engaging projection and the engaging portion to be provided on the inner peripheral surface of the opening and on the outer peripheral surface of the window member are such that the engaging projection is provided on the outer peripheral surface of the window member whereas the engaging portion in a helical or partially helical form is provided on the inner peripheral surface of the opening or that the engaging portion in a helical or partially helical form is provided on the outer peripheral surface of the window member whereas the engaging projection is provided on the inner peripheral surface of the opening and that the window member is fitted into the opening in the base and rotated so that it is screwed up to become fixed in position.

In order to attain the third objective described above, according to a sixth aspect of the invention, there is provided a shaped resin article composed of members made of different materials and which has a plate-form member integrated into a housing in such a way that the plate-form member and the housing can be easily separated from each other, wherein vertically offset projections are provided on each of the opposed sides of a portion of the housing which is to receive the plate-form member such that each end portion of the plate-form member can be held between an upper row of projections and a lower row of projections and wherein the plate-form member can be integrated by being inserted between the upper and lower rows of projections only from one direction with respect to the portion of the housing which is to receive the plate-form member.

The shaped resin article according to the sixth aspect of the invention is a magnetic tape cassette having a base with an opening and a window member made of a transparent material which is to be fitted into the opening in the base, characterized in that vertically offset projections are provided on each of the opposed sides of the opening in the base such that each end portion of the window member can be held between an upper row of projections and a lower row of projections and that the window member can be integrated by being inserted between the upper and lower rows of projections only from one direction with respect to the opening in the base.

In order to attain the primary objective described above, according to a seventh aspect of the invention, there is provided a magnetic tape cassette having:

a base with an opening for forming a transparent window;

and a transparent material-made window member to be installed in the opening, wherein the window member is installed within the opening and a manipulating engaging portion effective in the step of separating the transparent window is provided on the window member or in that area of the base which contacts the window member.

While the manipulating engaging portion may be provided in various areas, it is preferably in an end portion of the window member.

The manipulating engaging portion may be provided in various forms but it is preferably a groove that is provided in the base as an aid in dislodging an engaging means.

In order to attain the fourth objective of the invention, according to an eighth aspect of the invention, there is provided a magnetic tape cassette having:

a base with one or more openings for forming transparent windows; and one or more transparent resin-made window members to be installed in the one or more openings, wherein the window member is made of a biodegradable resin and fitted within at least one of the one or more openings in the base.

In order to attain the fifth objective of the invention, according to a ninth aspect of the invention, there is provided a method for destructing, separating and recovering two or more parts of a shaped resin article which have been molded of dissimilar materials, wherein one of the parts to be separated for recovery is provided with a specified mark in a specified position on the part which is related to the position of a gate on the part for injecting molding the part and which, if it is given an impact, becomes a start point for a crack to propagate toward the position of the gate and wherein upon application of an impact to the position of the specified mark, the parts molded of the dissimilar materials can be separated for recovery without using a special tool.

The shaped resin article is a magnetic tape cassette comprising a cassette case that has an upper half and a lower half joined together in a face-to-face relationship and which contains magnetic tape wound around a reel, characterized in that the body of the upper half serving as the base has an opening for forming a transparent window and a window member as a window constituting part made of a transparent material, the window member being provided with a specified mark in a specified position on the part which is related to the position of a gate on the part for injection molding the part and which, if it is given an impact, becomes a start point for a crack to propagate toward the position of the gate.

In each of the foregoing aspects of the invention, the base is preferably the body of the upper half and it is preferably the upper half that comprises this body and the window member.

BRIEF DESCRIPTION OF THE DRAWINGS

FIGS. 13A, 13B and 13C are schematic views illustrating the process of removing the window member according to the first aspect of the invention from the window member engaging portion of the upper half;

FIGS. 14A, 14B, 14C and 14D are perspective views showing four different shapes of the engaging member provided on lateral sides of the window member according to the first aspect of the invention;

FIG. 39 is section VII-VII of the window member of the transparent window shown in FIG. 37;

FIG. 40 is a sectional view of the window member shown in FIG. 39 as it is joined temporarily after having been inserted into grooves in the upper half;

FIG. 41 is a sectional view of the secure joint formed by ultrasonic or thermal welding of the temporary joint shown in FIG. 40;

FIG. 42 is a perspective view showing in section a transparent window in the upper half of a magnetic tape cassette according to another example of the second aspect of the invention;

FIG. 43 is a fragmentary perspective view showing the upper half of a magnetic tape cassette according to a first embodiment of the third aspect of the invention;

On the following pages, the magnetic tape cassette of the present invention, the process for its manufacture, the shaped resin article, the method for multi-color molding of resin products and the method for destructing and separating parts made of dissimilar materials are described in detail with reference to the preferred examples shown in accompanying drawings.

First, we refer to FIGS. 1-8 and describe the magnetic tape cassettes according to the fifth aspect of the invention, particularly its first embodiment.

Figure 1:
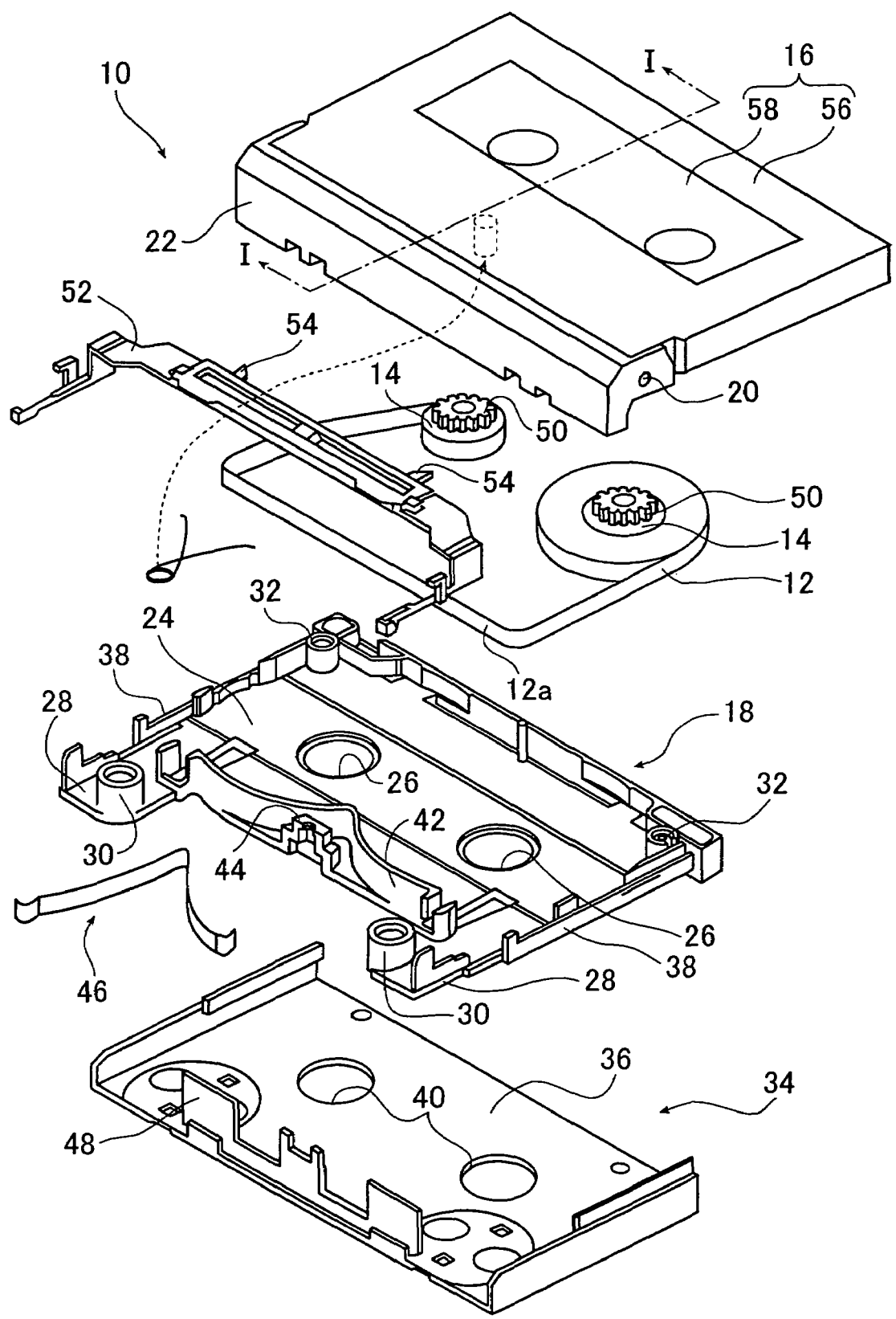
FIG. 1 is an exploded perspective view showing a magnetic tape cassette according to an example of a first embodiment of the fifth aspect of the present invention.
Figure 2:
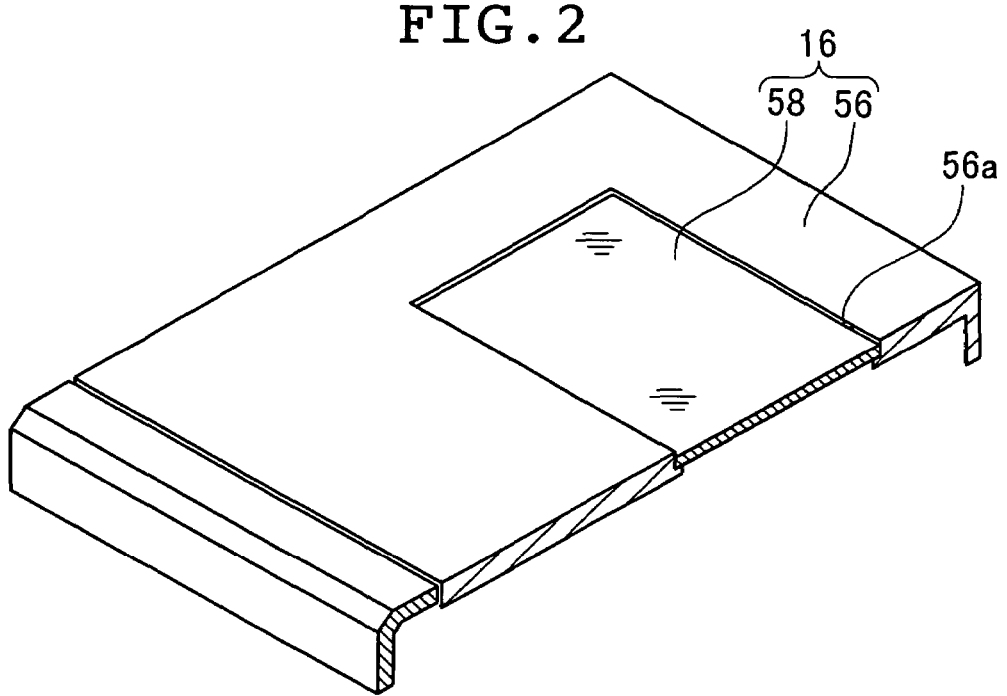
FIG. 2 is a perspective view showing in section the upper half of the magnetic tape cassette of FIG. 1 as it is cut through the transparent window along line I-I.
Figure 3:
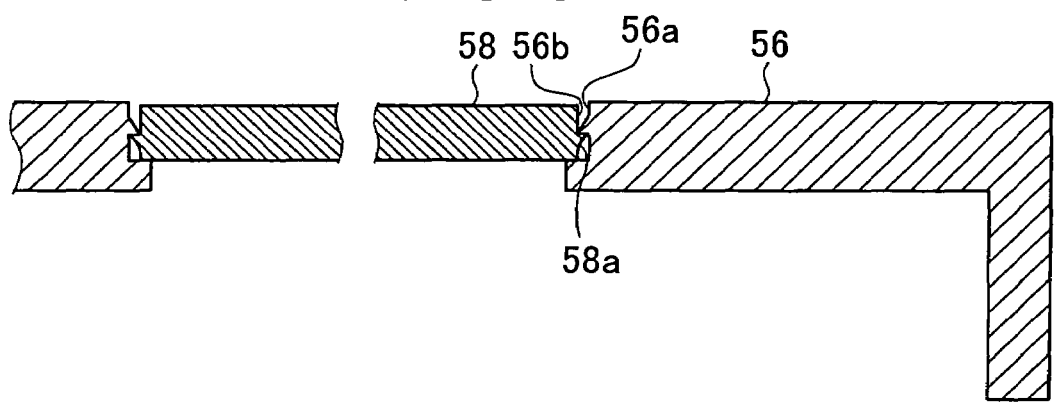
FIG. 3 is a partial section of the upper half shown in FIG. 2.
Figure 4A:
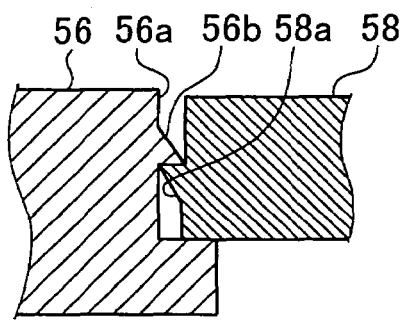
FIG. 4A is a partial enlarged sectional view showing how a wedge-shaped projection on the body of the upper half shown in FIG. 3 is in engagement with a wedge-shaped projection on the window member.
Figure 4B:
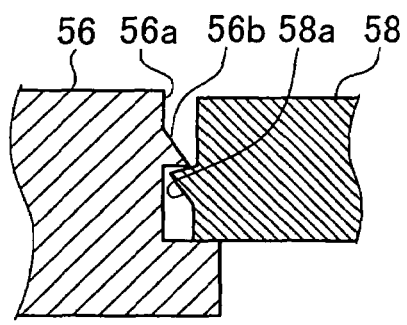
FIG. 4B is a partial enlarged sectional view showing a modification of the case shown in FIG. 4A.

FIG. 1 is an exploded perspective view of a magnetic tape cassette with a transparent window according to a first example of the first embodiment of the fifth aspect of the invention. FIG. 2 is a perspective view showing in section the upper half of the magnetic tape cassette of FIG. 1 as it is cut through the transparent window along line I-I. FIG. 3 is a partial section of the upper half shown in FIG. 2. FIGS. 4A and 4B are partial enlarged sections showing two examples of the engagement between a first wedge-shaped projection on the body of the upper half (hereunder sometimes referred to as the base) and a second wedge-shaped projection on a window member.

The magnetic tape cassette with the transparent window according to the first example of the first embodiment of the fifth aspect of the invention is generally indicated by 10 in FIG. 1. As shown, a length of magnetic tape 12 is securely attached to a pair of take-up hubs 14, 14 at its ends and the remainder of tape length is wound around the respective take-up hubs 14, 14. The pair of take-up hubs 14, 14 around which the magnetic tape 12 has been wound is placed rotatably within a cassette case which is the combination of an upper half 16 and a lower half 18. The magnetic tape 12 is threaded in a specified path to be stretched between the two hubs such that only a portion 12a of the tape that is in a position which corresponds to the magnetic head on a record/reproduce apparatus (not shown) would otherwise be exposed to the outside.

In order to cover and protect the magnetic layer of the portion 12a of the magnetic tape which would otherwise become exposed to the outside of the cassette case, the upper half 16 is fitted with a front cover (lid) 22 that is axially supported by pins 20 and capable of pivoting between two positions, the CLOSE position where it covers the portion 12a of the magnetic tape and the OPEN position where it lets the portion 12a become exposed. The lid 22 is urged toward the CLOSE position by means of a torsion coil spring (not shown).

The lower half 18 has a rectangular bottom plate 24 which in turn has reel shaft insertion holes 26, 26 in the center; the reel shaft insertion holes 26, 26 rotatably support the pair of take-up hubs 14, 14 around which the magnetic tape 12 has been wound; in addition, when the magnetic tape cassette under consideration is loaded in a record/reproduce apparatus (not shown), the reel shafts (also not shown) on the apparatus pass through the holes 26, 26 into the take-up hubs, thereby driving them to rotate.

The bottom plate 24 has two forward extensions 28, 28 at the right and left ends. The extensions 28, 28 have cylindrical tape guides 30, 30 erected vertically on the bottom late 24; the magnetic tape 12 stretched between the take-up hubs 14, 14 is guided by means of the cylindrical tape guides 30, 30 such that it is threaded in a specified path to reach the front of the cassette case. The bottom plate 24 is cut out in the area between the two extensions 28, 28, leaving an opening in the cassette case.

Positioning pins (not shown) on the upper half 16 are inserted into the tape guides 30, 30 to achieve registration. The tape guides 30, 30 also serve as screw bosses through which screws (also not shown) are pushed from below into the threaded holes in the centers of the positioning pins and tightened to hold the upper half 16 and the lower half 18 together in secure position. Screw bosses 32, 32 having a similar structure to the tape guides 30, 30 are provided in the back at right and left corners of the lower half 18. By inserting screws into these four bosses and tightening them up, the cassette halves having the magnetic tape 12 and other components installed therein are securely held together to provide the magnetic tape cassette 10.

A slider generally indicated by 34 has a thin flat bottom plate 36 that is brought into contact with the underside of the bottom plate 24 of the lower half 18. When the cassette is not in service, the bottom plate 36 closes, for dust prevention, the open areas in the underside of the cassette case, namely, the opening in the lower half 18 and the reel shaft insertion holes 26, 26. Being guided by sidewalls 38, 38 of the lower half 18, the bottom plate 36 is capable of moving back and forth to slide along the underside of the lower half 18. If it moves forward, the bottom plate 36 closes the opening in the cassette case and the reel shaft insertion holes 26, 26; if it moves backward, the bottom plate 36 clears the opening in the cassette case and, at the same time, the reel shaft insertion holes 26, 26 in the lower half 18 come into registry with reel shaft insertion holes 40, 40 in the slider 34, making the cassette case ready for insertion of the aforementioned reel shafts on the record/reproduce apparatus.

The bottom plate 24 of the lower half 18 has a mid-wall 42 curved in arched form along the magnetic tape 12 wound around the take-up hubs 14. A leaf spring mount 44 is erected in front of a recess formed at the center junction of two arched halves of the mid-wall 42; a slider spring 46 in the form of a leaf spring is inserted between the recess at the center junction of the mid-wall 42 and the leaf spring mount 44 and it pushes ribs 48 at the front of the slider 34, whereby it is urged forward (in the direction of closing the slider 34).

A gear wheel 50 is provided in the center of each take-up hub 14. A braking member 52 provided on the upper half 16 has braking tabs 54 which engage the gear wheels 50, 50 to form an anti-rotation mechanism that prevents the take-up hubs 14, 14 from rotating when the magnetic tape cassette 10 is not in service. The upper half 16 has a transparent window through which the operator can visually check the amount by which the magnetic tape 12 has been wound onto the take-up hubs 14, 14. To make the transparent window, an opening is formed in the upper half's body 56 and a window member 58 made of a transparent resin (plastic material) is fitted in this opening.

FIG. 2 is a perspective view showing in section the upper half 16 of the magnetic tape cassette 10 as it is cut through the transparent window along line I-I in FIG. 1. As shown, the transparent window in the upper half 16 consists of an opening 56a formed in the body 56 of the upper half 16 as a window and a window member 58 that is made of a transparent resin and fitted in the opening 56a.

As shown in detail in FIGS. 3 and 4, the opening 56a formed in the upper half's body 56 has a first wedge-shaped projection 56b on the inner periphery that defines the transparent window. The window member 58 is of such a shape that it can be fitted in the upper half's body 56 and it has a second wedge-shaped projection 58a on the outer periphery.

The projection 56b on the upper half's body 56 and the projection 58a on the window member 58 are both wedge-shaped, so as shown in FIGS. 4A and 4B, when the window member 58 is pressed from above into the opening 56a, the wedge-shaped projection 58a undergoing elastic deformation rides over the similarly wedge-shaped projection 56b also undergoing elastic deformation and, once the window member 58 has been fitted in the opening 56a, the two projections engage each other and the window member 58 will no longer be dislodged from the upper half's body 56. The wedge-shaped projection 56b on the upper half's body 56 and the wedge-shaped projection 58a on the window member 58 are provided intermittently in the same positions in order to ensure mutual engagement.

The window member 58 is the least likely to be dislodged from the upper half's body 56 if the two wedge-shaped projections 56b, 58a are so formed that their mating surfaces make intimate contact with each other as shown in FIG. 4A; however, due to a certain factor such as dimensional variations, positive engagement may occasionally be difficult to achieve or the window member 58 may sometimes rattle because of the failure of two projections to have intimate contact. In order to prevent these problems, at least one of the two mating surfaces may be formed at an angle as shown in FIG. 4B; this eliminates the difficulty in achieving positive engagement and prevents the window member 58 from rattling on account of the failure to have intimate contact with the upper half's body 56. The angle of inclination can be determined at an appropriate value considering several factors such as the variations in the dimensions of the wedge-shaped projection 56b on the upper half's body 56 and the wedge-shaped projection 58a on the window member 58.

According to the above-described first example of the first embodiment of the fifth aspect of the invention, one can produce a magnetic tape cassette characterized in that the window member can be easily separated from the body of the upper half, that the recovered upper half and window member can be recycled as feeds for additional products without suffering a drop in purity, and that the separating operation can be performed efficiently.

Figure 5:
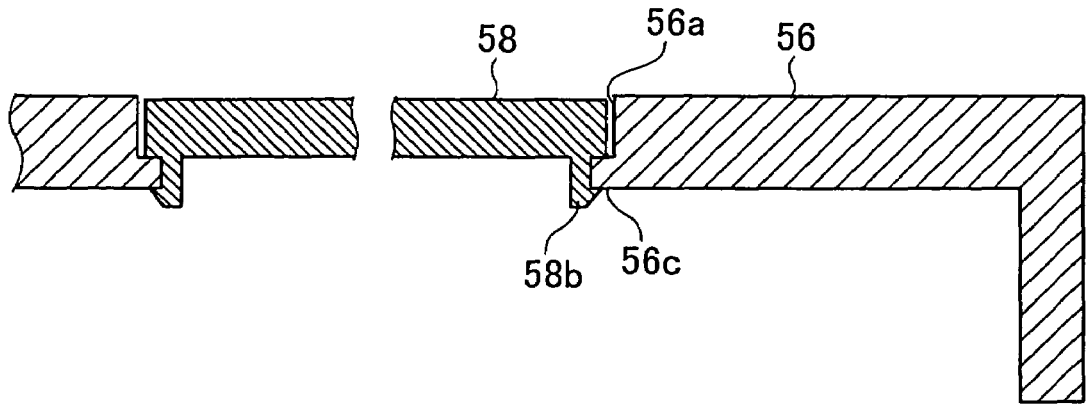
FIG. 5 is a sectional view of the upper half of a magnetic tape cassette according to another example of the first embodiment of the fifth aspect of the invention.
Figure 6A:
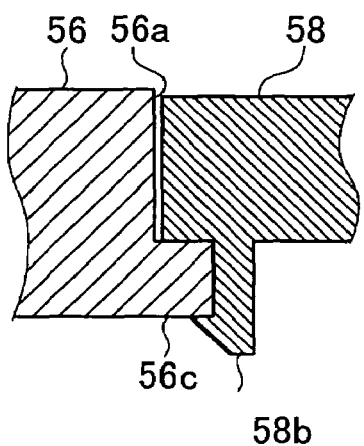
FIG. 6A is an enlarged sectional view showing how a window frame on the body of the upper half shown in FIG. 5 is in engagement with a pawl member on the window member.
Figure 6B:
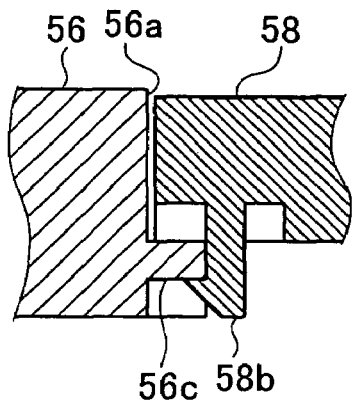
FIG. 6B is an enlarged sectional view showing a modification of the case shown in FIG. 6A.

FIG. 5 is a sectional view of the upper half of a magnetic tape cassette according to a second example of the first embodiment of the fifth aspect of the invention. FIGS. 6A and 6B are enlarged sectional views showing how a window frame on the body of the upper half is in engagement with a pawl member on the window member. The second example under consideration relates to another case of the means for bringing the window member 58 into engagement with the opening 56*a* in the upper half's body 56 of the magnetic tape cassette.

In the magnetic tape cassette under consideration, a window frame 56*c* is provided on the inner periphery of the opening 56*a* in the upper half's body 56, and an engaging pawl 58*b* which holds the window frame 56*c* by engaging its lower edge is provided on the window member 58. If the window member 58 is pressed into the opening 56*a* from above, the engaging pawl 58*b* on the window member 58 engages the window frame 56*c* on the upper half's body 56 by snap fit so that the window member 58 is installed into the opening 56*a* in the upper half's body 56.

As shown in FIGS. 6A and 6B, the engaging pawl 58*b* on the window member 58 is so shaped that when it is in engagement with the window frame 56*c* formed in the lower part of the inner periphery of the opening 56*a* in the upper half's body 56, it holds the window frame 56*c* by engaging its lower edge. Usually, the upper half's body 56 is so formed that its underside is flush with the underside of the window frame 56*c*.

In the design described above, the engaging pawl 58*b* on the window member 58 projects from the underside of the upper half's body 56. If this should be avoided, the design shown in FIG. 6B may be adopted; a groove is formed such that the underside of the window frame 56*c* is recessed from the underside of the upper half's body 56 and the mating surface of the window frame 56*c* is provided within the groove; similarly, the engaging pawl 58*b* on the window member 58 is recessed by the same distance and a suitable groove is provided around the pawl; in consequence, the engaging pawl 58*b* will not project from the underside of the upper half's body 56.

As in the first example, at least one of the mating surfaces of the window frame 56*c* and the engaging pawl 58*b* may be formed at an angle and this contributes to achieving not only positive engagement but also intimate contact between the window member 58 and the upper half's body 56.

According to the above-described second example of the first embodiment of the fifth aspect of the invention, one can produce a magnetic tape cassette characterized in that the window member can be easily separated from the body of the upper half, that the recovered upper half and window member can be recycled as feeds for additional products without suffering a drop in purity, and that the separating operation can be performed efficiently.

Figure 7:
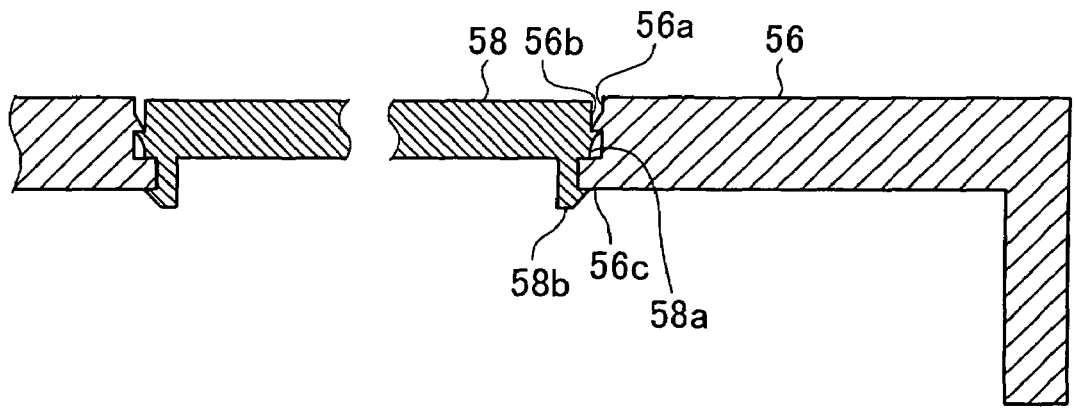
FIG. 7 is a sectional view of the upper half of a magnetic tape cassette according to yet another example of the first embodiment of the fifth aspect of the invention.

FIG. 7 relates to a third example of the magnetic tape cassette according to the first embodiment of the fifth aspect of the invention and it shows means for engaging the opening 56*a* in the upper half's body 56 with the window member 58. Briefly, in this third example, the engaging means of the first example characterized in that it holds the window member 58 by brining the wedge-shaped projection 56*b* on the inner periphery of the opening 56*a* in the upper half's body 56 into engagement with the wedge-shaped projection 58*a* on the outer periphery of the window member 58 is combined with the second example in which the window member 58 is held by the engaging pawl 58*b* on the window member 58 which applies to snap fit the window frame 56*c* formed in the lower part of the opening 56*a* in the upper half's body 56.

Figure 8:
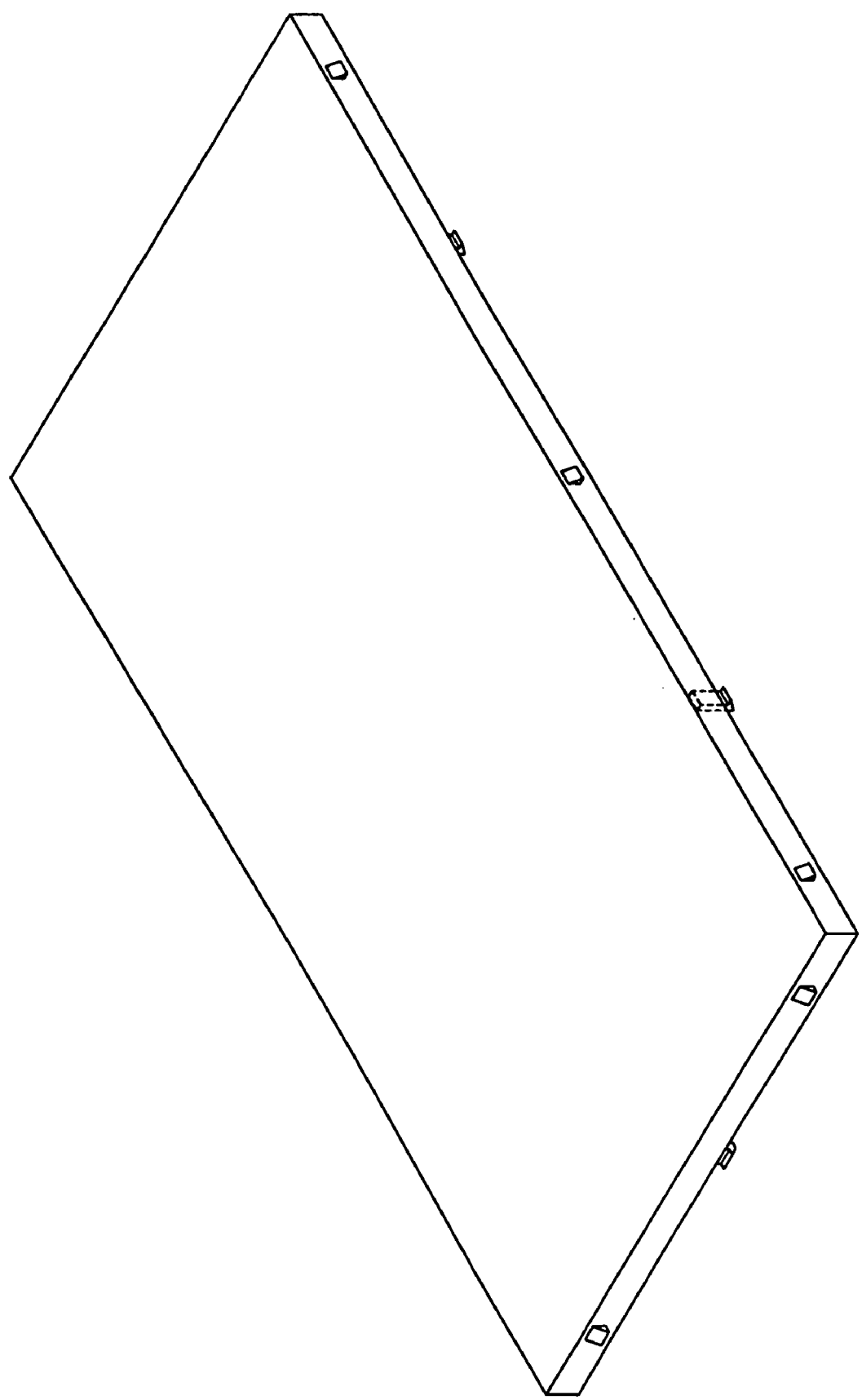
FIG. 8 is a perspective view of the window member in the example shown in FIG. 7.

In FIG. 7, the wedge-shaped projection 58*a* and the engaging pawl 58*b* that are formed on the outer periphery of the window member 58 are shown to overlap in the same position. In fact, however, the wedge-shaped projection 58*a* and the engaging pawl 58*b* are desirably distributed in different positions on the outer periphery of the window member 58 as shown in FIG. 8 which is a perspective view of the window member 58. By adopting the design of the third example, the advantages of both the first and second examples are retained and one can fabricate a magnetic tape cassette having a transparent window that has even better fit to the body of the upper half of the cassette.

Described above are the basic features of the design of the magnetic tape cassette according to the first embodiment of the fifth aspect of the invention.

We next describe the magnetic tape cassette according to the first aspect of the invention with reference to FIGS. 9-17.

The magnetic tape cassette according to the first aspect of the invention is characterized in that the transparent window is provided in the upper half of the cassette by pressing the window member into the opening in the base (the body of the upper half) at an angle until it is fixed in position. Except for the mechanism by which the window member forming the transparent window in the upper half is fitted into the opening in the body of the upper half and fixed in position, the magnetic tape cassette according to the first aspect of the invention has essentially the same construction as the one shown in FIG. 1; therefore, on the following pages, we describe only this mechanism in detail and omit the description of other parts.

Figure 9:
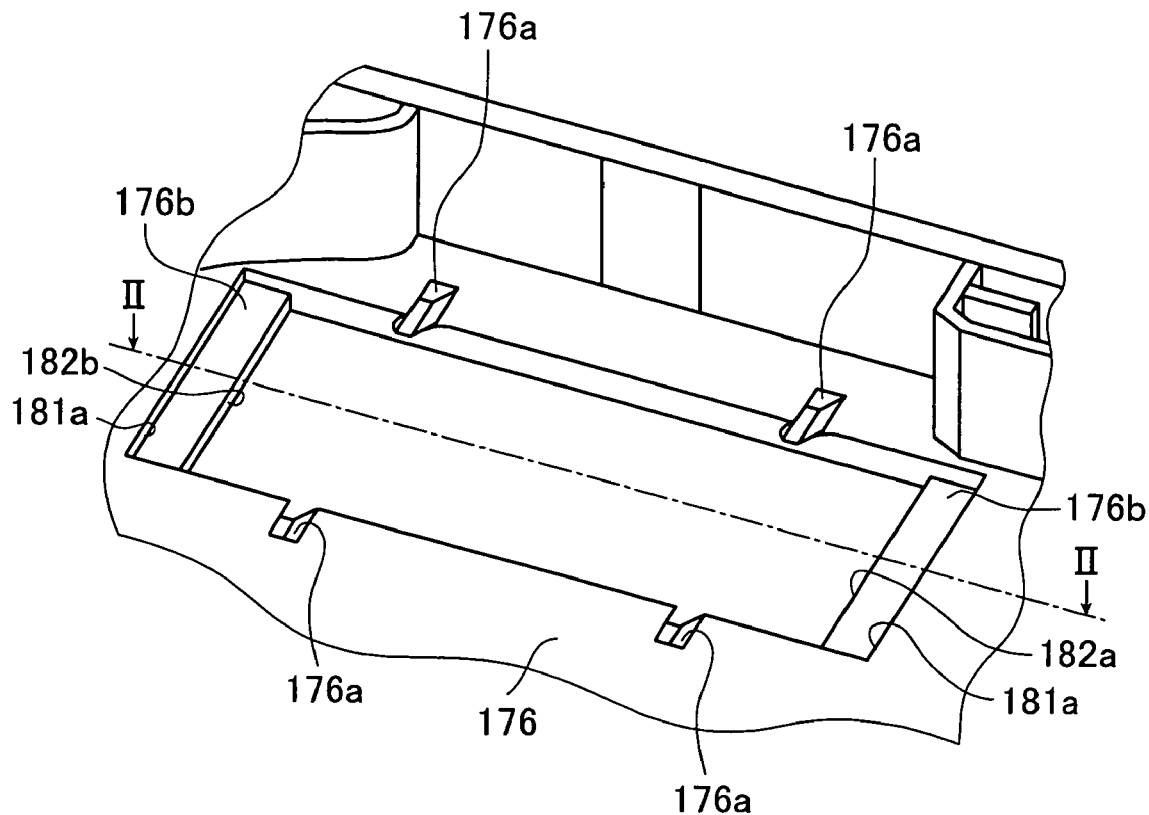
FIG. 9 is a partial enlarged perspective view of a window member engaging portion provided in the upper half of a magnetic tape cassette according to one example of the first aspect of the invention.
Figure 10:
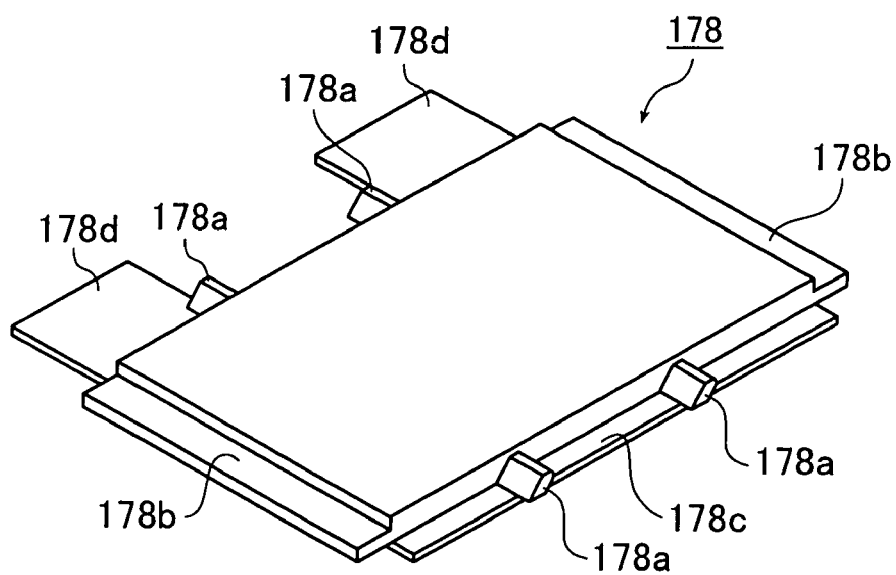
FIG. 10 is a perspective view of a window member having an engaging member that is engaged by the window member engaging portion of the upper half shown in FIG. 9.

FIG. 9 is an enlarged perspective view of an example of a window member engaging portion provided in the upper half of a first embodiment of the magnetic tape cassette according to the first aspect of the invention. FIG. 10 is a perspective view of an example of a window member having engaging members that are to be engaged by the window member engaging portion on the upper half which is shown in FIG. 9.

The window member generally indicated by 178 in FIG. 10 has engaging members 178*a* on a set of two opposed sides and dust-proof stepped portions 178*b* on the other set of two opposed sides. The two sides of the window member 178 on which the engaging members 178*a* are provided are rendered dust-proof by means of a dust-preventing flange 178*c*. The top surface of FIG. 10 shall face outward of the upper half of the magnetic tape cassette.

Part of the dust-preventing flange 178*c* is extended across the window member 178 to provide areas (178*d*) by means of which reel springs which depress the tape winding reels toward the lower half can be held between the areas 178*d* and the upper half as the window member 178 is fitted into the opening in the upper half's body 176.

The window member engaging portion of the upper half's body 176 which is shown in FIG. 9 corresponds to the window member 178 and in that portion (i.e., around the opening in the upper half's body 176) are formed engaging grooves 176*a* that come into engagement with the engaging members 178*a* on the window member 178, as well as stepped portions 176*b* that correspond to the stepped portions 178*b*. The engaging members 178*a* engage the engaging grooves 176*a* and the stepped portions 178*b* come into engagement with the stepped portions 176*b*, thereby achieving effective engagement between the window member 178 and the upper half's body 176 while securing against the entrance of dust into the upper half.

The mechanism for achieving engagement between the window member engaging portion and the window member that are respectively shown in FIGS. 9 and 10 is such that the engaging members 178*a* on the window member 178 are slid along the inner surfaces of the upper half's body 176 into the engaging grooves 176*a* in the window member engaging portion shown in FIG. 9, with the angles of inclination being in registry, and a force is applied in the same direction, whereupon the window member 178 is brought into engagement with the window member engaging portion of the upper half's body 176. As will be described later, at the final stage of this engaging action, the stepped portions 178*b* of the window member 178 will fit to the stepped portions 176*b* of the window member engaging portion of the upper half's body 176 in a substantially vertical direction.

The above-described action for engaging the window member in the example under consideration may be regarded as consisting of two stages and in spite of the relatively easy fitting action, the window member engaging portion can realize a strong enough fit and, in addition, in order to separate the window member from the upper half, the user must first apply a vertical force to cancel the engagement between the stepped portions and only thereafter does he cancel the engaging members and the engaging grooves by applying a force at a specified angle. This is indeed a measure that secures utmost safety.

Figure 11:
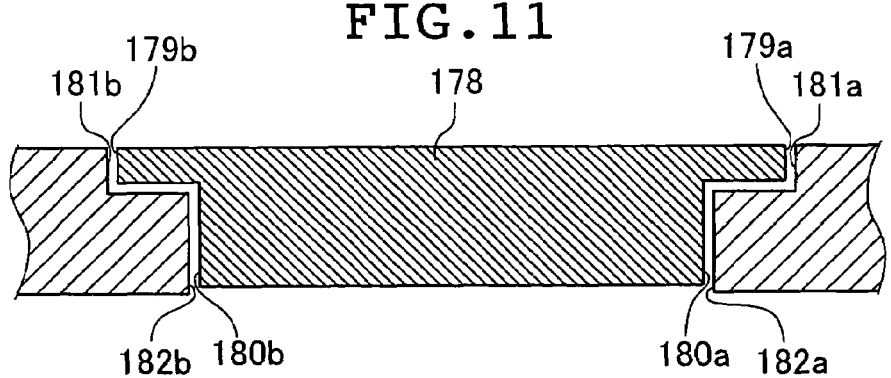
FIG. 11 is a section of the window member and the window member engaging portion of the upper half as it is taken along the imaginary center line in FIG. 9.

A more specific description is given below with reference to FIG. 11 which shows in section the engagement between the window member engaging portion of the upper half's body 176 and the window member 178 as it is cut through FIG. 9 along the imaginary line II-II. As shown in detail in FIG. 11, the window member 178 in engagement with the window member engaging portion of the upper half's body 176 is such that stepped sides 179*a*, 179*b* of the window member 178 (in the upper part) abut stepped sides 181*a*, 181*b* of the window member engaging portion of the upper half's body 176 (in the upper part) whereas stepped sides 180*a*, 180*b* of the window member 178 (in the lower part) abut stepped sides 182*a*, 182*b* of the window engaging portion of the upper half's body 176 (in the lower part), whereupon the window member 178 is positioned exactly with respect to the upper half's body 176 (particularly to the window member engaging portion).

As already mentioned, it is basically at a specified angle that the window member 178 can be removed from the upper half's body 176 (particularly from the window member engaging portion). However, the horizontal component of a force applied at an angle is constrained by the above-mentioned abutting sides, so the window member 178 must first be depressed in a vertical direction from the outer surface of the upper half (from below in FIG. 11) in order to remove the constraint and then a force is applied at the specified angle in order to remove the window member 178 from the upper half's body 176.

Figure 12A:
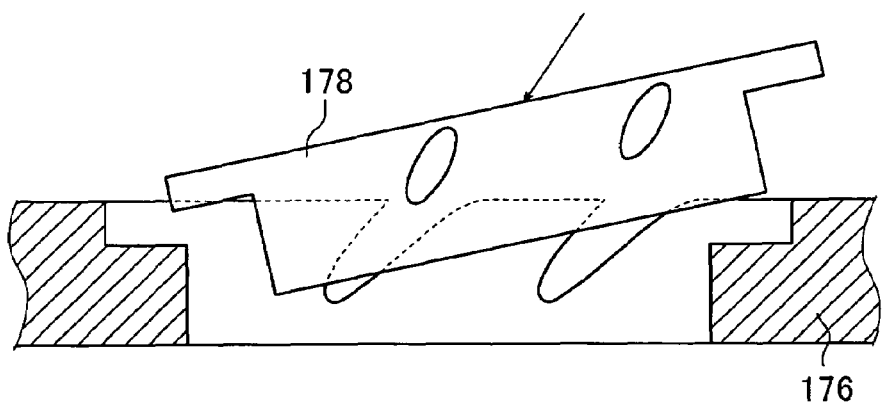
FIGS. 12A, 12B and 12C are schematic views illustrating the process of fitting the window member according to the first aspect of the invention into the window member engaging portion of the upper half.
Figure 12B:
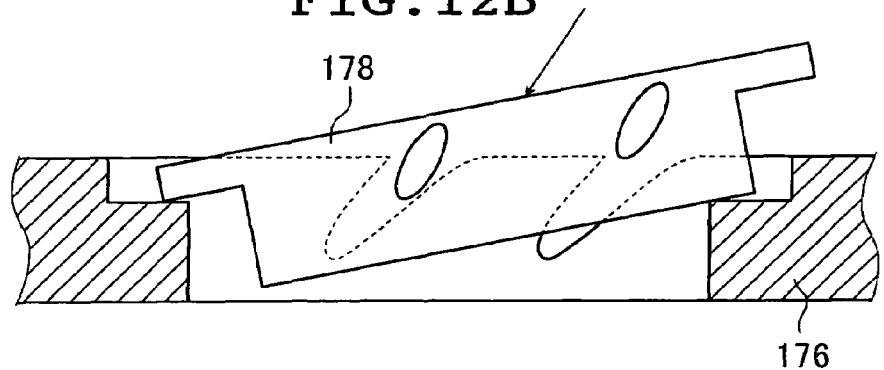
Figure 12C:
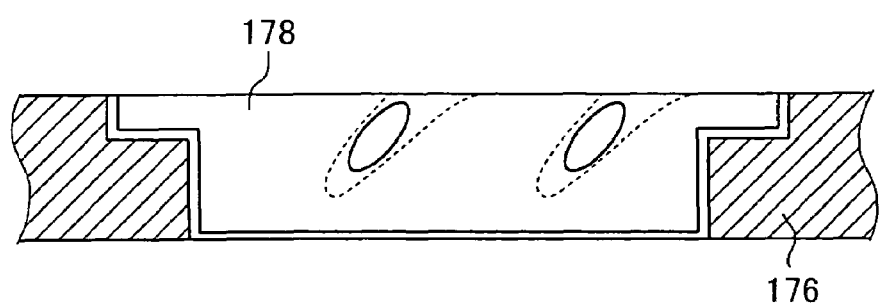

FIGS. 12A-12C show schematically how the window member 178 is fitted in the window member engaging portion of the upper half's body 176.

As shown, in the example under consideration, the window member 178 may be fitted at a specified angle into the window member engaging portion of the upper half's body 176 in successive steps.

FIGS. 13A-13C show schematically how the window member 178 is removed from the window engaging portion of the upper half's body 176.

As shown in FIG. 13A, in order to remove the window member from the window member engaging portion, one end of the window member 178 is pushed up vertically and then as shown in FIGS. 13B and 13C, it may be pulled up at the same specified angle as when it was fitted in the window member engaging portion.

It should be noted that as an ancillary to the action of fitting the window member 178, the stepped portions 178*b* of the window member 178 engage the stepped portions 176*b* to provide a dust-proof structure for part of the area around the window member 178. The flange 178*c* of the window member 178 also provides a dust-proof structure for the remaining part of the area around the window member 178 (i.e., for the sides where the engaging members 178*a* are present).

FIGS. 14A-14D show four examples of the shape of the engaging member 178*a* to be provided on two sides of the window member 178. FIG. 14A shows a most common type of a rectangular cross section that is rounded at both ends; FIG. 14B is similar to FIG. 14A except that both sides are chipped to give an oval shape that is easier to fit in; FIG. 14C is a variant of FIG. 14B which is further tapered at the insertion end; FIG. 14D shows a shape which is much easier to fit in since it need be fitted in by a very short length.

The magnetic tape cassette according to the first aspect of the invention has the above-described construction, so when it is in service, the engaging members 178*a* on the window member 178 remain in engagement with the engaging grooves 176*a* in the inner surfaces of the opening in the upper half's body 176 and, at the same time, the stepped portions 176*b* on the inner surfaces of the opening in the upper half's body 176 are in intimate contact with the stepped portions 178*b* of the window member 178 and no practical problems will occur in terms of joint strength and air-tightness.

In the examples shown in FIGS. 9 and 10, the angle at which the engaging members 178*a* on the window member 178 engage the engaging grooves 176*a* in the inner surfaces of the opening in the upper half's body 176 is not given an exact definition but a preferred range is typically from about 10 to 45 degrees with the normal. The direction of inclination is preferably parallel to a longitudinal direction of the upper half's body 176.

Figure 15:
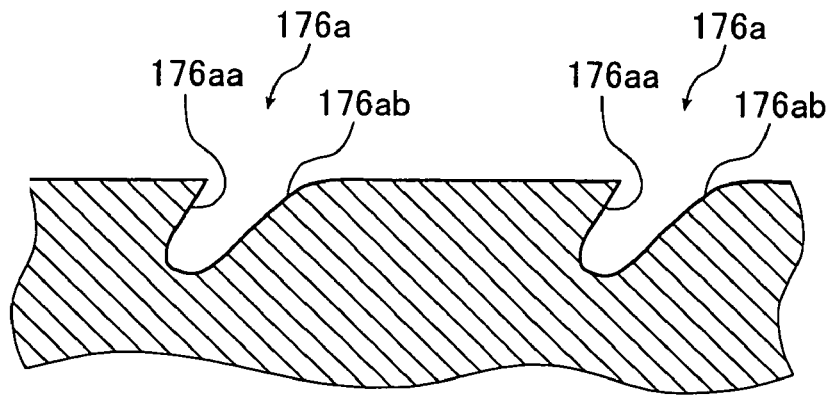
FIG. 15 is a sectional view showing further details of the engaging grooves in the window member engaging portion of the example shown in FIG. 9.

FIG. 15 shows further details of the engaging grooves 176*a* in the window member engaging portion of the upper half's body 176 according the example shown in FIG. 9. As shown, the entrance 176*ab* of each engaging groove 176*a* (on the right side in FIG. 15) is preferably shaped to have a somewhat gentle lead so that the engaging member 178*a* on the window member 178 can be easily inserted. Conversely, the exit 176*aa* of each engaging groove 176*a* (on the left side in FIG. 15) is preferably shaped to maintain a predetermined sharp angle so that the inserted engaging member 178*a* will not be easily dislodged under a depressing force applied from a near-vertical direction.

Figure 16A:
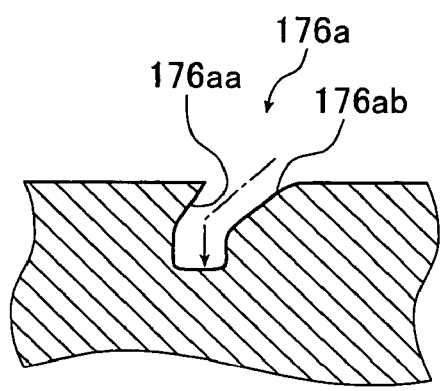
FIGS. 16A and 16B are sectional views showing details of two additional examples of the engaging grooves in the window member engaging portion of the body of the upper half according to the first aspect of the invention.
Figure 16B:
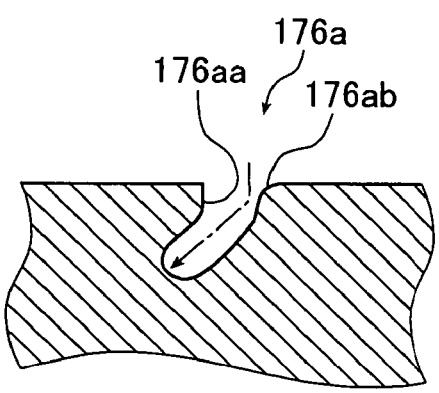

FIGS. 16A and 16B are sectional views showing details of another example of the engaging grooves 176*a* in the window member engaging portion of the upper half's body 176. The shape of the engaging groove shown in FIG. 16A is effective in the case of using an engaging member of the type shown in FIG. 14D which has a generally circular cross section, namely, one having a short length in the direction in which it is to be fitted in. After the engaging member is fitted at a specified angle into the groove 176*a* shown in FIG. 16A, the window member is preferably moved downward by a small amount in the vertical direction.

The shape of the engaging groove shown in FIG. 16B is also effective in the case of using an engaging member having a short length in the direction in which it is to be fitted in. Preferably, the engaging member is first moved downward vertically by a small amount and then it is fitted into the groove 176*a* at a specified angle.

The engaging grooves 176*a* in the window member engaging portion may adopt various other shapes including the combination of the shapes shown in FIGS. 16A and 16B.

Figure 17:
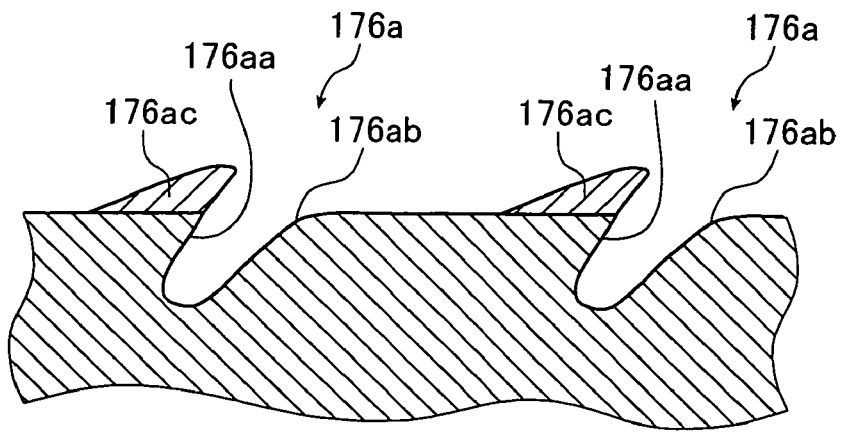
FIG. 17 is a sectional view showing details of yet another example of the engaging grooves in the window member engaging portion of the body of the upper half according to the first aspect of the invention.

FIG. 17 shows still another example of the shape of the engaging groove 176*a* in the window member engaging portion of the upper half's body 176 and the nearby area. In the example shown, the exit 176*aa* of each engaging groove 176*a* is further extended to form an extension 176*ac*, thus providing a more positive engagement between the window member 178 and the upper half's body 176.

The invention is by no means limited to the foregoing examples and engaging pawls of other structures may of course be adopted. It should also be understood that the same concept can equally be applied to various types of transparent window that are provided in other models of magnetic tape cassette as an aid in visual check of its interior.

Consider, for example, the engaging members 58a that are provided two each on the right and left sides of the window member 58 in the foregoing examples. This is not the sole case of the invention and as long as they are provided at least one each on the right and left sides of the window member 58, their number can appropriately be determined depending upon various factors including the size of the magnetic tape cassette and the size of the window. This is also the case for the width and depth of the stepped portions 58b provided on the window member 58 and the stepped portions 56b provided on the upper half's body 56.

Described above is the basic structural features of the first aspect of the invention.

Figure 18:
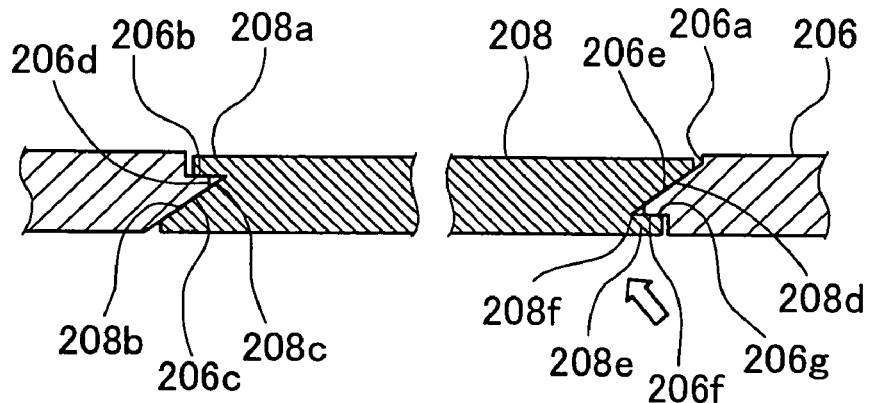
FIG. 18 is a sectional view of a transparent window portion of the upper half according to a first example of a second embodiment of the fifth aspect of the invention.
Figure 19:
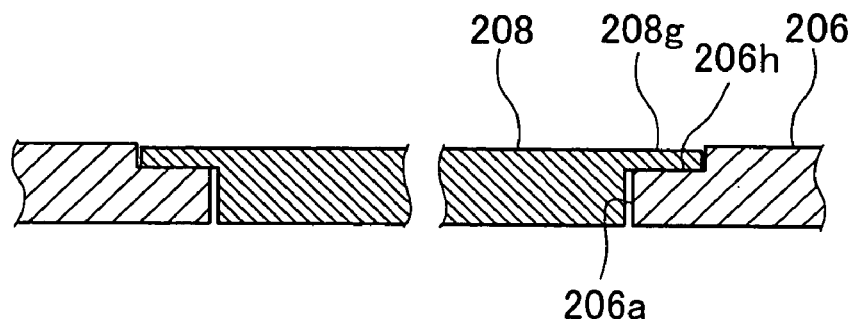
FIG. 19 is a section of the same transparent window except that it is taken through a plane perpendicular to the plane through which FIG. 18 was taken.
Figure 20:
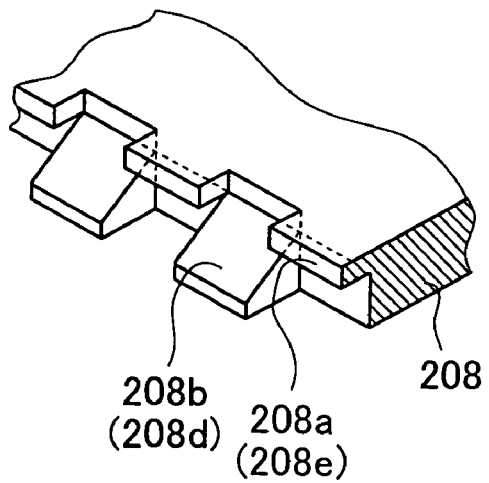
FIG. 20 is a perspective view showing details of a portion of the upper half into which the transparent window is to be fitted according to a second example of the second embodiment of the fifth aspect of the invention.

We next describe the magnetic tape cassette according to the second embodiment of the fifth aspect of the invention with reference to FIGS. 18-20.

Except for the structure of the transparent window in the upper half, the magnetic tape cassette according to the second embodiment of the fifth aspect of the invention has essentially the same construction as the one shown in FIG. 1; therefore, on the following pages, we describe only the structure of the transparent window in detail and omit the description of other parts.

FIG. 18 shows an example of the transparent window in the cassette case according to the second embodiment of the fifth aspect of the invention and it is a section taken through the transparent window in the upper half in a longitudinal direction. FIG. 19 is a section of the same transparent window which is taken in a transverse direction perpendicular to the longitudinal direction. As is clear from these figures, the transparent window in the upper half consists of an opening 206a formed as a window in the upper half's body 206 and a window member 208 that is formed of a transparent resin and which is fitted in the opening 206 to close it.

As shown in FIG. 18 (which is a section of the transparent window taken in the longitudinal direction), the joint between the opening 206a in the upper half's body 206 and the window member 208 has such a cross-sectional shape that a V-shaped projection joins to a correspondingly V-shaped recess at either end of their length. More specifically, the left end of the opening 206a in the upper half's body 206 is of such a cross-sectional shape that it has a recess 206b made in the upper surface, with a surface 206c below the recess 206b inclining downward to the left, so that a V-shaped projection 206d is defined by the bottom of the recess 206b and the inclined surface 206c.

The term "V-shaped" as used herein refers to a state where two planes are opposed at an angle, at least one of which is parallel to the upper and lower surfaces of the upper half's body whereas the other plane forms a specified angle with the one plane. The specified angle refers to a range of angles over which smooth fitting can be accomplished upon pressing and the preferred value is typically at least 30 degrees.

The left end of the window member 208 which is to be fitted into the opening 206a in the upper half's body 206 has a cross-sectional shape that corresponds to the above-described cross-sectional shape of the left end of the opening 206a in the upper half's body 206. Stated specifically, the upper surface forms a flange 208a that is to be fitted into the recess 206b in the upper half's body 206 and below this flange is provided an inclined surface 208b that corresponds to the inclined surface 206c of the upper half's body 206; the lower surface of the flange 208a and the inclined surface 208b combine to form a V-shaped recess 208c which corresponds to the V-shaped projection 206d on the upper half's body 206.

The right end of the opening 206a in the upper half's body 206 has a cross-sectional shape which is an inversion of the cross-sectional shape of the left end. Stated specifically, the upper side of the opening 206a in the upper half's body 206 has an inclined surface 206e and the lower side has a recess 206f, thereby forming a V-shaped projection 206g. The right end of the window member 208 is of such a cross-sectional shape that the upper side has an inclined surface 208d that corresponds to the inclined surface 206e of the upper half's body 206 and below this flange is provided a flange 208e that is to be fitted into the recess 206f in the upper half's body 206, thus forming a V-shaped recess 208f which corresponds to the V-shaped projection 206g on the upper half's body 206. As shown in FIG. 19, a section of the transparent window at each of the joints to the upper half's body 206 as it is taken in a transverse direction perpendicular to the length has such a cross-sectional shape that a recess 20h is provided in the upper surface of the upper half's body 206 around the opening 206a and the flange 208g of the window member 208 is fitted into the recess 206h.

As described above, the joints between the opening 206a in the upper half's body 206 and the window member 208 have such a cross-sectional shape that two sets of inclined V-shapes are combined together. In order to install the window member 208 into the opening 206a in the upper half's body 206, one may simply combine the V-shapes on the left side and press them down with great force, whereupon the projection 206g and the flange 208e deform elastically, allowing the window member 208 to be easily fitted into the opening 206a in the upper half's body 206.

Once the window member 208 has been fitted to the upper half's body 206, the V-shaped projection 206d on the upper half's body 206 comes into intimate contact with the V-shaped recess 208c in the window member 208 and the V-shaped projection 206g on the upper half's body 206 comes into intimate contact with the V-shaped recess 208f in the window member 208 (see FIG. 18 which shows both ends of the transparent window sectioned in the longitudinal direction) and, in addition, the flange 208g of the window member 208 is brought into intimate contact with the recess 206h in the upper surface of the upper half's body 206 around the opening 206a (see FIG. 19 which shows a cross-sectional shape of the transparent window as it is cut in a transverse direction perpendicular to the length). The resulting upper half is not only adequately air-tight, it also has sufficient strength against external forces (applied from above in the case shown in FIGS. 18 and 19).

In order to separate the window member 208 from the upper half's body 206 when the magnetic tape cassette is discarded after use, one may push the right end of the window member 208 by applying a strong force from the inside (from below as indicated by the arrow in FIG. 18) in a direction facing upward to the left, whereupon the flange 208g of the window member 208 comes out of engagement with the V-shaped projection 206g on the upper half's body 206, permitting the window member 208 to be separated from the upper half's body 206 without breaking. If desired, a mark easily recognizable by the user or scrapper, as exemplified by PUSH, or an arrow designating the direction of depressing the window member 208 may be set off in the appropriate position and this helps provide a more positive way to designate the method of separating the two components.

FIG. 20 shows a second example of the second embodiment of the fifth aspect of the invention, in which the window member 208 has the flange 208a (208e) and the V-shaped recess 208c (208f) provided alternately in an intermittent manner. This design eliminates the possibility for undercuts to form in the mold for shaping the window member 208 and the mold design is rendered simple enough to permit more economical fabrication of the window member 208. Needless to say, if the design shown in FIG. 20 is adopted, the recesses 206b and 206f in the upper half's body 206 around the opening 206a, as well as the V-shaped projections 206d and 206g on the upper half's body 206 around the opening 206a desirably have shapes corresponding to the flange 208a (208e) and the V-shaped recess 208c (208f) in order to permit the fabrication of seemingly more excellent magnetic tape cassettes (having better external appearance). It should be noted here that the V-shape suffices to be provided in at least one position and it need not be provided across the entire width of the window.

Described above is how the transparent window of the magnetic cassette case according to the second example of the second embodiment of the fifth aspect of the invention is constructed. Unlike the prior art window which is fabricated by merely fitting the window member into the opening in the upper half's body and later welding them together, the areas in which the window member is joined to the upper half's body around the opening in it are formed to have an inclined V-shape in cross section, so the two components can be assembled without welding and the window member once fitted into the upper half's body is substantially immobile. The resulting upper half is not only adequately air-tight, it also has sufficient strength against external forces.

In order to separate the window member from the upper half's body when the magnetic tape cassette is discarded after use, one may push the window member from the inside (from below) upward at an angle, whereupon it can be separated from the opening in the upper half's body without breaking.

Described above are the basic features of the magnetic tape cassette according to the second embodiment of the fifth aspect of the invention.

We now describe a shaped resin article according to the sixth aspect of the invention with reference to FIGS. 21-28.

On the pages that follow, the shaped resin article according to the sixth aspect of the invention is described in detail by reference to a typical example, i.e., a magnetic tape cassette with a transparent residual tape check window that is integrated as an easily separable component. Needless to say, this is not the sole example of the invention.

Figure 21:
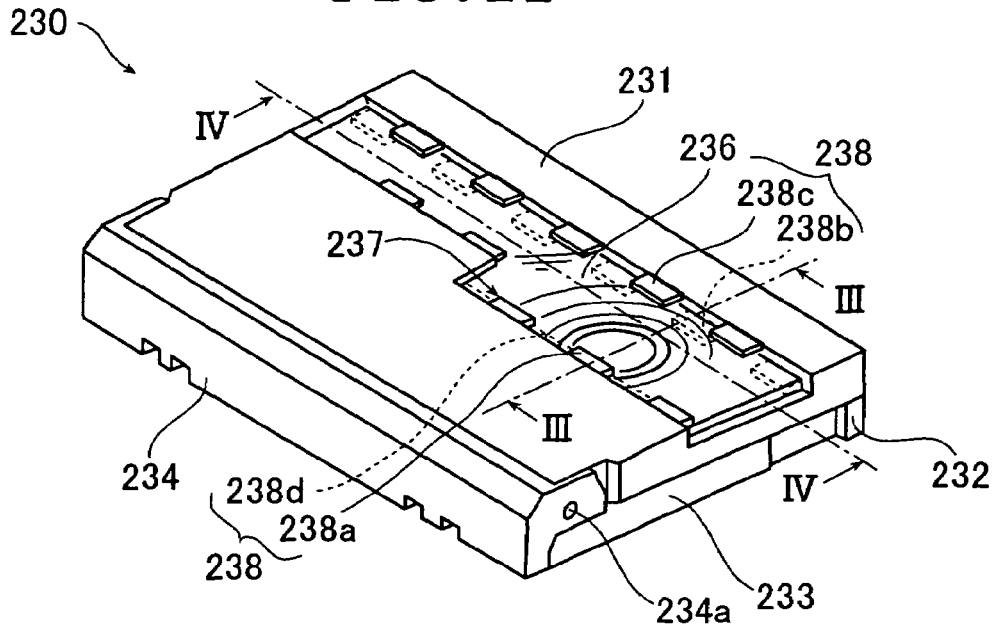
FIG. 21 is a perspective view showing diagrammatically an example of the magnetic tape cassette according to the sixth aspect of the invention.

FIG. 21 shows an example of the magnetic tape cassette according to the sixth aspect of the invention. As shown, the magnetic tape cassette generally indicated by 230 comprises an upper half 231 and a lower half 232 that combine to form a housing (cassette case). A slider 233 is fitted on the lower surface of the lower half 232 and a lid 234 is provided at the front face of the cassette (closer to the viewer of FIG. 21). Again, those parts of the magnetic tape cassette which are not shown in FIG. 21 are identical to the corresponding parts of the magnetic tape cassette shown in FIG. 1 and, hence, will not be described below in detail.

The housing of the magnetic tape cassette 230 contains a length of magnetic tape wound around a pair of take-up hubs. The user of the magnetic tape cassette 230 may occasionally find it necessary to check the residual amount of tape after unloading it from the deck (not shown). To this end, a transparent window member 236 (hereunder referred to simply as a window 236) is provided in a window receiving portion (a window member receiving area) 237 of the upper half 231 in such a way that it can be easily separated for recovery.

In the example under consideration, in order to facilitate the separation for recovery of the window 236, opposed sides of the window receiving portion 237 of the upper half 231 are provided with lugs 238 (238a, 238b, 238c, 238d, . . . ) for holding the window 238 between two rows of lugs, one being in the upper position and the other in the lower position, on each side. To clarify the layout and shape of the lugs 238, sections of FIG. 21 are taken along lines III-III and IV-IV and shown in FIGS. 22 and 23, respectively.

Figure 22:
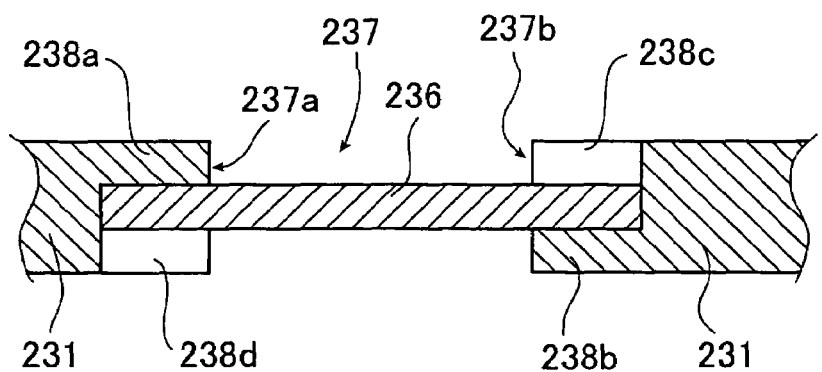
FIG. 22 is section III-III of FIG. 21.

As shown in FIG. 22, two vertically offset lugs 238a and 238b are provided on the opposed sides 237a and 237b, respectively, of the window receiving portion 237 of the upper half 231 such that the window 236 is held between the upper lug 238a and the lower lug 238b. Lugs 238c and 238d are provided in a similar way so that the window 236 is held between the upper lug 238c and the lower lug 238d.

Figure 23:
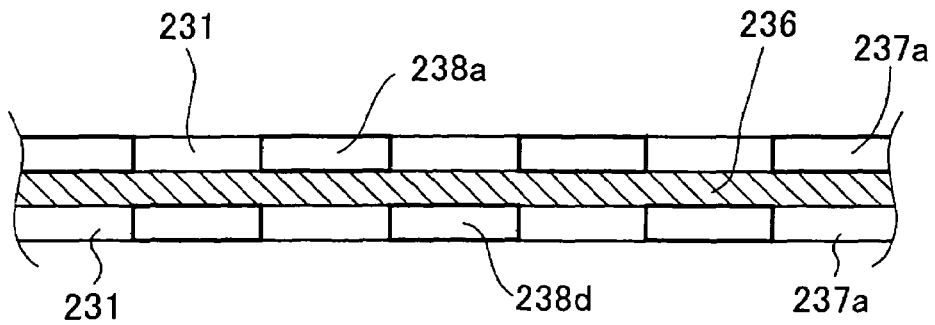
FIG. 23 is section IV-IV of FIG. 21.

As shown in FIG. 23, the lugs 238a, 238d, . . . which are provided on the side 237a of the window receiving portion 237 of the upper half 231 are vertically offset such that the window 236 is held between the upper and lower rows of lugs.

Figure 24:
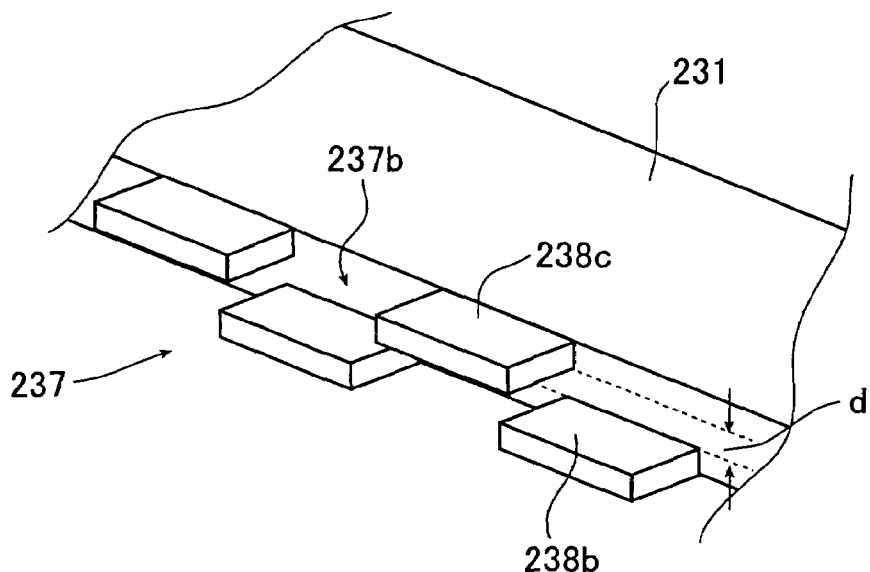
FIG. 24 is a perspective view showing enlarged a part of a window receiving portion of the upper half of the magnetic tape cassette according to the same example.

FIG. 24 is a perspective view showing enlarged the area in the neighborhood of the lugs 238b and 238c in the window receiving portion 237 of the upper half 231 shown in FIG. 21. As FIG. 24 shows, in order to ensure that the window 236 can be inserted between vertically offset lugs, the lugs 238b, 238c, . . . are provided on the side 237b of the window receiving portion 237 as they are spaced apart by a distance of d which is equal to the thickness of the window 236.

Figure 25:
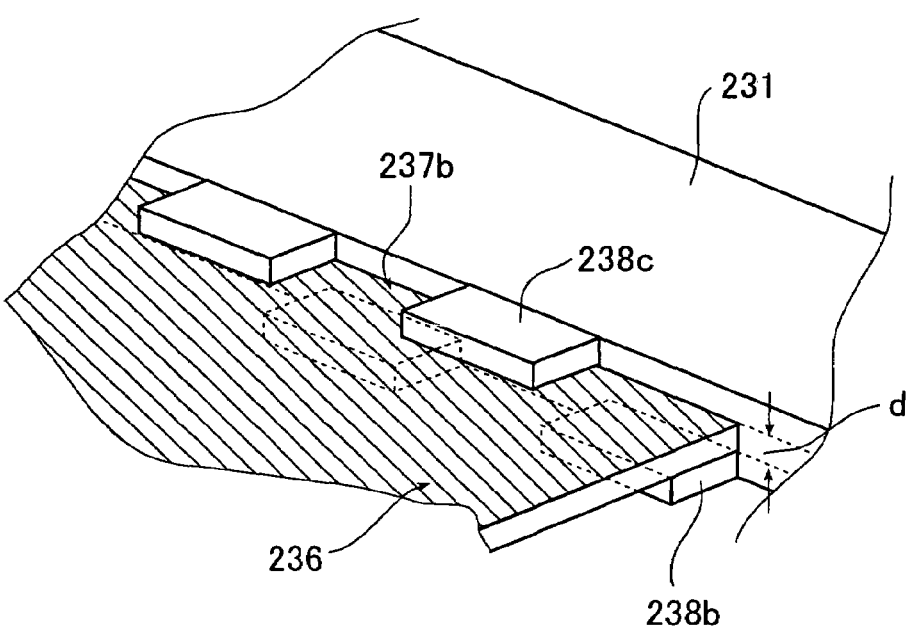
FIG. 25 is a perspective view showing the window as it has been integrated into the upper half shown in FIG. 24.

FIG. 25 shows the window 236 as it has been integrated into the window receiving portion 237 of FIG. 24. As shown, the window 236 with thickness is inserted between the lugs 238b, 238c, . . . so that it is installed in the upper half 231. If the distance d between the lugs 238b and 238c is adjusted to be a bit smaller than the thickness of the window 236, the latter is firmly secured to the upper half 231 and will not come off under small impact.

Figure 26:
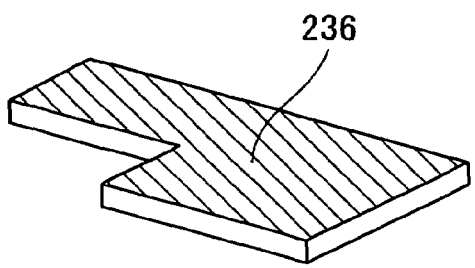
FIG. 26 is a perspective view of the window used in the same example.

The shape of the widow 236 is not limited to a simple rectangular plate. It is preferably a combination of two different sized rectangles as shown in FIG. 26 so that any two opposed sides have different lengths. If this design is adopted, the window receiving portion 237 should naturally have a shape corresponding to the shape of the window 236. To install the window 236 of the above-described shape, it is slid into the window receiving portion 237 of the upper half 231 by first pushing its shorter side in the direction indicated by the arrow A in FIG. 27.

Figure 27:
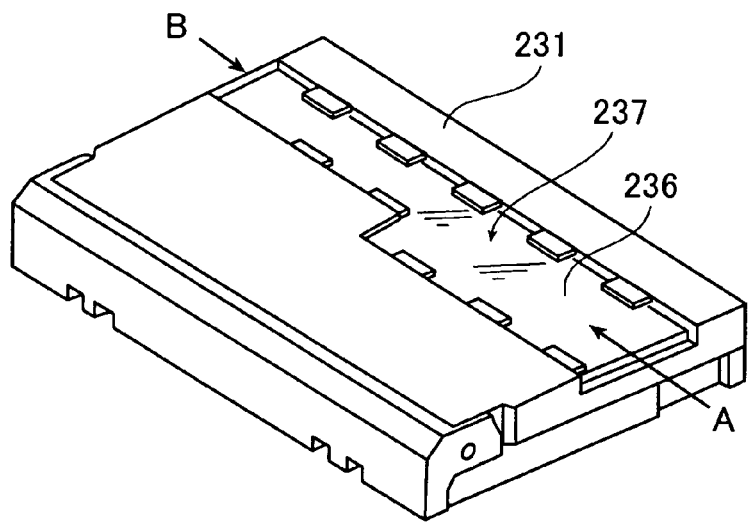
FIG. 27 is a perspective view of the magnetic tape cassette that is adapted for the method of fitting the window in the same example.

To uncouple the window 236 from the upper half 231, one may simply push the other shorter side of the window 236 in the direction indicated by the arrow B in FIG. 27, whereupon the window 236 is easily separated for recovery from the upper half 231.

Figure 28:
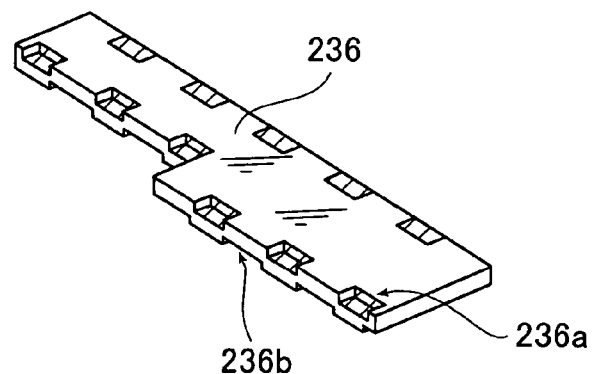
FIG. 28 is a perspective view showing a modification of the window that can be used in the same example.

The window 236 may have a uniform thickness throughout as shown in FIG. 26. Alternatively, its thickness may be somewhat larger than d which represents the gap between an upper lug and a lower lug (see FIG. 24) and, as shown in FIG. 28, shallow recesses 236a, 236b, . . . may be provided in those areas of the window 236 which correspond to the respective lugs 238. Given this design, the recesses 236a, . . . come into firm engagement with the lugs 238 and the window 236 will not be displaced laterally but can be fixed more positively to the upper half 236.

The shape of the window 236 is by no means limited to the combination of two different sized rectangles. The only requirement is that the side of the window which is first pushed into the window receiving portion 237 of the upper half 231 (in the direction of the arrow A in FIG. 27) should be longer than the opposite side (which is indicated by the arrow B) and the window 236 may be trapezoidal in shape as long as this requirement is met. In other words, the window 236 may of any shape as long as the window, being slid into the window receiving portion 237, does not pass through but stops in a predetermined position. Therefore, if the lugs 238 and the recesses (236a, . . . ) are designed to provide an engagement of reasonable strength, the shape of the window 216 may be a simple rectangle.

The window receiving portion 237 need not have such a shape that it extends from one open end of the upper half 231 to the other end in the longitudinal direction; if desired, the end of the window receiving portion 237 indicated by the arrow B in FIG. 27 may be closed rather than open. In this case, the window can be separated for recovery from the upper half 231 by simply putting a finger on the window and pushing it in a direction in which it comes off.

According to the example described above, the window can be easily installed on and uncoupled from the upper half of the magnetic tape cassette, thus permitting easy separation for recovery of the housing and the window that are made of dissimilar materials.

The foregoing description is directed to the separation for recovery of the window from the upper half of the magnetic tape cassette. By applying the same concept to shaped resin articles that are composed of parts made of dissimilar materials, such parts can be easily separated for recovery and can easily be recycled by processing at the conventional facilities.

Described above are the basic features of the sixth aspect of the invention.

We next describe a magnetic tape cassette according to a third embodiment of the fifth aspect of the invention.

Again, the magnetic tape cassette according to the third embodiment of the fifth aspect of the invention has basically the same structure as the one shown in FIG. 1, except for the structure of the transparent window in the upper half and the mechanism for installing it. Therefore, on the following pages, only the structure and installing mechanism will be described in detail and the other parts will not be discussed.

Figure 29:
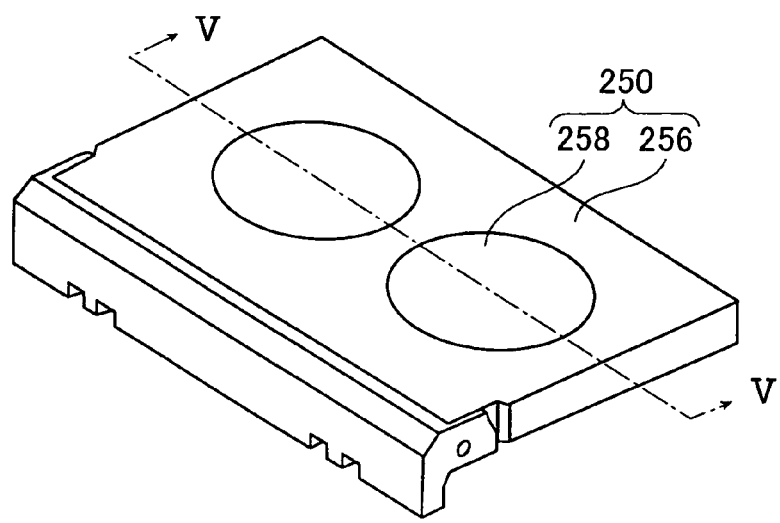
FIG. 29 is a perspective view showing the upper half of a magnetic tape cassette having two transparent windows according an example of a third embodiment of the fifth aspect of the invention.
Figure 30:
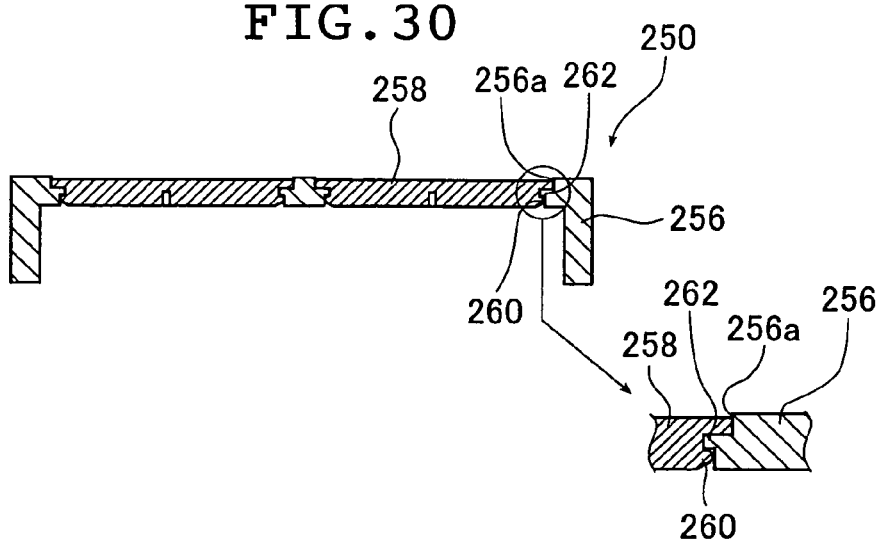
FIG. 30 is section V-V of FIG. 29 showing the upper half as it holds the transparent windows.
Figure 31:
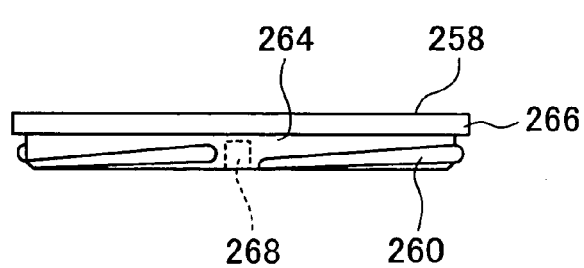
FIG. 31 is a side view of the window member shown in FIG. 30.
Figure 32:
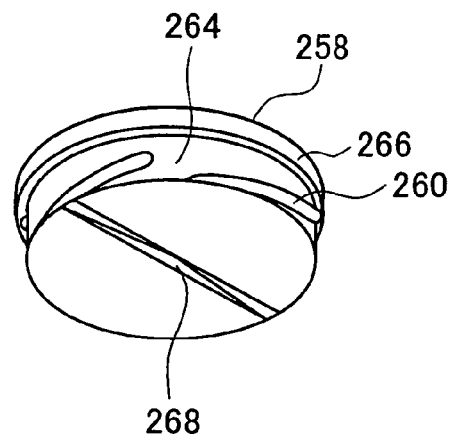
FIG. 32 is a perspective view of the window member as it is seen from the bottom.

FIG. 29 is a perspective view showing the upper half of a magnetic tape cassette according to an example of the third embodiment of the fifth aspect of the invention; FIG. 30 is section V-V of FIG. 29; FIG. 31 is a side view of the window member shown in FIG. 30; and FIG. 32 is a perspective view of the window member of FIG. 31 as it is seen from the bottom. Obviously, the transparent window in the upper half generally indicated by 250 in FIGS. 29 and 30 is provided in the body 256 of the upper half 250 and consists of two circular openings 256a formed as windows and two circular window members 258 that are made of a transparent resin and fitted in the openings 256a.

Fitted in the openings 256a in the upper half's body 256 are the window members 258 that have the shapes shown in FIGS. 31 and 32. Each of the window members 258 under consideration has a threaded portion 260 formed on the circumference of the part which is to be fitted into the opening 256a in the upper half's body 256. The opening 256a in the upper half's body 256 has an engaging portion 262 that comes into engagement with the threaded portion 260 on the circumference of the window member 258. The engaging portion 262 may be threads of the same pitch as the threaded portion 260 of the window member 258. Alternatively, it may be a projection in pin form which, when installing the window member, can pass through a gap 264 in the threaded portion 260; an installing mechanism of this design is a well-known bayonet structure which permits the window member 258 to be installed and uncoupled in an easy way.

In order to ensure that the installed window member 258 is firmly secured to keep the upper half air-tight, a flange 266 is desirably provided on top of the window member 258. In this case, a step is desirably provided on the inner surface of the opening 256a in the upper half's body 256 to ensure that the window member 258 will not project from the latter. It is also desirable to provide a groove 268 in the bottom of the window member 258 so that a screw driver or other tool is put into the groove and helps rotate the window member 258 to be properly fitted in the upper half's body 256.

The groove 268 is also used when the window member 258 is separated for recovery from the upper half's body 256 of the magnetic tape cassette after it has been used and discarded. In order to ensure that the window member 258 will not be inadvertently separated from the upper half's body 256 while the magnetic tape cassette is in service, the groove 268 is desirably provided in the bottom of the window member 258. The groove 268 may be marked with a graduation for indicating the residual amount of tape. On the other hand, if it is undesirable that not only the residual amount of tape but also the groove 268 is visible while the user is looking at the interior of the magnetic tape cassette, the groove 268 may be replaced by two holes on the circumference of the window member 258.

According to the example described above, there is provided a magnetic tape cassette with a transparent window which, when discarded after use, permits easy and safe separation between the upper half's body and the window member so that they can be recovered and recycled as feeds for additional products.

Figure 33A:
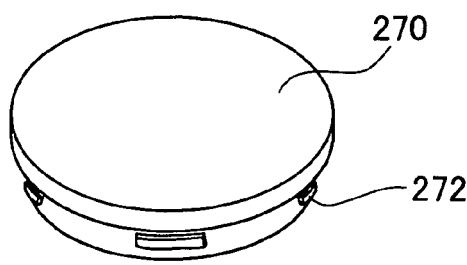
FIGS. 33A and 33B are a perspective view and a side view, respectively, which show a transparent window in a magnetic tape cassette according to another example of the third embodiment of the fifth aspect of the invention.
Figure 33B:
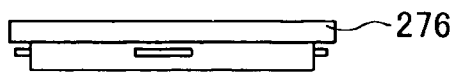
Figure 34:
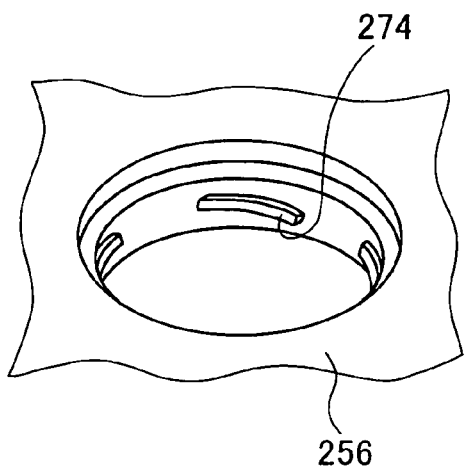
FIG. 34 is a perspective view showing the opening in the upper half according to the example shown in FIG. 33.
Figure 35:
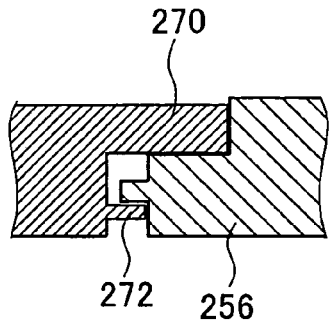
FIG. 35 illustrates how the window member is in engagement with the inner peripheral surface of the opening according to the example shown in FIG. 33.

FIG. 33A is a perspective view of a window member which is the major part of a transparent window in a magnetic tape cassette according to another example of the third embodiment of the fifth aspect of the invention; and FIG. 33B is a side view of the same window member. FIG. 34 is a partial perspective view of the opening in the upper half into which the window member shown in FIGS. 33A and 33B is to be fitted, and FIG. 35 illustrates how the window member according to the example shown in FIGS. 33A and 33B engages the inner circumference of the opening in the upper half.

The method the second example under consideration adopts to engage the transparent window in the magnetic tape cassette is different from the method adopted by the first example in that an engaging portion 274 consisting of an interrupted helical thread is formed on the inner circumference of the opening in the upper half whereas engaging ribs 272 are formed on the outer circumference of the window member 270. As in the first example, the window member 270 as the major part of the transparent window in the magnetic tape cassette is easy to install on and separate from the upper half.

Thus, according to the second example described above, there is provided a magnetic tape cassette with a transparent window which, when discarded after use, permits easy and safe separation between the upper half's body and the window member so that they can be recovered and recycled as feeds for additional products.

Described above are the basic features of the third embodiment of the fifth aspect of the invention.

We next describe a magnetic tape cassette according to the second aspect of the invention and the process for its fabrication with reference to FIGS. 36-42.

Again, the magnetic tape cassette according to the second aspect of the invention has basically the same structure as the one shown in FIG. 1, except for the structure of the transparent window in the upper half and the mechanism for installing it. Therefore, on the following pages, only the structure and installing mechanism will be described in detail and the other parts will not be discussed.

Figure 36:
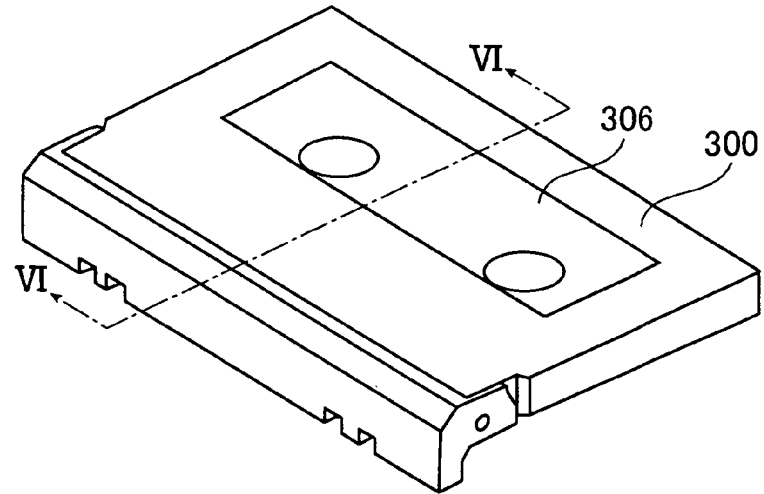
FIG. 36 is a perspective view showing a magnetic tape cassette having a separable transparent window according to an example of the second aspect of the invention.
Figure 37:
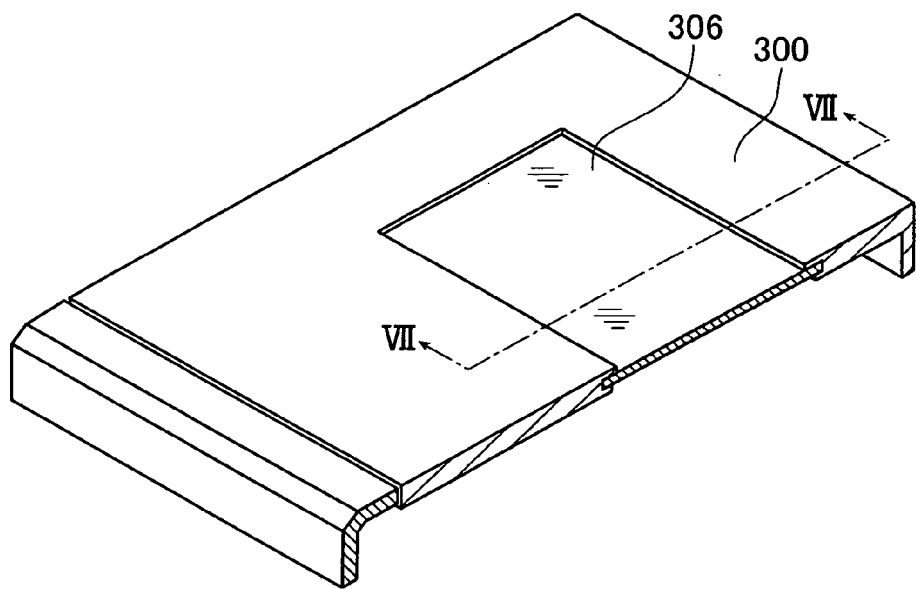
FIG. 37 is a perspective view showing in section the upper half of the magnetic tape cassette shown in FIG. 36 as it is cut through the transparent window along line VI-VI.
Figure 38:
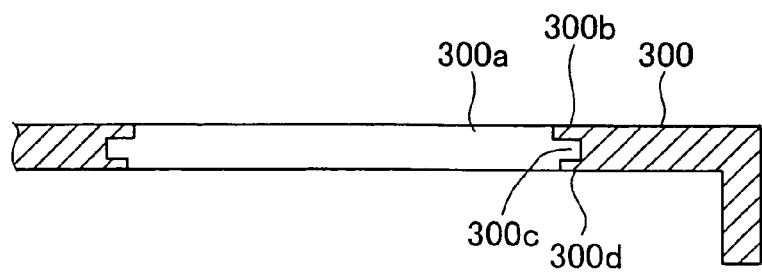
FIG. 38 is section VII-VII of the upper half shown in FIG. 37.

FIG. 36 is a perspective view showing the upper half of a magnetic tape cassette according to an embodiment of the second aspect of the invention; FIG. 37 is section VI-VI of FIG. 36; and FIGS. 38 and 39 are sections of the upper half and the window member that are taken through FIG. 37 along line VII-VII. The transparent window in the upper half generally indicated by 306 in FIGS. 36, 37 and 39 consists of an opening 300a formed as a window in the upper half 300 and a window member 306 that is made of a transparent resin and fitted in the opening 300a.

As shown in FIG. 38, the opening 300a is formed in the upper half (or the upper half's body) 300 such that it has an upper window frame 300b which is thick enough to provide adequate rigidity and a lower window frame 300d which is thin enough to be capable of elastic deformation; since a groove 300c into which the window member 306 is fitted is formed between the upper window frame 300b and the lower window frame 300d, the upper half (or the upper half's body) 300 on either side of the opening 300a has a generally U-shaped cross-section. In the embodiment shown in FIG. 38, the lower window frame 300d has a uniform thickness but it may be formed thin in selected areas to ensure that it will easily undergo elastic deformation.

The window member 306 to be fitted into the opening 300a in the upper half 300 may have an identical shape to the groove 300c in the inner circumference of the opening 300a or it may be somewhat smaller so that it can be easily inserted into the groove. The thickness of the window member 306 may be equal to the width of the groove 300c or it may be somewhat smaller so that it can be easily inserted into the groove. The window member 306 has ridges 306a in such positions that they contact the lower window frame 300d when it has been inserted into the groove 300c.

In order to install the separable transparent window of the magnetic tape cassette according to the first embodiment of the second aspect of the invention, the following method may be employed. The first step of the process of fitting the transparent window member 306 in the upper half 300 involves inserting the window member 306 into the groove 300c in the upper half 300 so that the two are joined temporarily. Since the ridges 306a on the window member 306 are provided in the positions where they contact the lower window frame 300d of the upper half 300, the inserted window member 306 causes the lower window frame 300d to deform elastically so that it is retained to the upper half 300 as the two members are joined temporarily (see FIG. 40).

In the second step, the temporary joint where the lower window frame 300d has underwent elastic deformation to retain the window member 306 is subjected to ultrasonic or thermal welding. However, if the upper half 300 and the window member 306 are made of materials that have no compatibility or have only small compatibility with each other, as in the case where the upper half 300 is made of an ABS resin and the window member 306 a transparent PS resin, ultrasonic or thermal welding does not cause fusion to occur between the upper half 300 and the window member 306 (particularly the ridges 306a); instead, the joining surfaces of the upper half 300 and the window member 306 (particularly the ridges 306a) will only be depressed to deform as shown in FIG. 41.

Briefly, by means of ultrasonic or thermal welding, the elastic deformation of the lower window frame 300d is eliminated but the window member 306 will not be fused to the upper half 300 and the two members contact each other leaving no clearances therebetween so that they are incapable of relative movements (the window member 306 is fixed in position by being held between the upper and lower window frames 300b and 300d). The thus formed transparent window of the tape magnetic tape cassette is just the same as the transparent window of the prior art and hence can be used without any difficulties. Note that the ridges 306a may be provided on the upper half 300 rather than on the window member 306.

The thus fabricated cassette case is then put to service and discarded. In this case, the window member 306 may be separated from the upper half 300 in the following manner so that the two parts can be recycled as feeds for additional production. Since the window member 306 is not fused to the upper half 300, the user may push it hard from above, whereupon the lower window frame 300d of the upper half 300 deforms and the window member 306 can be easily recovered. Even if the lower window frame 300d deforms only insufficiently and the window member 306 breaks while it is pushed out of engagement with the lower window frame 300d, the broken window member 306 can be easily recovered from the groove 300c in the upper half 300 since the two members are not fused together.

Since the window member 306 and the upper half 300 are not fused to each other, no part of the window member 306 will remain adhering to the upper half 300 or vice versa; the window member 306 can be completely separated from the upper half 300 and the two parts can be recycled without suffering a drop in the purity as feeds for additional production.

Another benefit is obtained in the operation of separating the window member 306 from the upper half 300. Since the two components are not fused together, the window member 306 can be easily separated from the upper half 300 of the cassette case. Should the window member 306 break, it can be easily recovered from the groove 300c in the upper half 300 and this contributes safety to the separating operation.

FIG. 42 is a perspective view of a magnetic tape cassette according to another embodiment of the second aspect of the invention as it is sectioned through the transparent window in the upper half. The difference from the first embodiment is that the upper window frame 300b which is formed around the opening 306a in the upper half 300 and the lower window frame 300d which is thin enough to deform elastically, both being provided to hold and fix the window member in position, do not form continuous shapes but are rather formed in a plurality of discrete areas.

The magnetic tape cassette according to the second embodiment brings about essentially the same advantage as the tape cassette according to the first embodiment.

The second aspect of the invention also relates to the process for producing the magnetic tape cassettes according to the two embodiments described above. The process involves the following steps: first, the window member 306 and the upper half 300 serving as the base are molded; the window member 306 is molded from a material that has no compatibility or has an extremely low degree of compatibility with the material of which the upper half 300 is made whereas the upper half 300 is molded in such a way that at least part of the area around the opening 300a has the adequately rigid upper window frame 300b, the elastically deformable lower window frame 300d and the groove 300c formed between the two window frames to provide a temporary fitting area into which the window member 306 can be inserted; the upper frame 300 and the window member 306 are also molded in such a way that the upper window frame 300b, the lower window frame 300*d* or the window member 306 has ribs in positions where either window frame contacts the window member 306 (in the illustrated case, the ribs 306*a* are formed on the window member 306); in the second step, the window member 306 is inserted into the groove 300*c*, whereupon the lower window frame 300*d* deforms elastically to establish temporary joint with the ribs 306*a*; thereafter, ultrasonic wave or heat is applied to the temporary joint.

As a result, the ribs 306*a* joining temporarily to the lower window frame 300*d* collapse under the ultrasonic or thermal action so that the window member 306 is securely fastened in the groove 300*c* between the upper and lower window frames 300*b* and 300*d* formed in the upper half 300 around the opening 300*a*. Needless to say, the window member 306 can be completely separated from the upper half 300 in a simple and safe manner, with no part of it adhering to the latter. Thus, the process for producing the magnetic tape cassette according to the second aspect of the invention is quite effective.

Described above are the basic features of the second aspect of the invention.

We next describe a magnetic tape cassette according to the third aspect of the invention and the process for its fabrication with reference to FIGS. 43-46.

Again, the magnetic tape cassette according to the third aspect of the invention has basically the same structure as the one shown in FIG. 1, except for the structure of the transparent window in the upper half and the mechanism for installing it. Therefore, on the following pages, only the structure and installing mechanism will be described in detail and the other parts will not be discussed.

Figure 44:
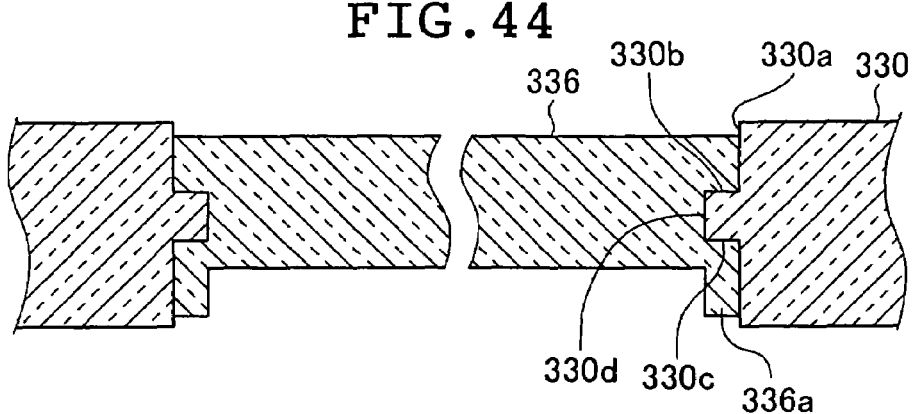
FIG. 44 is a sectional view of a transparent window in the upper half shown in FIG. 43.

FIG. 43 is a perspective view showing the upper half of a magnetic tape cassette according to an embodiment of the third aspect of the invention as it is sectioned in a longitudinal direction; and FIG. 44 is a partial enlarged section of the upper half shown in FIG. 43. As is clear from these figures, the transparent window in the upper half generally indicated by 330 consists of an opening 330*a* formed in the upper half 330 and a window member 336 that is made of a transparent resin and fitted in the opening 330*a*.

As shown in FIG. 44, the body of the upper half 330 has the opening 330*a* and recesses 330*b* and 330*c* are formed in the inner surfaces on both sides of the opening 330*a*. The two recesses are interconnected by an edge portion 330*d*. In the embodiment shown in FIG. 44, the edge portion 330*d* formed as the bridge between the two recesses has a cross-sectional shape resembling a square block; however, as will be described later, the square is not the sole example that can be adopted in the invention.

The edge portion 330*d* may be provided on the perimeter of the opening 330*a* either throughout (continuously) or in selected areas (intermittently). For the reasons that will be set forth below, the edge portion 330*d* shown in FIG. 44 is desirably provided on the entire perimeter of the opening 330*a*.

We next describe the method of forming the transparent window.

Figure 45A:
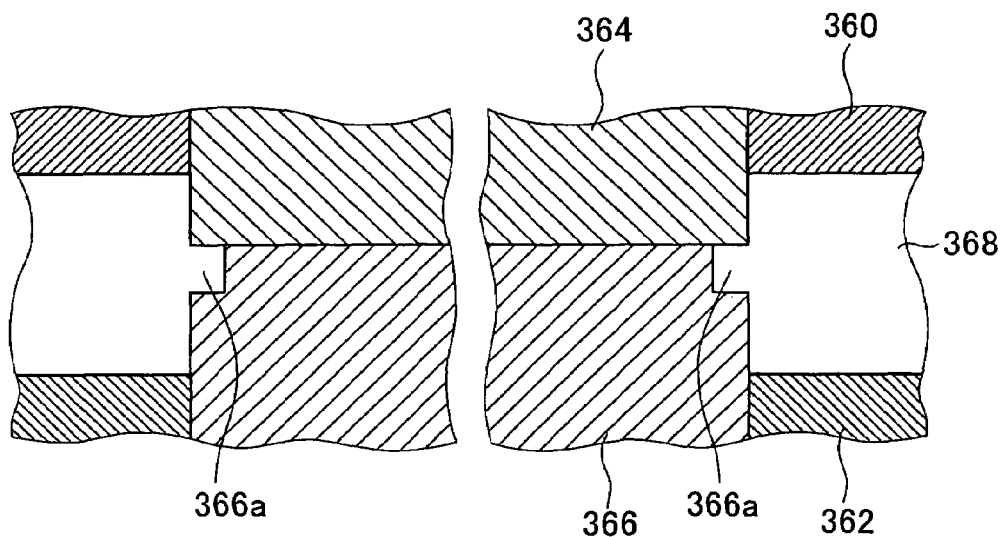
FIGS. 45A and 45B are sectional views showing relative movements of molding dies intended to illustrate an example of the process for fabricating the transparent window in the upper half shown in FIG. 44.
Figure 45B:
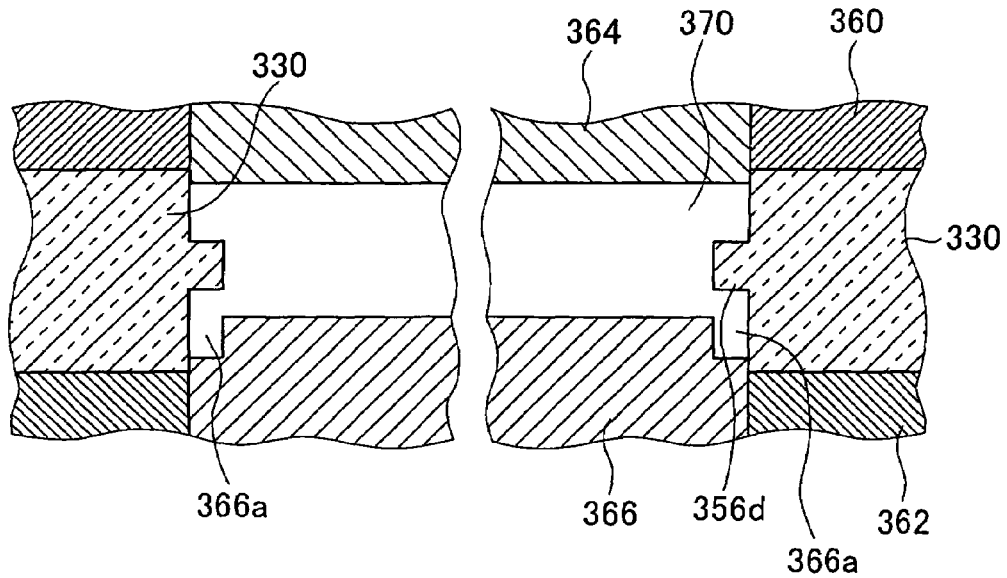

FIGS. 45A and 45B illustrate the process for making the transparent window according to the embodiment shown in FIG. 44. A die assembly for molding the upper half's body 330 having the transparent window has an upper die 360 and a lower die 362 that define the general shape of the upper half's body 330. The upper die 360 and the lower die 362 are of well-known types that can be used to mold a predetermined shape. Since the two dies are identical to those of the prior art, they need not be described herein and instead only portions that are relevant to the process for making the transparent window will be described below.

The die assembly consisting of the upper die 360 and the lower die 362 has two cores (or cavities) in the area where the opening 330*a* is made to receive the transparent window being fitted in; the first core 364 is provided in the upper die 360 to form the recess 330*b* in the front surface and the second core 366 is provided in the lower die 362 to form the recess 330*c* in the back surface and the edge portion 330*d* bridging the two recesses. The first core 364 and the second core 366 are so designed that they can be pushed into or withdrawn from the upper die 360 and the lower die 362, respectively.

FIG. 45A shows the step of molding the upper half's body 330 with the die assembly described above. As shown, the first core 364 and the second core 366 are allowed to project from the upper die 360 and the lower die 362, respectively, until the distal ends of the two cores are brought into intimate contact with each other; as a result, a space or a cavity 368 is defined by the upper die 360, the lower die 362, the first core 364 and the second core 366; a resin such as an ABS resin is injected into the cavity 368 to mold the upper half's body 330 together with the recesses 330*b* and 330*c* on both sides of the opening 330*a* as well as the edge portion 330*d* bridging those recesses.

FIG. 45B shows the step of molding the transparent window member 336 in the opening 330*a* in the upper half's body 330 using the die assembly described in the preceding paragraph which consists of the upper die 360 and the lower die 362, as well as the first core 364 and the second core 366. As shown, a space or a cavity 370 is defined by the molded upper half's body 330 and the die assembly having the first core 364 and the second core 366 retracted into the upper die 360 and the lower die 362, respectively, and a transparent resin such as a PS resin that has no compatibility or has an extremely low degree of compatibility with the resin such as ABS resin that has been injected to mold the upper half's body 330 is injected into the cavity 370 so that the transparent window member 336 is molded and fitted as an integral part of the upper half's body 330.

Figure 46:
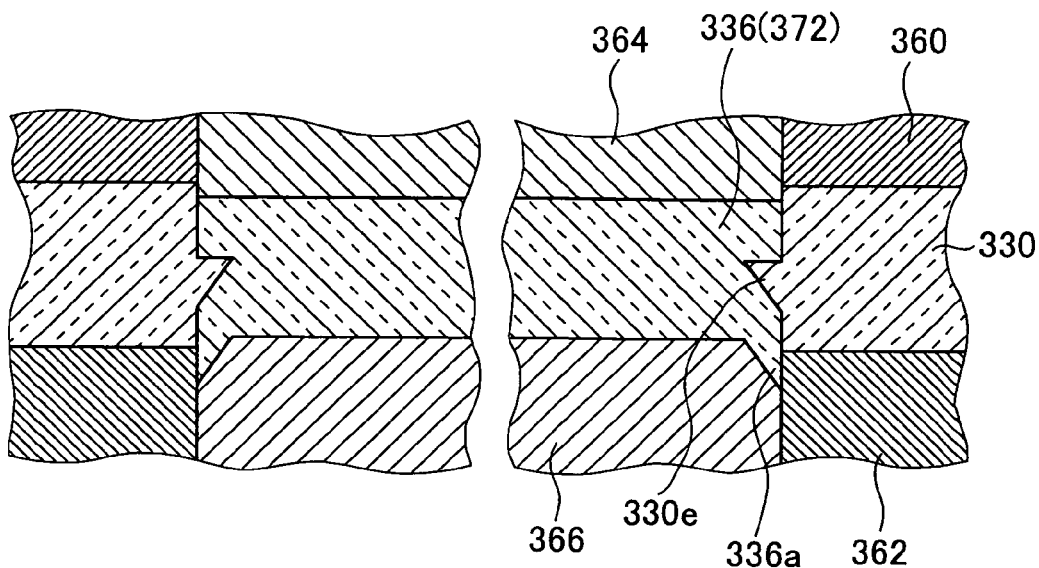
FIG. 46 is a sectional view showing a window portion of the upper half in a magnetic tape cassette according to another embodiment of the third aspect of the invention and the die assembly for molding the window portion.

FIG. 46 shows a transparent window according to another embodiment of the third aspect of the invention and this window can be molded in entirely the same manner as in the first embodiment by injecting a transparent resin into a cavity 372. Hence, there is no need to give a detailed description of this second embodiment.

The third aspect of the invention also relates to the process for producing the magnetic tape cassettes according to the above embodiments. The process involves the following steps: the first step is providing the die assembly for molding the upper half's body 330 which comprises the upper die 360 and the lower die 362, as well as the first core 364 and the second core 366 for making the opening 330*a* in the upper half's body 330, the first core 364 being capable of sliding into the die cavity from the front surface of the upper half's body and the second core 366 being capable of sliding into the die cavity from the back surface of the upper half's body 330 and having on opposite ends two recesses 366*a* that are used to provide ridges 330*d* for establishing engagement between the window member 336 and the opening 330*a* in the upper half's body 330; in the second step, the first core 364 and the second core 366 in the die assembly are brought into intimate contact with each other; then, an upper half's body forming resin material is injected to mold the upper half's body 330 with the opening 330*a* in it; thereafter, the first core 364 and the second core 366 are spaced apart and a transparent window member forming resin material that has no compatibility or has an extremely low degree of compatibility with the upper half's body forming resin material is injected into the resulting space (cavity) to mold the window member 336 as an integral part of the upper half's body 330. This process for producing the magnetic tape cassette according to the third aspect of the invention is quite effective.

When the magnetic tape cassette employing the upper half's body 330 described above is discarded after use, one may find it necessary to disassemble the cassette case for recycling purposes. In this case, one may simply detach the upper half 330 and press the window member 336 by applying a strong force to its underside. The upper half's body 330 and the window member 336 are not fused to each other in the first embodiment shown in FIG. 44, so if the window member 336 is depressed with great force from below, the edge portion 330d around the opening 330a will undergo plastic deformation or the edge of the window member 336 may break and come off; in either case, the window member 336 can be easily separated from the upper half's body 330.

In particular, if the upper half's body 330 and the window member 336 are positioned in such a way that the lower end of the edge portion 330d is in close proximity with the upper end of the annular portion 336a and if both ends are sharp pointed, an applied stress will sufficiently concentrate that the annular portion 336a of the window member 336 will simply break and come off with a comparatively small force. In this case, the edge portion 330d is desirably provided on the entire perimeter of the opening 330a so that the annular portion 336a will break and come off along the entire perimeter of the opening 330a.

The window member according to the embodiment shown in FIG. 46 is so designed that the edge portion 330e of the upper half's body 330 around the opening 330a can deform more easily when the window member 336 is depressed from below with strong force. In the embodiment under consideration, the edge portion 330e has such a cross-sectional shape that it projects as a triangular block with a plane inclined into the opening 330a. If the window member 336 is depressed from below, the inclined plane deforms elastically; if it is depressed with a greater force, the inclined plane starts to undergo plastic deformation and the annular portion 336a of the window member 336 will come off, whereupon the window member 336 can be easily separated from the upper half's body 330. Hence, in the embodiment shown in FIG. 46, the edge portion 330e is desirably provided in interrupted positions on the perimeter of the opening 330a.

The transparent window in the magnetic tape cassette according to the two embodiments of the third aspect of the invention are fabricated as described above. Since the upper half's body 330 serving as the base and the window member 336 are molded monolithically of two resins that have no compatibility with each other (or those which have little compatibility), the upper half is sufficiently air-tight to ensure satisfactory dust prevention. In addition, it is only external pressure and impact that are exerted on the tape cassette during manual handling as in the case of carrying, storage and loading on the record/reproduce apparatus; therefore, the tape cassette according to the third aspect of the invention has no strength problems at all if the edge portion 330d or 330e is designed to have sufficient strength to withstand internal impact without breaking or coming off.

Described above are the basic features of the third aspect of the invention.

We now describe the method for multi-color molding of resin products according to the fourth aspect of the invention, as well as the magnetic tape cassette which is the resin product molded by the method with reference to FIGS. 47-54.

In the following description, a magnetic tape cassette is assumed as a typical example and particular reference is made to the method for molding an upper half which constitutes the housing of the magnetic tape cassette and a transparent window provided in the upper half as an aid for checking the residual amount of magnetic tape. It should, however, be noted that these are not the sole examples of the invention. Again, the magnetic tape cassette as the typical example has basically the same structure as the one shown in FIG. 1, except for the structure of the transparent window in the upper half and the mechanism for installing it. Therefore, on the following pages, only the structure and installing mechanism will be described in detail and the other parts will not be discussed.

Figure 47:
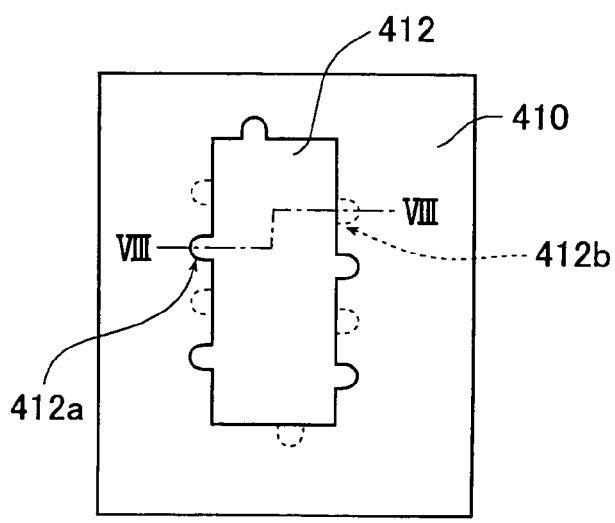
FIG. 47 is a plan view showing the upper half of a magnetic tape cassette according to an example of the fourth aspect of the invention and the residual tape check window provided in this upper half.
Figure 48:
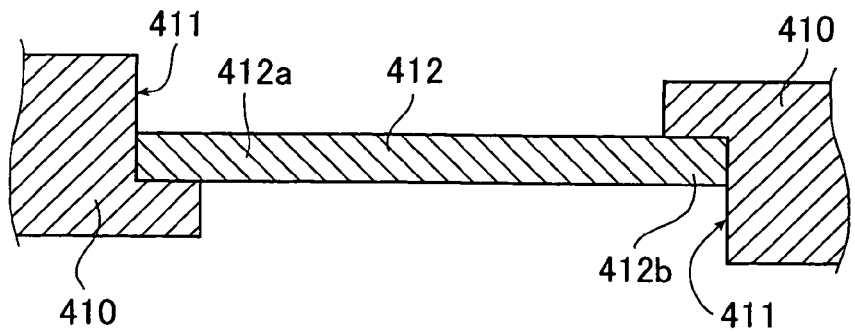
FIG. 48 is section VIII-VIII of FIG. 47 showing how the upper half is combined with the window.

FIG. 47 is a plan view showing the upper half of the magnetic tape cassette according to the example under consideration and the transparent window provided in this upper half as an aid for checking the residual amount of magnetic tape. As shown in FIG. 47, the upper half indicated by 410 is provided with the transparent window 412 (hereunder referred to simply as the window 412) as an aid for checking the residual amount of magnetic tape within the housing. The window 412 has lugs 412a, 412b, . . . on the perimeter which are to fit the predetermined shapes provided on the upper half 410 as shown in FIG. 48 which is section VIII-VIII of FIG. 47. As shown, the lugs 412a and 412b of the window 412 alternate both horizontally and vertically with the predetermined shapes provided in the end portion 411 of the window opening in the upper half 410 such that an upper lug fits an adjacent lower predetermined shape whereas a lower lug fits an adjacent upper predetermined shape.

Figure 49:
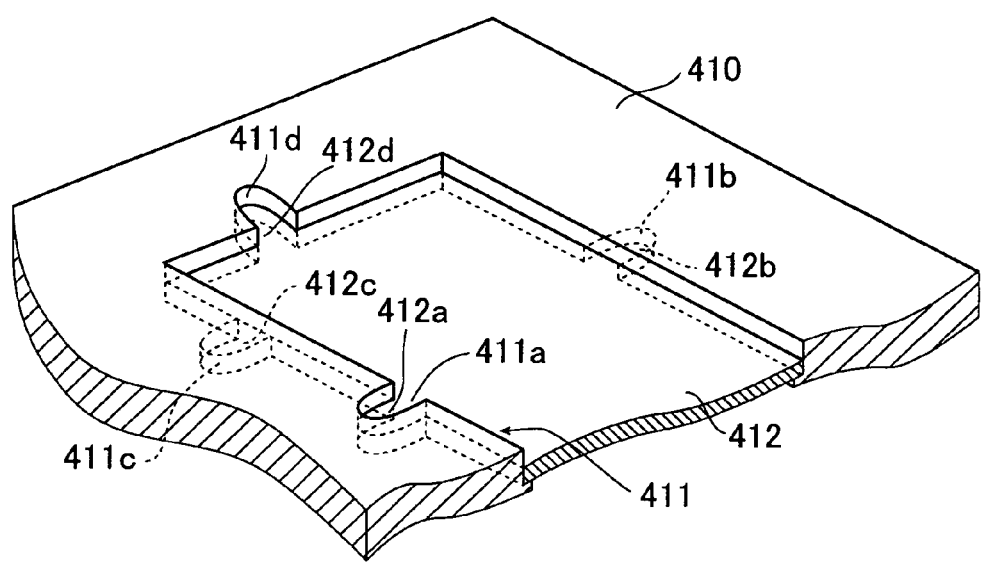
FIG. 49 is a perspective view showing enlarged the upper half and window combination shown in FIG. 47.

The fitting combination of the upper half 410 and the window 412 is shown more clearly in FIG. 49 which is a partial enlarged perspective view of the window 412 as it is fitted in the upper half 410. As shown, the lug 412a of the window 412 is fitted in a recess 411a formed in the end portion 411 of the window opening in the upper half 410 whereas the lug 412b is fitted in another recess 411b also formed in the end portion 411 of the window opening in the upper half 410. The recess 411a has a bottom on which the lug 412a rests and it is open at the top. On the other hand, the recess 411b has no bottom; instead, it is closed at the top as if it were fitted with a lid and the lug 412b is fitted into this recess 411b.

In the example under consideration, the upper half 410 and the window 412 are molded by core-backing two-color molding and the two elements can be assembled together in such a way that the window 412 is easily separable from the upper half 410.

Figure 50:
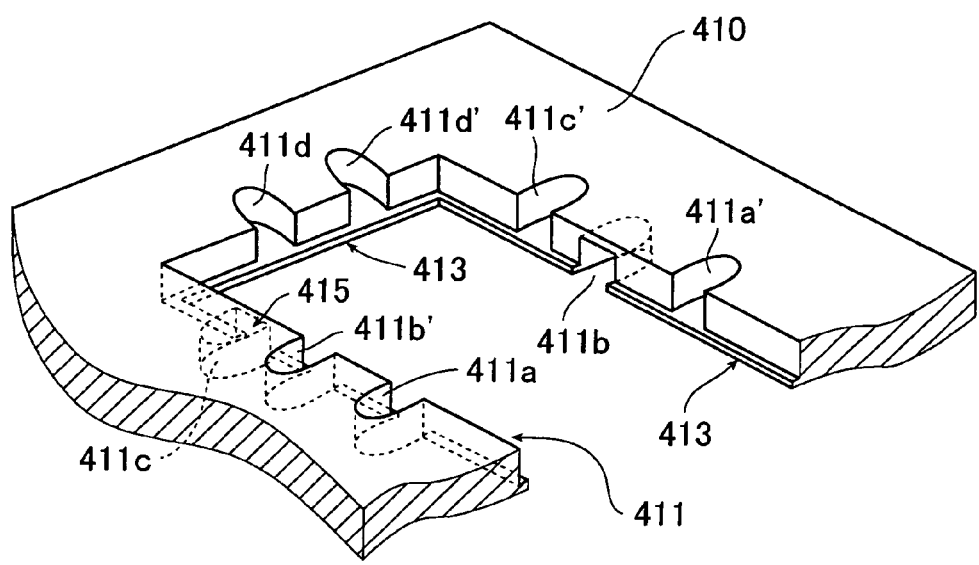
FIG. 50 is a perspective view showing enlarged a part of the upper half according to the fourth aspect of the invention.

To this end, the upper half 410 is so shaped that the end portion 411 of the window opening is indented as shown in FIG. 50. Specifically, recesses 411a-411d into which lugs 412a-412d of the window 412 are to be fitted and recesses 411a'-411d' for molding the lugs 412a-412d are formed along the end portion 411 of the window opening.

The recesses 411a-411d into which the lugs 412a-412d are to be fitted are so formed that adjacent ones are inverted with respect to the window 412 and the upper half 410. Stated specifically, the recess 411a has the bottom 413 whereas the adjacent recess 411c has no bottom but has the lid-like top 415.

The bottom 413 is so formed that it extends a little inward of the window opening along its end portion 411. This is in order to ensure that when the window 412 is installed in the upper half 410, the edge of the window 412 will ride over the bottom 413 by a small amount, and thereby eliminate any gap to provide more effective dust prevention.

Figure 51:
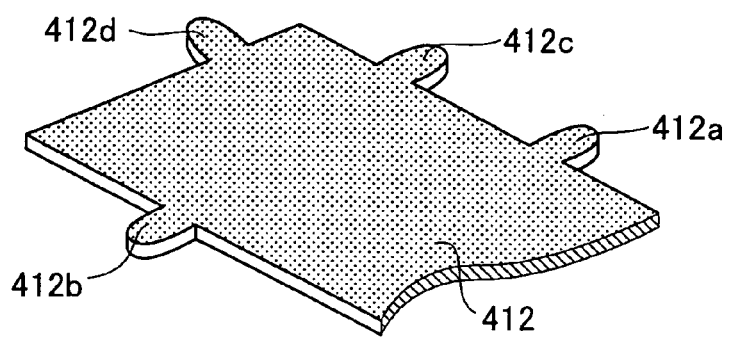
FIG. 51 is a perspective view showing enlarged a part of the window according to the fourth aspect of the invention.

FIG. 51 is a perspective view showing enlarged a part of the window 412. As shown, the window 412 has lugs 412a-412d that help it come into engagement with the upper half 410.

The lugs 412a-412d are formed in the same thickness as the window 412 and in order to provide ease in fitting with the recesses 411a-411d in the upper half 410, those lugs are rounded at corners. Alternatively, the lugs 412a-412d may be provided with a specified amount of taper in order to assure positive fitting with the recesses 411a-411d in the upper half 410.

Figure 52:
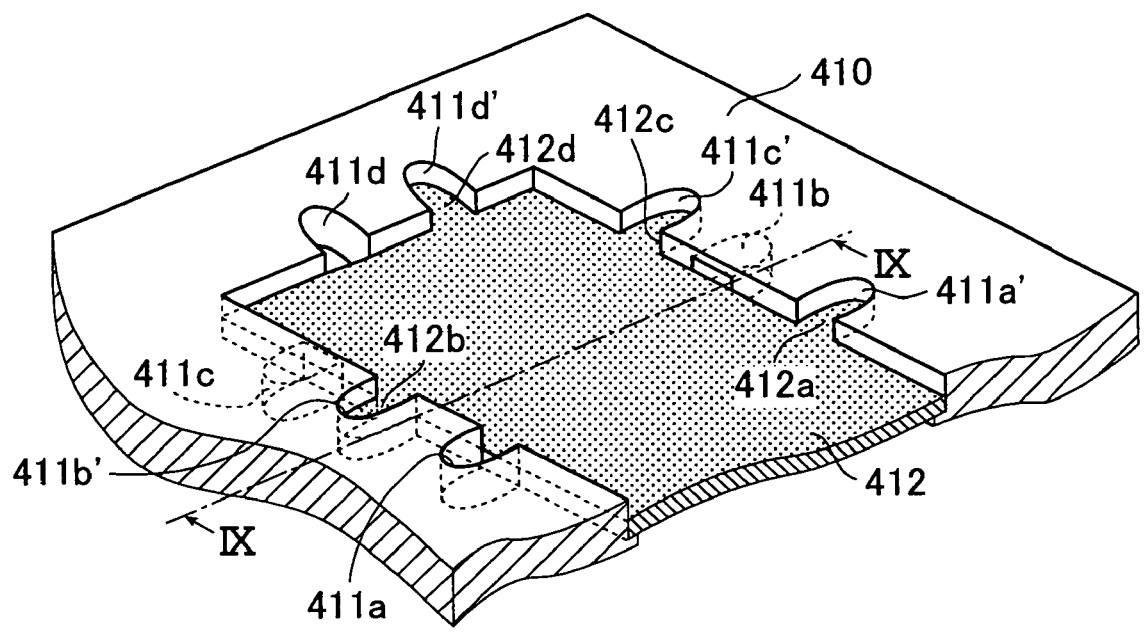
FIG. 52 is an enlarged perspective view showing the window as it has been molded simultaneously with the upper half according to the fourth aspect of the invention.

FIG. 52 is a partial perspective view showing enlarged the upper half 410 and the window 412 that have been molded simultaneously. In the embodiment under consideration, the upper half 410 and the window 412 are molded of incompatible and non-adherent materials using the same die assembly; then the window 412 is separated from the upper half 410 and turned upside down so that it can be replaced in the upper half 410. To this end, the design shown in FIG. 52 is adopted; in order to mold the lug 412a of the window 412, the upper half 410 is provided with a recess 411a' in a position diametric to the recess 411a across the window opening; in order to mold the lug 412b, a recess 411b' is provided in a position diametric to the recess 411b; in order to mold the lug 412c, a recess 411c' is provided in a position diametric to the recess 411c; and in order to mold the lug 412d, a recess 411d' is provided adjacent the recess 411d.

Figure 53A:
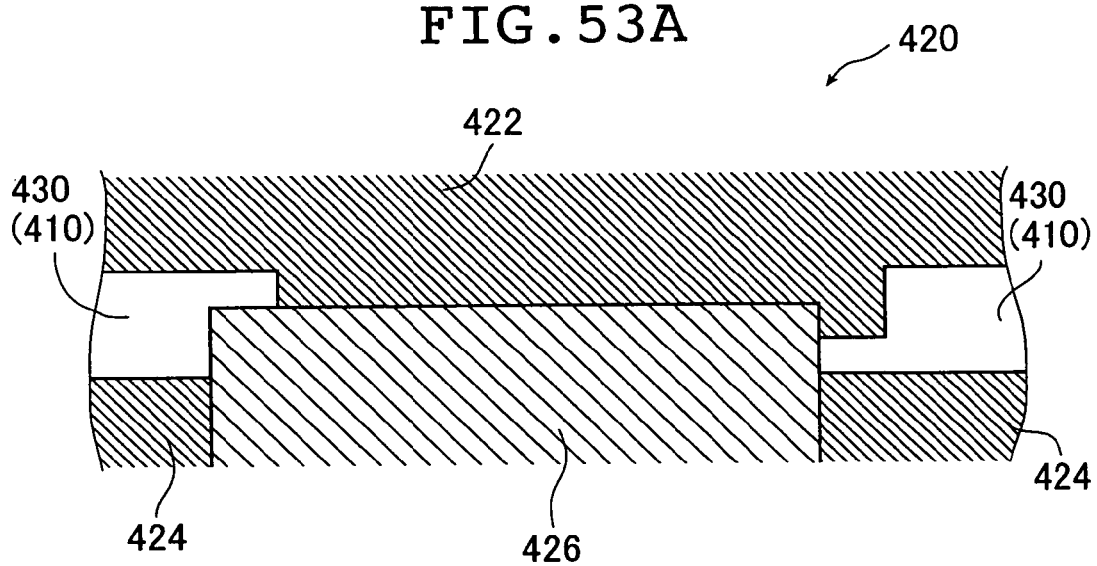
FIGS. 53A and 53B are sections of a mold that correspond to section IX-IX of FIG. 52.
Figure 53B:
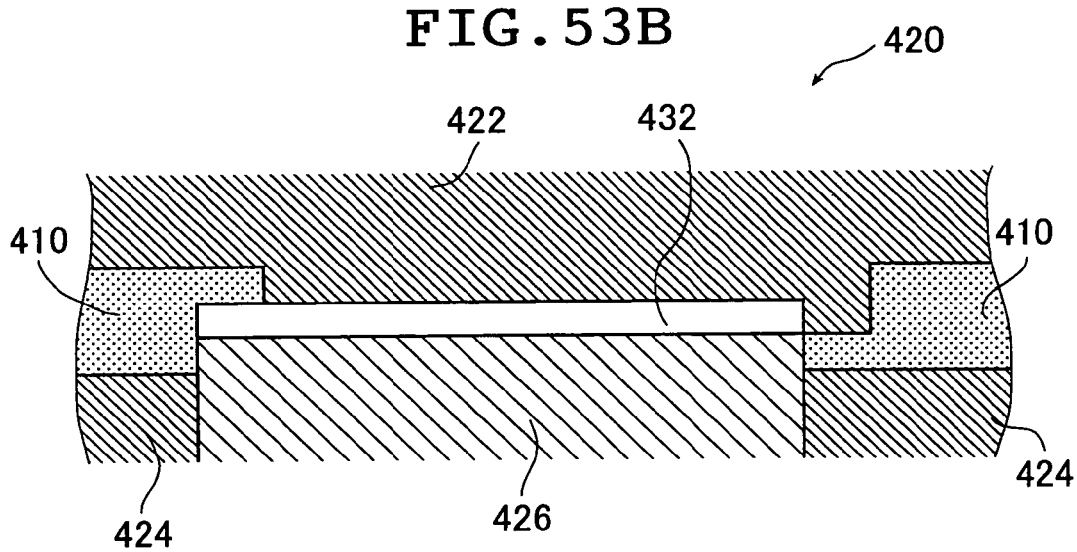

FIGS. 53A-53B show a die assembly that may be used to mold the upper half 410 and the window 412 that are shown in FIG. 52. FIGS. 53A and 53B are sections of the die assembly that correspond to section IX-IX of FIG. 52. As shown in FIG. 53A, the die assembly for molding the upper half 410 and the window 412 which is generally indicated by 420 consists mainly of an upper die 422, a lower die 424 and a movable core 426. The first step in the molding process is for molding the upper half 410 by injecting a molten resin into a space (cavity) 430 defined by the upper die 422, the lower die 424 and the movable core 426.

In the next step, the movable core 426 is lowered down by a distance equal to the thickness of the window 412 and into the resulting space 432, a resin that is neither compatible with nor adherent to the resin of which the upper half was molded is injected to mold the window 412.

Figure 53C:
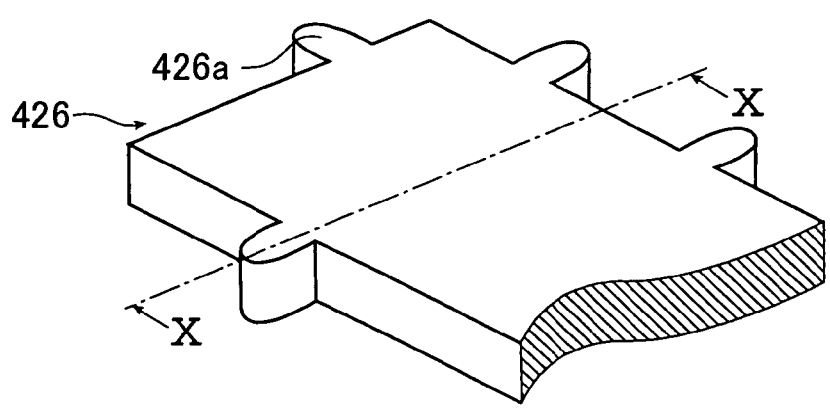
FIG. 53C is a perspective view of a moving core.

An outline of the movable core 426 is shown in perspective in FIG. 53C. The movable core 426 has lugs 426a, . . . for molding the lugs 412a, . . . of the window 412. The movable core 426 shown in FIGS. 53A and 53B is section X-X of FIG. 53C.

By two-color molding with the same die assembly 420, the upper half 410 and the window 412 can be molded at substantially the same timing (see FIG. 52). Since the upper half 410 and the window 412 are molded of incompatible materials, the former can be easily separated from the window (by lifting it up in FIG. 52).

Figure 54:
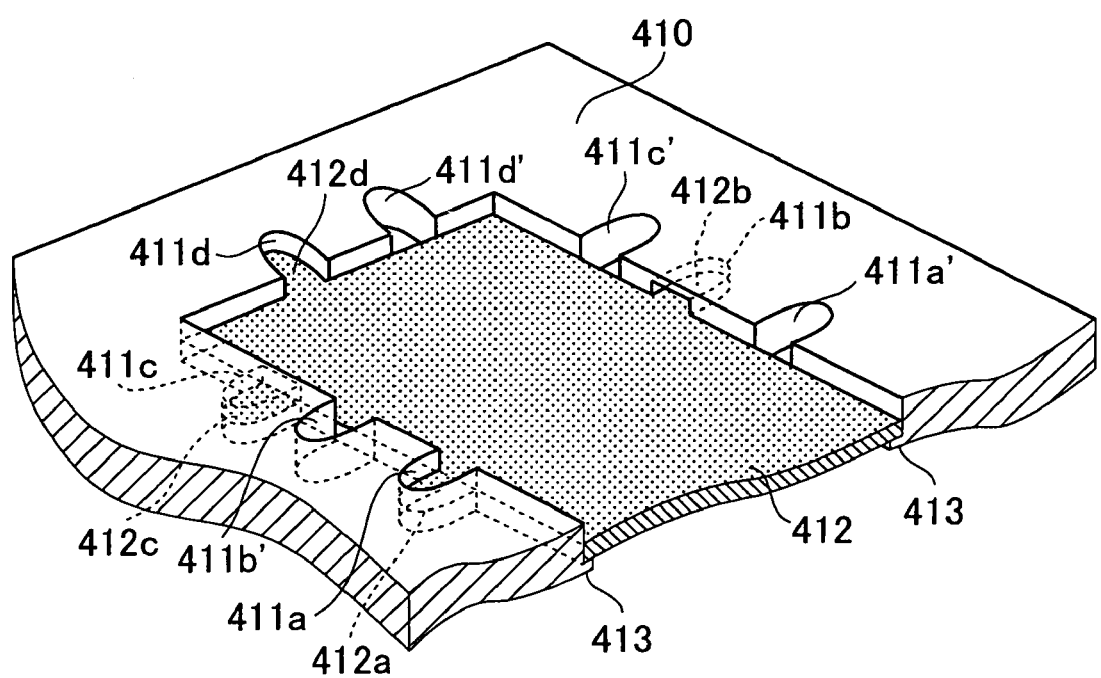
FIG. 54 is an enlarged perspective view of the window as it has been installed in the upper half according to the fourth aspect of the invention.

The window 412 is then turned upside down and replaced in the upper half 410 as shown in FIG. 54. The lug 412a of the window molded in the recess 411a' of the upper half 410 is fitted into the opposite recess 411a in the upper half 410. Similarly, the lug 412b of the window 412 molded in the recess 411b' is fitted into the opposite recess 411b; the lug 412c of the window 412 molded in the recess 411c' is fitted into the opposite recess 411c. The lug 412d of the window 412 molded in the recess 411d' is fitted into the adjacent recess 411d. The end portions of the window 412 ride over the bottom 413, a small extension of the upper half 410, so that the gaps around the window 412 (where the lugs 412a, . . . are not provided) are closed to provide enhanced dust prevention.

The magnetic tape cassette according to the embodiment discussed above can be produced by applying the process for producing resin products according to the fourth aspect of the invention. First, resin parts including the upper half (its body) 410 and the window (its member) 412 are molded in multiple colors by means of the single die assembly 420 using at least two incompatible, non-adherent materials. After demolding the upper half 410 and the window member 412, the window 412 is turned upside down and replaced in the upper half 410.

Thus, in the embodiment under consideration, the upper half and the window are molded in two colors by means of the same die assembly using incompatible materials, or those non-adherent materials which have distant values for compatibilization parameter; after the molding, the window is separated from the upper half, turned upside down and replaced in the upper half. This provides ease not only in installing the window in the upper half but also separating the two parts as required for recycling.

In FIGS. 52 and 54, the fitting of the lugs 412 of the window 412 into the recesses 411, for example, the fitting of the lug 412b into the recess 411b is so shown that a gap exists between the top of the lug 412b and the inner surfaces of the recess 411b. This is an exaggeration intended to clarify the state of coupling between the lug 412b and the recess 411b. In practice, as shown in FIG. 48 (sectional view) or FIG. 49 (perspective view), there are substantially no gaps between the set of lugs 412a, . . . on the window 412 and the set of recesses 411a, . . . in the upper half 410 and the former fit so snugly into the latter that there is no possibility for the window 412 to rattle when the magnetic tape cassette is in service.

Described above is not the only method for coupling the window to the upper half and the shapes of these parts also are not limited to the examples described above. Other suitable methods can of course be employed to bring the window into engagement with the upper half.

Thus, in the embodiment described above, the window and the upper half are molded of incompatible materials (in two colors or layers) by the core backing process; after the molding, the window is separated from the upper half, turned upside down and replaced in the upper half so that the former is brought into engagement with the latter by means of fitting between the lugs and recesses formed in the shaped article or some other suitable engaging means; as a result, the window, the upper half and various other parts of the magnetic tape cassette can easily be recovered as separate entities.

Described above are the basic features of the fourth aspect of the invention.

We next describe the magnetic tape cassette according to the seventh aspect of the invention with reference to FIGS. 55-58.

Again, the magnetic tape cassette according to the seventh aspect of the invention has basically the same structure as the one shown in FIG. 1, except for the structure of the transparent window in the upper half and the mechanism for installing it. Therefore, on the following pages, only the structure and installing mechanism will be described in detail and the other parts will not be discussed.

Figure 55:
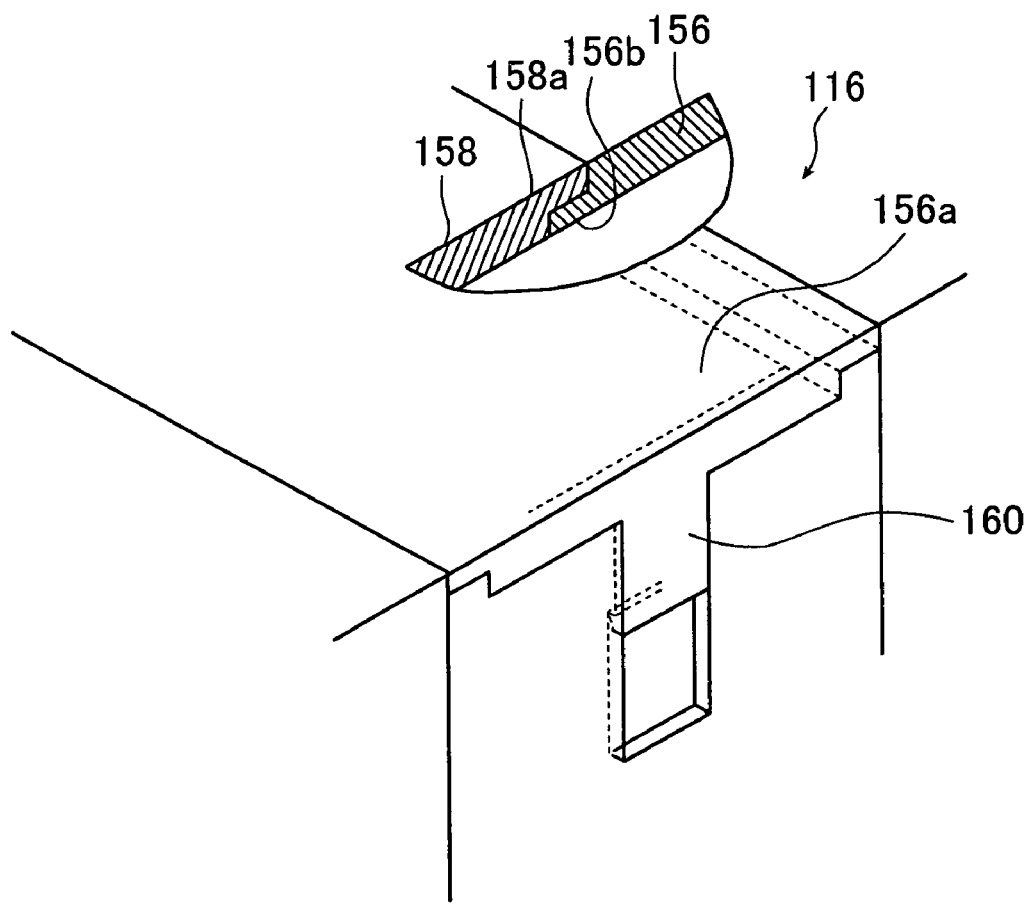
FIG. 55 is an enlarged perspective view showing, with part taken away, a manipulating engaging portion provided in the upper half of a magnetic tape cassette according to an example of the seventh aspect of the invention.
Figure 56:
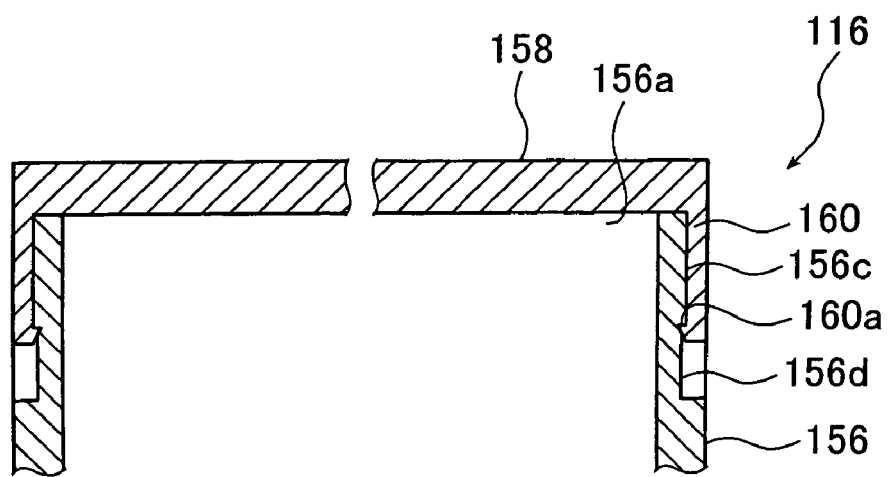
FIG. 56 is a longitudinal section of the upper half shown in FIG. 55.

FIG. 55 is an enlarged perspective view showing, with part taken away, a manipulating engaging portion provided in the upper half of a magnetic tape cassette according to an example of the seventh aspect of the invention. FIG. 56 is a longitudinal section of the upper half generally indicated by 116 in FIG. 55. As is clear from FIGS. 55 and 56, the transparent window in the upper half 116 is such that an opening 156a is formed in the upper half's body 156 along its entire length and a window member 158 made of a transparent resin is fitted along the entire length of the upper half's body 156 in such a way as to cover the whole area of the opening 156a.

The upper half's body 156 has edge portions 156b that extend into the opening 156a. By installing the window member 158 such that the edge portions 158 formed on its opposed lateral sides rest on the edge portions 156b, the upper half's body 156 and the window member 158 are brought into intimate contact with each other to maintain the air-tightness of the upper half 116. In addition, the window member 158 will not break or come off even if external pressure and impact are exerted on the magnetic tape cassette during manual handling as in the case of carrying, storage and loading on the record/reproduce apparatus.

Either end of the window member 158 extends to the associated end of the opening 156a running along the entire length of the upper half's body 156 and ends with an engaging member 160 bent at right angles. A manipulating engaging pawl 160a provided at the distal end of the engaging member 160 is fitted into engagement with an engaging groove 156c provided at either end of the upper half's body 156 in its longitudinal direction. Provided further downward of the engaging groove 156c is a disengagement groove 156d into which a tool is inserted in order to bring the manipulating engaging pawl 160a out of engagement with the engaging groove 156c.

In order to ensure that the window member 158 makes snug fit within the opening 156a in the upper half's body 156, the window member 158 is desirably shaped to bent slightly upward whereas the engaging members 160 on the window member 158 are shaped to bent slightly inward. Having these shapes, the window member 158 deforms of its own elasticity and the edge portions 158a of the window member 158 come into intimate contact with the edge portions 156b of the upper half's body 156 on the opposed sides of the opening 156a, whereupon the engaging members 160 are urged to be positively fitted into the engaging grooves 156c so that they will not come off easily.

The magnetic tape cassette according to the example under consideration has the structure described above. When it is in service, the edge portions 156b of the upper half's body 156 on the opposed sides of the opening 156a remain in intimate contact with the edge portions 158a of the window member 158 and no problems are encountered with respect to air-tightness and strength. If the magnetic tape cassette is discarded after use, a tool may be inserted into the disengagement groove 156d in the upper half's body 156 and pushed inward such that the manipulating engaging pawl 160a of the engaging member 160 provided on the window member 158 is dislodged from the engaging groove 156c; as a result, the window member 158 can be easily separated from the upper half's body 156 without letting any foreign material stick to either part.

In the example shown in FIGS. 55 and 56, the disengagement grooves 156d provided in the upper half's body 156 are of a sufficient length that a tool can be inserted into these grooves for canceling the engagement with the manipulating engaging pawls 160a. Of course, the disengagement grooves 156d may be of such a shape that they are continuous from the top to the bottom of either end face of the upper half.

Figure 57:
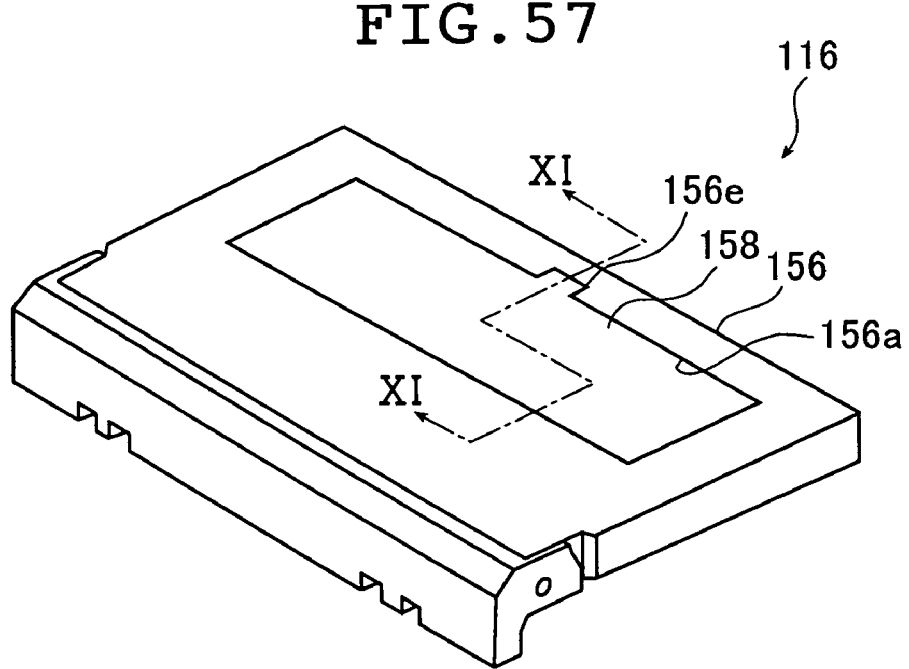
FIG. 57 is a perspective view showing another example of the transparent window in the upper half according to the seventh aspect of the invention.
Figure 58A:
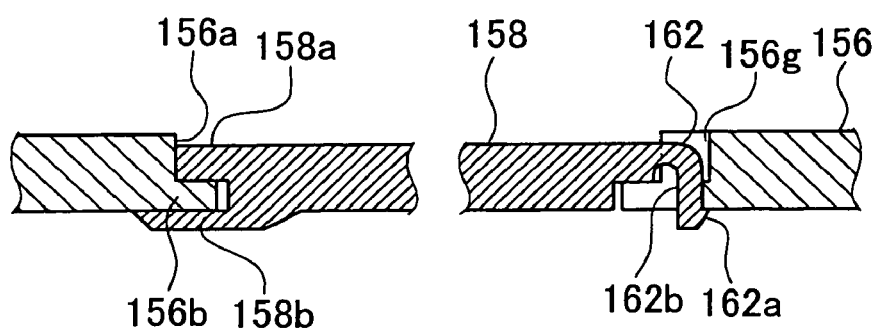
FIGS. 58A and 58B are sections of two examples of the engagement between the window and the upper half as they are cut through FIG. 57 along line XI-XI.
Figure 58B:
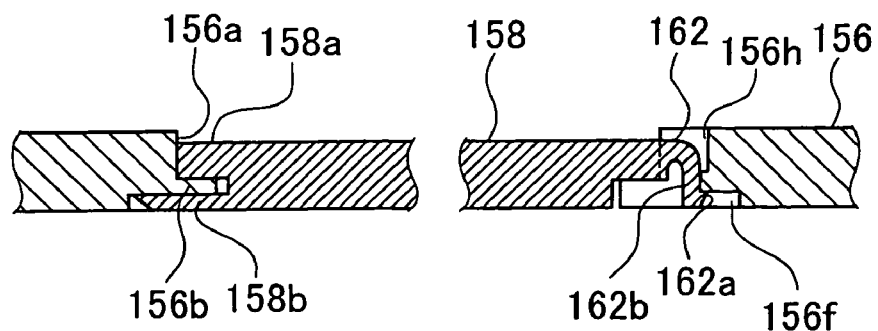

FIG. 57 is a perspective view of a magnetic tape cassette with a transparent window according to another example of the seventh aspect of the invention, and FIGS. 58A and 58B are sections taken along line XI-XI in FIG. 57. In the example under consideration, the window member 158 is not provided in the upper half's body 156 along its entire length; instead, it is possible to provide a transparent window of the same size as in the prior art. As shown specifically in FIG. 57, the transparent window in the upper half 116 is fabricated by first providing the upper half's body 156 with an opening 156a of the same size as in the prior art and then fitting it with the window member 158 of the same size.

An edge portion 156b of the same type as used in the first example is provided on the upper half's body 156 on the entire perimeter of the opening 156a except in the area where a cutout 156e is provided. The window member 158 has an edge portion 158a of the same type as used in the first example, which rests on the edge portion 156b when the window member 158 is fitted in the opening 156a. As shown in FIGS. 58A and 58B, the window member 158 has on one lateral side (the left side) a retaining pawl 158b which is so formed as to hold the edge portion 156b of the upper half's body 156 in cooperation with the edge portion 158a; by means of the retaining pawl 158b, the edge portion 156b is held in intimate contact with the edge portion 158a.

In the center of the other side (the right side) of the window member 158, there is provided an engaging member 162 which secures the window member 158 to the upper half's body 156. The engaging member 162 is positioned within the cutout 156e in the upper half's body 156 such that an engaging pawl 162a at the distal end is brought into engagement with the underside of the upper half's body 156 to fix the window member 158 in position. The engaging member 162 also has a thin-walled, elastic spring portion 162b which urges it to be positively brought into engagement with the underside of the upper half's body 156.

In the example shown in FIG. 58A, both the retaining pawl 158b of the window member 158 and the engaging pawl 162a of the engaging member 162 project down below the upper half's body 156. If this is not desirable for certain reasons such as the layout of magnetic tape within the cassette case, both the retaining pawl 158b and the engaging pawl 162a may be confined within the upper half's body 156 as shown in FIG. 58B. In this alternative case, the recess through which the engaging pawl 162a is passed to establish engagement with the underside of the upper half's body 156 may itself be used as a disengagement groove 156f by means of which the engaging pawl 162a can be disengaged from the underside of the upper half's body 156.

When the magnetic tape cassette according to the example shown in FIGS. 57 and 58 is in service, the edge portion 156b of the upper half's body 156 on the perimeter of the opening 156a remains in intimate contact with the edge portion 158a of the window member 158 and the window member 158 has no problems at all with respect to air-tightness and strength.

If the magnetic tape cassette, whether it is of the example shown in FIG. 58A or 58B, is discarded after use, a tool may be inserted into the manipulating engaging portion 156g or 156h from above the cassette case 156d and the engaging pawl 162a of the engaging member 162 is dislodged from the corresponding cutout of the opening 156a; as a result, the window member 158 can be easily separated from the upper half's body 156 without letting any foreign material stick to or mingle with either part.

The seventh aspect of the invention is by no means limited to the foregoing examples and it is possible to use engaging pawls of other structures. Of course, the concept of this aspect can equally be applied to various types of transparent window that are provided in other models of magnetic tape cassette as an aid for visual check of the interior.

For instance, the foregoing examples are directed to the case where the window member 158 is brought into mechanical engagement with the upper half's body 156; however, this is not the sole case of the invention and it can be implemented with other cases of engagement between the window member 158 and the upper half's body 156 such as where it is accomplished by thermal welding or through thermal fusion of two compatible resins.

Described above are the basic features of the seventh aspect of the invention.

We now describe a magnetic tape cassette according to the eighth aspect of the invention.

As already mentioned, the choice for resins that constitute individual parts (members) of the magnetic tape cassette has heretofore depended primarily on mechanical strength (including creep resistance), physical properties such as dimensional stability and heat resistance, and chemical properties such as corrosion resistance. In recent years, another important factor has been added to the list—the ease with which resins can be decomposed with naturally occurring microorganisms (called biodegradability, this factor is important when the magnetic tape cassette is disposed of by discarding).

The magnetic tape cassette (hereunder referred to simply as "cassette") according to the eighth aspect of the invention is characterized by constituting various parts (members) of the cassette with resins having good "biodegradability". In the following description of the eighth aspect of the invention, the term "upper" shall mean the side where the upper half is positioned and the term "lower" shall mean the side where the lower half is positioned.

The concept of the eighth aspect of the invention is applied to a magnetic tape cassette comprising magnetic tape and a housing in which the magnetic tape is placed rotatably; it is applicable to all models of the two-reel type magnetic tape cassettes in which a pair of tape reels having the magnetic tape wound around a pair of reel hubs are placed in specified positions such that the magnetic tape can be drawn out of the housing or that it is capable of running; alternatively, it can be applied to all models of the one-reel type magnetic tape cassettes in which a single tape reel having the magnetic tape wound around a single reel hub is placed in a specified position such that the magnetic tape can be drawn out of the housing or that it is capable of running.

In the cassette according to the eighth aspect of the invention, the housing (cassette case) is a member that is principally composed of the upper half and the lower half and which additionally includes other parts to be installed in the upper or lower half, as well as the tape reel or reels around which the magnetic tape is wound and those parts which are used to hold or accommodate the part of the magnetic tape which has been unwound from the tape reel or reels. Other parts to be installed in the upper or lower half include the lid (front cover) and the slider which is slidably fitted on the underside of the lower half; these and other necessary components are combined with the upper and lower halves to make up the housing (cassette case).

A cassette according to an example of the eighth aspect of the invention is such that the window member to be fitted into at least one of the window openings in the upper half is made of a biodegradable resin. The biodegradable resin which forms the window member maintains comparable functions to the conventional resins during service but is thereafter decomposed by the action of naturally occurring microorganisms to be eventually converted to water and inorganic matter such as carbon dioxide; the biodegradability of such resins can be tested by the methods described in ISO 14851, ISO 14852 and ISO 14855.

ISO 14851 and ISO 14852 specify the biodegradability in an aerobic aqueous system; the rate of decomposition is determined from the consumption of oxygen (in ISO 14851) or from the evolution of carbon dioxide (in ISO 14852) and those resins which are decomposed by at least 60% within a maximum period of 6 months are regarded as applicable biodegradable resins. In ISO 14855, the rate of decomposition is determined from the evolution of carbon dioxide under composting conditions and those resins which are decomposed by at least 70% within a maximum period of 6 months are regarded as applicable biodegradable resins.

The biodegradable resins meeting those requirements can be classified as follows:

(1) Organism Produced Polymers
(a) poly($\beta$-hydroxybutyric acid) (e.g. BIOGREEN of MITSUBISHI GAS CHEMICAL CO., INC.)
(b) poly(hydroxybutyrate-hydroxyvalerate) (e.g. BIOPOL of Japan Monsanto in an amount of up to about 30% as an additive (filler))

(2) Synthetic Polymers
(a) poly(lactic acid) (LACTY of Shimadzu Corp., RAYCIA of Mitsui Chemicals, Inc., and ECOPLAY of Cargill-Dow)
(b) polycaprolactone (PCL) (CELL GREEN P-H of DAICEL CHEMICAL INDUSTRIES, LTD. in an amount of up to about 30% as an additive (filler))

(3) Naturally Occurring Polymers
(a) cellulose acetate (e.g. CELL GREEN P-CA of DAICEL CHEMICAL INDUSTRIES, LTD.)
(b) starch+PCL (e.g. MATERBY of Nippon Synthetic Chemical Industry Co., Ltd. and NOBON of Chisso Corporation)
(c) modified starch (e.g. EVER CORN of Nippon Corn Starch Co., Ltd.)

Note that all polymers listed above can be used as additives (fillers).

In the eighth aspect of the invention, accelerators for microbial degradation may also be used. Exemplary accelerators for microbial degradation include master batches prepared by blending high concentrations of various starches including corn starch, potato starch, rice starch and their modified starches.

Biodegradable resins used to form the window member are preferably based on poly(lactic acid), more preferably in combination with poly(hydroxybutyrene) (PHB), polycaprolactone (PCL) or poly(butyrene succinate) (PBS). Particularly preferred is the combination of poly(lactic acid) with 1-60%, most preferably 20-30%, of poly(hydroxybutyrene) (PHB), polycaprolactone (PCL) or poly(butyrene succinate) (PBS) since this provides good melt flow characteristics during molding and the obtained window member is high in impact resistance, clarity and resistance to hydrolysis.

In the example under consideration, the window member can be produced by injection molding of one or more of the biodegradable resins listed above or a batch consisting of such biodegradable resins as a major ingredient and other necessary ingredients. The shape, size and other parameters of the window member may be chosen as appropriate for the magnetic tape cassette into which it is to be fitted.

The window member can be fitted into the window opening by various methods which include but are not limited to welding, mechanical fitting and snap fitting. If fitting is effected by welding, the use of the biodegradable resins has the advantage that the window member undergoing thermal recycling emits less heat which is no more than half the amount generated from all-purpose resins such as ABS resins.

Described above are the basic features of the eighth aspect of the invention.

We now describe a method for destructing and separating components made of dissimilar materials according to the ninth aspect of the invention with reference to FIGS. 59-63.

In the following description of the method for destructing and separating components made of dissimilar materials according to the ninth aspect of the invention, a magnetic tape cassette is taken as a typical example of a resin product made of dissimilar materials and detailed description is given below for the method which is intended to ensure that a transparent window provided in the cassette case (housing) in order to help check the residual amount of magnetic tape can be readily taken apart from the housing for recycling. Needless to say, this is not the sole case of the invention.

Figure 59:
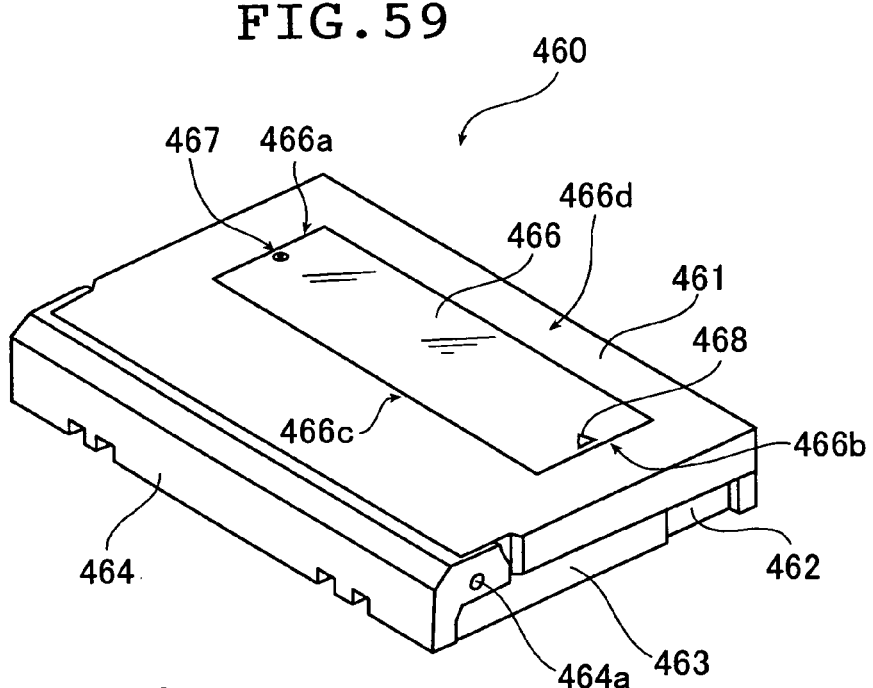
FIG. 59 is a perspective view showing diagrammatically a magnetic tape cassette according to an example of the ninth aspect of the invention.

FIG. 59 shows a magnetic tape cassette according to an example of the ninth aspect of the invention. As shown, the magnetic tape cassette generally indicated by 460 consists of an upper half 461 and a lower half 462 that combine to form the housing (cassette case). A slider 463 is fitted to the underside of the lower half 462 and a lid 464 is provided at the front face of the cassette (which is closer to the viewer). The slider 463 can slide back and forth on the underside of the lower half 462 so that when the cassette is not in service, the slider prevents dust from getting into the cassette by closing the opening in the lower part of the cassette case. The lid 464 on the upper half 461 is pivotally mounted on a shaft 464*a* so that it can open or close the front face of the cassette. Again, those parts of the magnetic tape cassette which are not shown in FIG. 59 are identical to the corresponding parts of the magnetic tape cassette shown in FIG. 1 and need not be described in detail in the following.

The housing of the magnetic tape cassette 460 contains magnetic tape (not shown) as it is wound around a pair of take-up hubs. The upper half 461 has a transparent window 466 through which the residual amount of tape in the magnetic tape cassette 460 can be checked as when it has been taken out of the deck (not shown).

The example under consideration is characterized in that the window 466 can be easily separated for recovery from the upper half 461 which is a component of the housing of the magnetic tape cassette.

To this end, the window 466 in the magnetic tape cassette 460 is so adapted as to permit easy breaking and separating. Conventionally, the window 466 is molded by injecting a molten resin through a gate provided at the center of the window 466. This is not the case of the example under consideration and, as shown in FIG. 59, a gate 467 is provided at one end of the window 466 in the longitudinal direction. A destruction mark 468 is provided at the other end of the window 466 which is diametrically opposite the gate 467 in the longitudinal direction. The destruction mark 468 indicates that if a force is applied to the position of that mark, the window 466 can be easily split and separated from the upper half 461.

Figure 60:
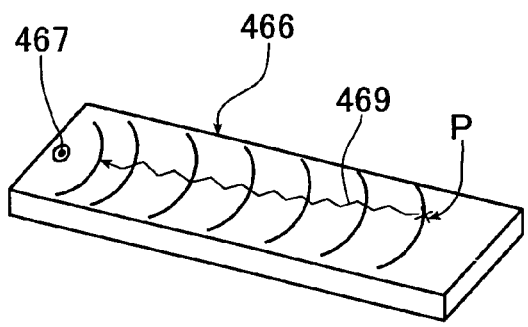
FIG. 60 is an illustration of the breaking behavior of a common shaped resin article.

It is generally known that injection molded articles are prone to break in the direction of flow of a molten resin. Given the same wall thickness, the molten resin tends to flow uniformly in a radial direction from the gate. In the case of injection molding the window 466 in the magnetic tape cassette shown in FIG. 59, the molten resin coming out of the gate 467 spreads radially outward to yield a molding as shown in FIG. 60. If a force is applied to a certain point P, a crack 469 develops and progresses toward the gate 467 in a direction perpendicular to the lines along which the resin spread radially.

Figure 61:
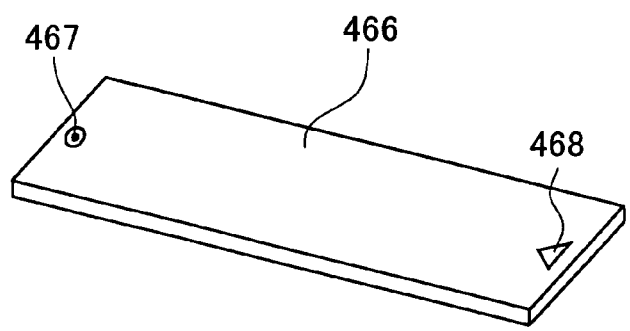
FIG. 61 is a perspective view showing an example of the window according to the ninth aspect of the invention.

This property of injection molded articles is effectively used in the example under consideration and the destruction mark 468 is provided on the window 466 in a position diametrically opposite the gate 467 in the longitudinal direction as shown in FIGS. 59 and 61. Stated specifically, the gate 467 is at the mid-point of one of the two shorter sides of the window 466 (to be exact, at a point slightly inward of the mid-point) and the destruction mark 468 which is diametrically opposite the gate 467 is correspondingly at the mid-point of the other shorter side of the window 466 (to be exact, at a point slightly inward of the mid-point). By applying a force to the destruction mark 468, one can split it into two neat shapes along the line extending straight toward the gate 467.

The manner of providing the destruction mark 468 is not limited to any particular way. A special die assembly may be used to provide a triangular or other marks as the window 466 is injection molded. A stamp may later be impressed on the molded window. If desired, a specified mark or letters stating in effect PRESS TO SPLIT may be printed, or a seal stating to that effect may be attached.

The window 466 may be molded simultaneously with the upper half 461 in two colors using the same die assembly; alternatively, the two parts may be molded as separate entities.

If desired, the window 466 may be so designed that its shorter sides (ends) 466*a* and 466*b* which cross the straight line connecting the gate 467 and the destruction mark 468 are not fixed to the upper half 461 whereas its longer sides 466*c* and 466*d* which do not cross the straight line are fixed to the upper half 461; this design allows the window 466 to break into two neat shapes along the center line in the longitudinal direction.

Figure 62:
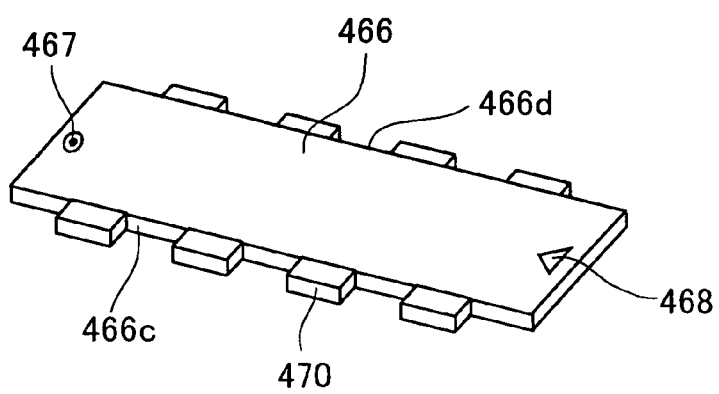
FIG. 62 is a perspective view showing another example of the window according to the ninth aspect of the invention.
Figure 63:
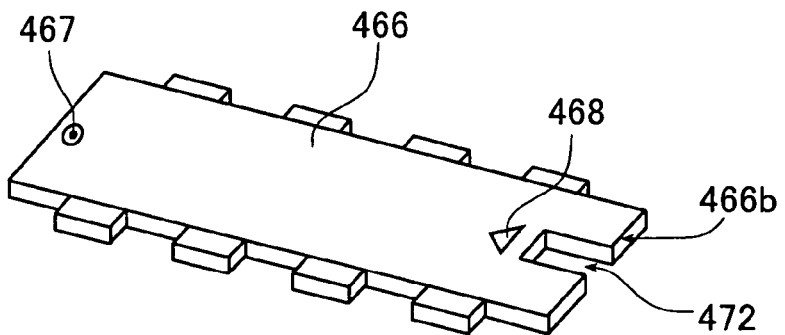
FIG. 63 is a perspective view showing yet another example of the window according to the ninth aspect of the invention.

The longer sides 466*c* and 446*d* of the window 466 need not altogether be secured to the upper half 461 but, as shown in FIG. 62, a plurality of lugs 470 may be formed on each of those sides to provide exclusive areas where the window is bonded to the upper half 461. The advantage of this design is that once the window 466 is broken into two parts in the longitudinal direction, each part can be easily separated from the upper half 461 since it is only fixed to the upper half 461 in selected areas.

On the other hand, if the window 466 breaks under a very small force that is applied to the destruction mark 468, the strength of the product cannot be assured during normal use. Hence, cracking should not develop unless the destruction mark 468 is given a sufficient force to break the window 466. However, it is not desirable that the window 466 do not break until after considerable force is applied to the destruction mark 468. To meet these requirements, the design illustrated in FIG. 63 may be adopted, in which a small cutout 472 is made on the side 466*b* where the destruction mark 468 is provided as shown; if a force is exerted at the destruction mark 468 in a direction toward the gate 467, cracking develops and will progress smoothly from the destruction mark 468 toward the gate 467.

Thus, a force is applied to the destruction mark 468 in a direction parallel to the direction in which the cutout 472 is made; even if the applied force is not great enough, cracking will progress from the cutout 472 toward the gate 467 and the window 466 can break easily. To provide an area for the cutout 472, the window 466 is preferably of such a length that the side 466*b* slightly overlaps the upper half 461 and the cutout 472 may be provided in the overlap. This design eliminates the possibility for dirt to get into the magnetic tape cassette via the cutout 472.

Figure 64:
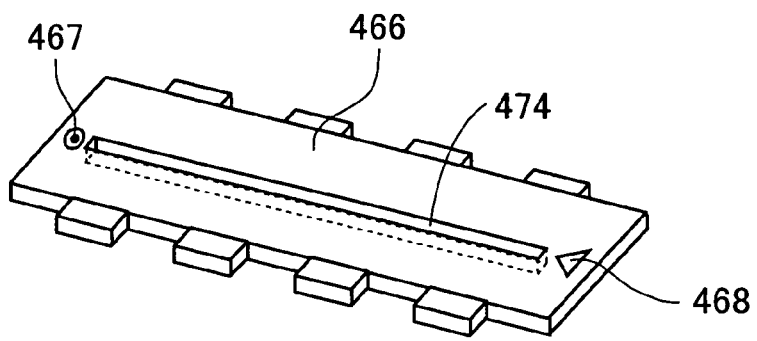
FIG. 64 is a perspective view showing a still another example of the window according to the ninth aspect of the invention.
Figure 65:
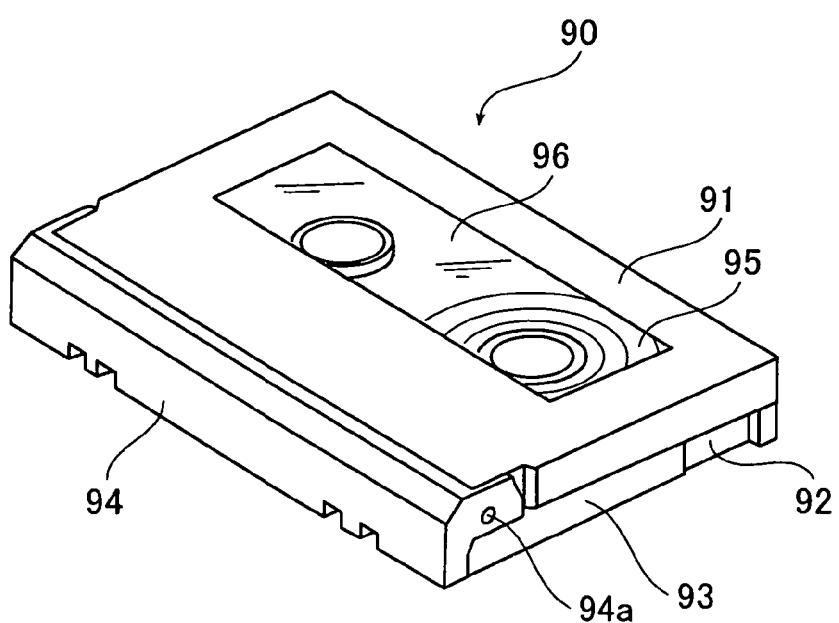
FIG. 65 is a perspective view showing diagrammatically a common magnetic tape cassette.
Figure 66A:
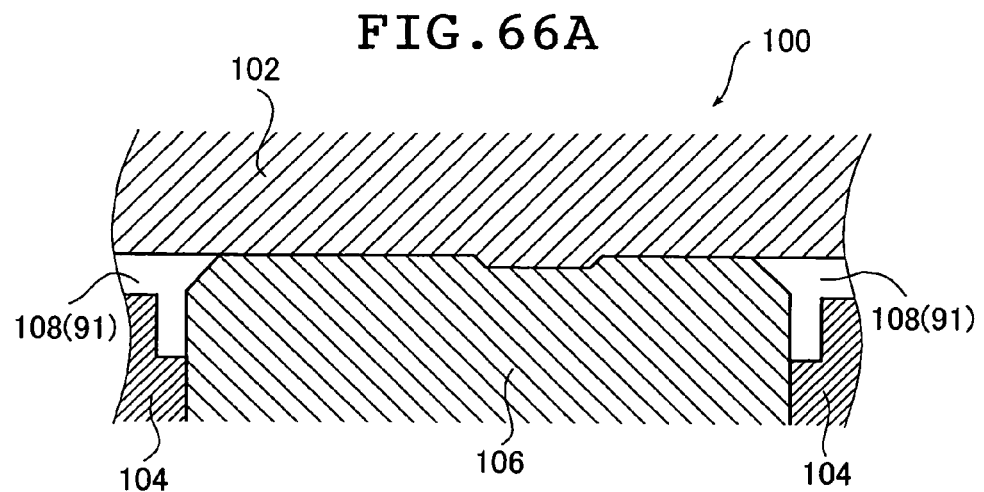
FIGS. 66A and 66B illustrate a conventional method for molding the upper half and the window of the magnetic tape cassette.
Figure 66B:
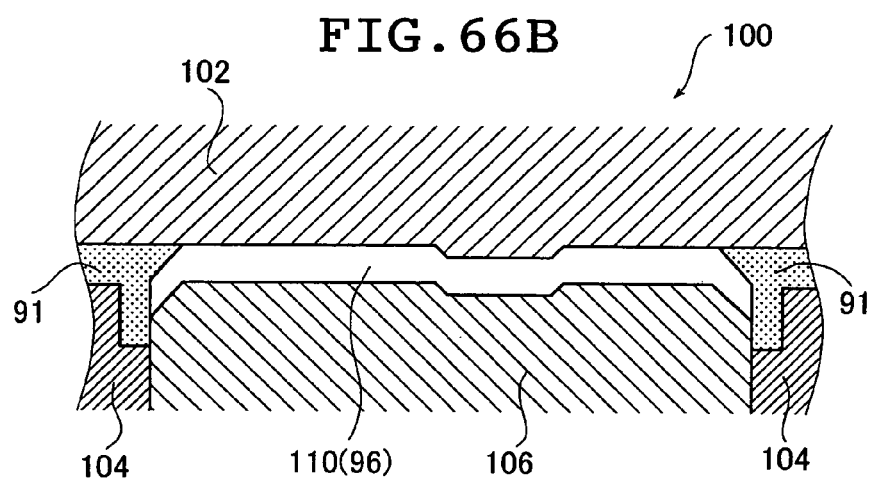
Figure 67:
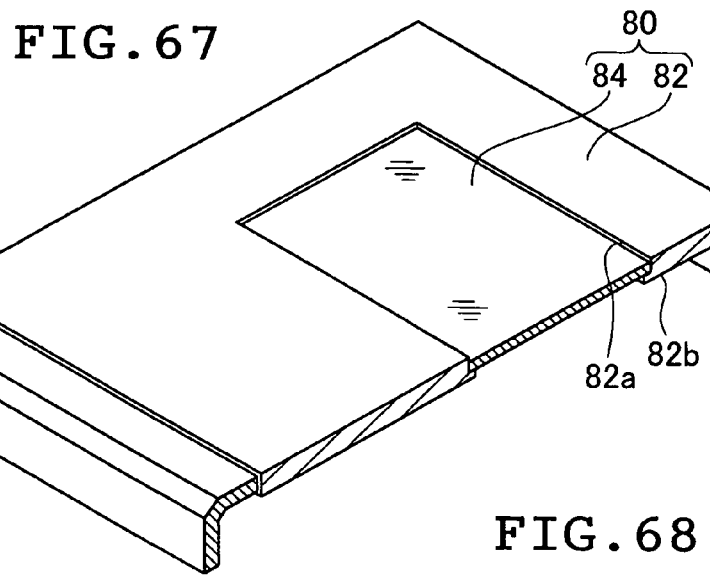
FIG. 67 is a perspective view of a prior art upper half, with it being cut across the transparent window.
Figure 68:
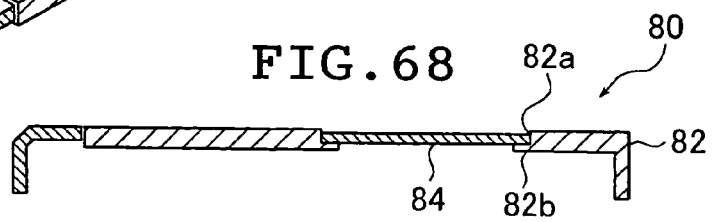
FIG. 68 is a section of FIG. 67 showing the upper half together with the transparent window.

An alternative design is illustrated in FIG. 64, in which the window 466 is provided with a straight groove 474 along its length to connect the gate 467 and the destruction mark 468. If the groove 474 is too deep, the window 466 may potentially break under a small impact during normal use. In addition, the groove 474 needs only to help cracking progress toward the gate 467 after a force was applied to the destruction mark 468 in order to break the window 468. Hence, the groove 474 need not be deeper than necessary.

Depending on the type of magnetic tape cassette, ribs for regulating the positions of magnetic tape take-up hubs are provided inside the window. In this case, a crack that develops at the destruction mark upon application of a force and which propagates toward the gate may stop at the ribs or divert laterally and the window sometimes fails to split neat in the longitudinal direction.

Even in these cases, the groove 474 shown in FIG. 64 serve as a guideline along which cracking propagates smoothly enough to ensure that the window breaks neat in the longitudinal direction.

Alternatively, the ribs may be provided with a cutout in those areas which intersect with the propagation of cracking from the destruction mark toward the gate.

As already mentioned, in the usual case of injection molding the window, the gate is located at the center of the window. Even in this case, the destruction mark may be provided near the center of one of the two shorter sides of the window in the longitudinal direction as in the foregoing example and if the destruction mark is depressed, a crack develops and propagates toward the central gate. If the window is split in a favorable manner, the crack will go beyond the central gate to progress unimpeded toward the opposite shorter side. Thus, the method of providing the destruction mark according to the example under consideration is effective even in the conventional process of injection molding the window.

While the window has been assumed to have a rectangular shape in the foregoing example, various other shapes may also be adopted. Even in the case of non-rectangular windows, the destruction mark may be provided in such positions that upon application of an impact to the mark, cracking develops at the affected point and propagates toward the gate. For example, the destruction mark may be provided on the window in the position which is the farthest from the gate.

Considering the relative positions of the gate and the destruction mark, it is generally recommended that the gate and the destruction mark be provided in such positions that they are connected by the longest straight line that can be drawn to traverses the window. In this case, the window can be split into two halves of generally the same size and it is easy to separate them later for recovery from the upper half.

On the foregoing pages, an example of the ninth aspect of the invention has been described in detail and according to this example, the transparent window provided in the upper half of a magnetic tape cassette to help check the residual amount of magnetic tape can be easily broken so that it is separated from the upper half in a smooth, positive and safest way.

It should be noted that the concept of the ninth aspect of the invention is not only applicable to the transparent window of a magnetic tape cassette, it is also applicable to other shaped resin articles in general.

Described above are the basic features of the ninth aspect of the invention.

While a magnetic tape cassette, a process for producing it, a resin shaped article, a method for multi-color molding of resin products and a method for destructing and separating parts made of dissimilar materials have been described on the foregoing pages in detail with reference to various examples to the extent that they are within the scope of the present invention, it should be noted that the examples are intended for illustrative purposes only and are by no means taken to limit the invention. Obviously, the concept of the invention allows for easy modification of details of various design considerations and it is equally applicable to other models of magnetic tape cassette. It goes without saying that various improvements and modifications are possible without departing from the scope and spirit of the invention.

For example, the separable transparent window having the structure described above is not only used to check the residual amount of tape in the magnetic tape cassette; obviously, the same structure is equally applicable to the purpose of installing a variety of transparent windows intended for visually checking the interior of the tape cassette, particularly those provided in other models of magnetic tape cassette.

In addition, the various methods described in the foregoing examples for coupling parts of dissimilar resins (plastics) are applicable to a wide variety of resin (plastic) products other than the magnetic tape cassette.

As described above in detail, the magnetic tape cassette according to the first aspect of the invention is characterized in that the transparent window consisting of a window member and a base (an upper half's body) that are not welded together can be easily disassembled and that the two components can be completely separated without letting part of the window member stick to the base or vice versa, with the advantage that they can be recycled as feeds for additional products without suffering a drop in purity.

As described above in detail, the second aspect of the invention brings about the same advantages as the first aspect.

In addition, the window member can be separated from the base in an easy and safest manner, thus contributing utmost safety to the operating personnel.

As described above in detail, according to the third aspect of the invention, the opening in the upper half's body serving as the base of the upper half has such a cross-sectional shape that it has a recess in both an upper and a lower surface and an edge portion that bridges the two recesses and the window member is directly molded in the opening, thereby providing the same advantages as in the first aspect.

In addition, the die assembly for molding the window member has a first and a second retractable core, so both the upper half and the window member can be molded with the same die assembly by changing only the positions of the two cores; as a result, the die assembly can be prepared at low cost.

As described above in detail, according to the fourth aspect of the invention, two or more incompatible resin materials that are not adherent to each other are used in a core backing, multi-color molding method to mold parts of the resin materials in multiple colors at substantially the same timing using a single die assembly; then, the respective parts are demolded and recombined together, whereby all parts are installed in one step to make a resin product. The thus assembled parts can be easily separated and recovered for recycling.

As described above in detail, the first embodiment of the fifth aspect of the invention can bring about the same advantages as the first aspect.

As described above in detail, the magnetic cassette case according to the second embodiment of the fifth aspect of the invention is characterized in that the areas in which the window member is joined to the base (the upper half's body) around the opening in it are formed to have a cross section which is asymmetric with respect to the center line and which has an inclined plane; hence, the base and the window member which are the two components of the window are not welded together and the window member once fitted into the base is substantially immobile. The resulting upper half is not only adequately air-tight, it also has sufficient strength against external forces. In the second embodiment under consideration, the window member can be easily separated from the opening in the base by pushing it at an angle; this is the same advantage as obtained in the first aspect of the invention.

As described above in detail, according to the third embodiment of the fifth aspect of the invention, a circular opening is made in the base of the upper half and a correspondingly circular window member is threaded into the opening; this design contributes to providing the same advantage as in the first aspect of the invention.

If the window member has a flange, it can be firmly secured to provide an upper half which is not only air-tight but also strong enough to resist external pressure and impact.

As described above in detail, the sixth aspect of the invention realizes a shaped resin article that is formed of parts of dissimilar materials and which permits the respective parts to be easily separated and recovered for recycling.

As described above in detail, the seventh aspect of the invention can bring about the same advantages as the first aspect.

As described above in detail, according to the eighth aspect of the invention, a smaller amount of heat is emitted in the recycling processes, contributing to preservation of the earth's environment and prevention of global warming.

As described above in detail, according to the ninth aspect of the invention, a shaped resin article made of parts of dissimilar materials can be destructed in a simple, positive and safest way so that they are efficiently separated for recovery.

Thus, according to the various aspects of the invention, there are provided magnetic tape cassettes of structures that permit utmost safety in the operation of separating the window member from the body of the upper half of the magnetic tape cassette that has been discarded after use.

According to the various aspects of the invention, there are also provided magnetic tape cassettes which will emit a smaller amount of heat even if part of the discarded tape cassette should be subjected to thermal recycling. Thus, according to the various aspects of the invention, one can provide magnetic tape cassettes that emit a smaller amount of heat in the recycling processes, contributing to preservation of the earth's environment and prevention of global warming.

What is claimed is:

1. A magnetic tape cassette having:
a base with an opening for accommodating a transparent window and at least one reel of magnetic tape; and
a transparent resin-made window member to close said opening in said base, wherein
said base and said window member are each composed of materials having no compatibility or having an extremely low degree of compatibility to each other for ultrasonic or thermal welding, said opening in said base has a ridge that engages said window member, said window member has a recess in at least one of two sets of opposed sides which fit said ridge on said base, and wherein said ridge on said base is fitted into said recess in said window member,
said base comprising an inner peripheral wall forming the opening, said inner peripheral wall having said ridge, such that portions of said inner peripheral wall above and below said ridge face into the opening,
said recess of said window member engages said ridge, such that portions of said window member above and below the recess abut respectively against said portions of said inner peripheral wall above and below said ridge, and
said window member has a first side and second side which extend across the opening, and said recess of the window member engaging said ridge is positioned such that a shortest distance from said recess to said first side of said window member is shorter than a shortest distance from said recess to said second side of said window member.

2. The magnetic tape cassette of claim 1, wherein said ridge is block shaped.

3. The magnetic tape cassette of claim 1, wherein said base is thicker than a thickest portion of said window member.

4. The magnetic tape cassette according to claim 1, wherein both of said first side and said second side of said window member are recessed into said opening.

5. The magnetic tape cassette according to claim 1, wherein said first side which is recessed includes a projection extending from a periphery of said window member, which is operable to be broken off upon an application of force to said window member.

* * * * *